US012400524B2

(12) United States Patent
Givant

(10) Patent No.: US 12,400,524 B2
(45) **Date of Patent: *Aug. 26, 2025**

(54) SPECIALIZED SLOT MACHINE FOR CONDUCTING A WAGERING GAME USING A CARD SYSTEM FOR REAL TIME OR LIVE ACTION EVENT CONTENT

(71) Applicant: Philip Paul Givant, Carmichael, CA (US)

(72) Inventor: Philip Paul Givant, Carmichael, CA (US)

( * ) Notice: Subject to any disclaimer, the term of this patent is extended or adjusted under 35 U.S.C. 154(b) by 435 days.

This patent is subject to a terminal disclaimer.

(21) Appl. No.: 17/956,583

(22) Filed: Sep. 29, 2022

(65) Prior Publication Data

US 2023/0015622 A1 Jan. 19, 2023

Related U.S. Application Data

(63) Continuation-in-part of application No. 17/588,329, filed on Jan. 30, 2022, now Pat. No. 11,861,987, (Continued)

(51) Int. Cl.
*G07F 17/32* (2006.01)

(52) U.S. Cl.
CPC ...... *G07F 17/3288* (2013.01); *G07F 17/3209* (2013.01); *G07F 17/3213* (2013.01); (Continued)

(58) Field of Classification Search
None
See application file for complete search history.

(56) References Cited

U.S. PATENT DOCUMENTS 5,846,132 A 12/1998 Junkin
5,860,862 A 1/1999 Junkin
(Continued)

FOREIGN PATENT DOCUMENTS

CN 101010124 8/2007
CN 101119779 2/2008
(Continued)

OTHER PUBLICATIONS

US 8,529,353 B2, 09/2013, Muller (withdrawn)
(Continued)

*Primary Examiner* — Jason T Yen
(74) *Attorney, Agent, or Firm* — Inventive Law Inc.; Jim H. Salter

(57) ABSTRACT

A virtual card deck gaming system implemented on a specialized slot machine comprises a virtual card deck gaming structure configured to provide a virtual deck of cards, wherein a plurality of virtual cards in the deck have been selected from a virtual pool of cards, wherein each of the plurality of virtual cards comprise identifying information and real-life statistics related to an athlete's actions in real-life sporting events; randomly present at least three virtual cards in a bloc face up from the virtual deck of cards to a plurality of players; prompt the plurality of players to bid on the presented bloc of virtual cards or fold and exit a current round; accept bids from the plurality of players; and award the presented bloc of virtual cards to a winning player of the plurality of players with a best bid.

20 Claims, 16 Drawing Sheets

Related U.S. Application Data which is a continuation of application No. 16/665,684, filed on Oct. 28, 2019, now Pat. No. 11,270,556, which is a continuation of application No. 15/437,125, filed on Feb. 20, 2017, now Pat. No. 10,460,568, which is a continuation of application No. 14/981,408, filed on Dec. 28, 2015, now Pat. No. 9,589,418, which is a continuation-in-part of application No. 14/684,160, filed on Apr. 10, 2015, now abandoned, which is a continuation-in-part of application No. 13/945,628, filed on Jul. 18, 2013, now abandoned.

(60) Provisional application No. 61/741,463, filed on Jul. 19, 2012.

(52) U.S. Cl.
CPC ...... *G07F 17/3223* (2013.01); *G07F 17/3227* (2013.01); *G07F 17/323* (2013.01); *G07F 17/3237* (2013.01); *G07F 17/3239* (2013.01); *G07F 17/3258* (2013.01); *G07F 17/3276* (2013.01)

(56) References Cited

U.S. PATENT DOCUMENTS 6,092,806 A 7/2000 Follis
6,135,881 A 10/2000 Abbott
6,204,862 B1 3/2001 Barstow
6,319,123 B1 11/2001 Paludi
6,321,128 B1 11/2001 Costin, IV
6,347,086 B1 2/2002 Strachan
6,371,855 B1 4/2002 Gavriloff
6,527,270 B2 3/2003 Maksymec
6,606,615 B1 8/2003 Jennings
6,669,565 B2 12/2003 Liegey
6,688,973 B2 2/2004 Satloff
6,688,978 B1 2/2004 Herman
6,760,595 B2 7/2004 Inselberg
6,800,028 B1 10/2004 Paludi
6,910,965 B2 6/2005 Downes
7,001,279 B1 2/2006 Barber
7,153,211 B2 12/2006 Campaigne
7,225,233 B1 5/2007 Fenton
7,303,472 B2 12/2007 Guagliardo
7,351,150 B2 4/2008 Sanchez
7,362,862 B2 4/2008 Schneier
7,364,509 B2 4/2008 Slade
7,364,510 B2 4/2008 Walker
7,373,587 B1 5/2008 Barstow
7,384,338 B2 6/2008 Rothschild
7,445,550 B2 11/2008 Barney
7,458,894 B2 12/2008 Danieli
7,485,037 B2 2/2009 Penrice
7,500,917 B2 3/2009 Barney
7,507,169 B2 3/2009 Kamen
7,522,554 B2 4/2009 Chan
7,548,242 B1 6/2009 Hughes
7,562,815 B2 7/2009 Page
7,563,162 B2 7/2009 Lawson
7,607,403 B2 10/2009 Walters
7,614,944 B1 11/2009 Hughes
7,637,809 B2 12/2009 Ghosh
7,641,549 B2 1/2010 Asher
7,641,553 B2 1/2010 Roush
7,648,417 B2 1/2010 Sonn
7,657,477 B1 2/2010 Chaffee
7,666,084 B2 2/2010 Herrmann
7,666,088 B2 2/2010 Cannon
7,699,707 B2 4/2010 Bahou
7,716,078 B2 5/2010 Bourne
7,716,113 B2 5/2010 Crosthwaite
7,762,881 B2 7/2010 Ghosh
7,791,607 B1 9/2010 Hughes
7,815,502 B2 10/2010 Hardy
7,830,830 B2 11/2010 Chan
7,831,452 B2 11/2010 Ghosh
7,835,974 B2 11/2010 Burgis
7,840,176 B2 11/2010 Chan
7,850,523 B2 12/2010 Ghosh
7,850,527 B2 12/2010 Barney
7,857,699 B2 12/2010 Baerlocher
7,872,655 B2 1/2011 Hughes
7,874,920 B2 1/2011 Hornik
7,878,905 B2 2/2011 Weston
7,896,740 B2 3/2011 Asher
7,896,742 B2 3/2011 Weston
7,905,777 B2 3/2011 Muir
7,918,727 B2 4/2011 Roush
7,918,737 B2 4/2011 Hirota
7,922,586 B2 4/2011 Heckendorf, III
7,942,735 B2 5/2011 Meyer
7,980,942 B2 7/2011 Kane
7,985,134 B2 7/2011 Ellis
7,991,347 B1 8/2011 Chan
8,029,361 B2 10/2011 Hardy
8,047,907 B2 11/2011 Kane
8,065,702 B2 11/2011 Goldberg
8,075,407 B2 12/2011 Yamamoto
8,088,000 B2 1/2012 Ginsberg
8,089,458 B2 1/2012 Barney
8,099,182 B1 1/2012 Kasten
8,100,759 B2 1/2012 Hardy
8,105,166 B2 1/2012 Cayce
8,113,935 B2 2/2012 Walker
8,118,658 B2 2/2012 Hughes
8,118,667 B2 2/2012 Herrmann
8,133,106 B2 3/2012 Englman
8,142,283 B2 3/2012 Lutnick
8,176,518 B1 5/2012 Junkin
8,177,628 B2 5/2012 Manning
8,177,644 B2 5/2012 Anderson
8,184,097 B1 5/2012 Barney
8,185,448 B1 5/2012 Myslinski
8,185,819 B2 5/2012 Sah
8,192,260 B2 6/2012 Fleming
8,202,149 B2 6/2012 Gedling
8,210,916 B2 7/2012 Ma
8,210,931 B2 7/2012 Alderucci
8,223,154 B2 7/2012 Hughes
8,229,795 B1 7/2012 Myslinski
8,231,453 B2 7/2012 Wolf
RE43,601 E 8/2012 Arseneau
8,239,310 B2 8/2012 Lortscher, Jr.
8,239,891 B2 8/2012 Hughes
8,241,100 B2 8/2012 Katz
8,246,468 B2 8/2012 Anderson
8,248,367 B1 8/2012 Barney
8,262,465 B2 9/2012 Lutnick
8,262,466 B2 9/2012 Anderson
8,272,950 B2 9/2012 Rosenau
8,272,961 B2 9/2012 Busey
8,272,964 B2 9/2012 Van Datta
8,292,720 B2 10/2012 Davis
8,292,725 B2 10/2012 Wikander
8,296,794 B2 10/2012 Hughes
8,301,479 B2 10/2012 Bourne
8,308,571 B2 11/2012 Sonn
8,315,722 B1 11/2012 Russo
8,328,644 B2 12/2012 Busey
8,337,310 B1 12/2012 Bjordahl
8,337,312 B1 12/2012 Jones
8,342,929 B2 1/2013 Briggs
8,342,947 B2 1/2013 Baerlocher
8,342,959 B2 1/2013 Mahaffey
8,348,737 B2 1/2013 Page
8,353,763 B2 1/2013 Amaitis
8,353,772 B2 1/2013 Callery
8,366,551 B2 2/2013 Thomas
8,368,648 B2 2/2013 Barney
8,373,659 B2 2/2013 Barney
8,376,826 B2 2/2013 Katz
8,384,668 B2 2/2013 Barney

(56) References Cited

U.S. PATENT DOCUMENTS

RE44,095 E 3/2013 Sanchez
8,391,773 B2 3/2013 Arseneau
8,391,774 B2 3/2013 Arseneau
8,391,825 B2 3/2013 Arseneau
8,398,489 B2 3/2013 Lutnick
8,400,456 B2 3/2013 Hughes
8,401,919 B2 3/2013 Myslinski
8,403,748 B2 3/2013 Anderson
8,403,758 B2 3/2013 Hornik
8,417,626 B2 4/2013 Crosthwaite
8,423,424 B2 4/2013 Myslinski
8,425,300 B2 4/2013 Kane
8,432,489 B2 4/2013 Arseneau
8,435,107 B2 5/2013 Englman
8,444,483 B2 5/2013 Anderson
RE44,323 E 6/2013 Goldberg
8,454,423 B2 6/2013 Lutnick
8,457,545 B2 6/2013 Chan
8,460,078 B2 6/2013 Moore
8,460,110 B2 6/2013 Costin
8,465,368 B2 6/2013 Hardy
8,475,262 B2 7/2013 Wolf
8,475,275 B2 7/2013 Weston
8,480,471 B2 7/2013 Lutnick
8,480,499 B2 7/2013 Herrmann
8,490,128 B2 7/2013 Davis
8,491,389 B2 7/2013 Weston
8,498,924 B2 7/2013 Crosthwaite
8,500,533 B2 8/2013 Lutnick
8,500,537 B2 8/2013 Walker
8,505,045 B2 8/2013 Hughes
8,506,393 B2 8/2013 Lutnick
8,509,929 B1 8/2013 Hughes
8,512,133 B2 8/2013 Hardy
8,512,134 B2 8/2013 Hardy
8,512,143 B2 8/2013 Jung
8,512,148 B2 8/2013 Butz, Jr.
8,515,737 B2 8/2013 Allen
8,516,473 B2 8/2013 Lane
8,523,684 B2 9/2013 Lutnick
8,528,036 B2 9/2013 Davis
8,535,134 B2 9/2013 Katz
8,538,563 B1 9/2013 Barber
8,545,311 B2 10/2013 Shore
8,549,416 B2 10/2013 Ganz
8,556,723 B2 10/2013 Jung
8,560,547 B2 10/2013 Tocci
8,566,111 B2 10/2013 Jung
8,574,055 B2 11/2013 Odom
8,574,074 B2 11/2013 Van Datta
8,579,686 B2 11/2013 Abramoff
8,579,696 B2 11/2013 Herrmann
8,583,509 B1 11/2013 Myslinski
8,585,495 B2 11/2013 Rosenau
8,608,535 B2 12/2013 Weston
8,608,542 B2 12/2013 Davis
8,613,653 B2 12/2013 Hughes
8,613,673 B2 12/2013 Perry
8,615,471 B2 12/2013 Hannigan
8,622,793 B2 1/2014 Ford
8,622,798 B2 1/2014 Lockton
8,632,392 B2 1/2014 Shore
8,632,394 B2 1/2014 Muir
8,632,412 B2 1/2014 Cooper
8,635,146 B2 1/2014 Baggott
8,640,165 B2 1/2014 Ellis
8,647,201 B1 2/2014 Jehamy
8,851,981 B2 10/2014 Ramsey
9,005,016 B2 4/2015 Amaitis
10,482,720 B2 11/2019 Mitchell
2002/0107590 A1 8/2002 Liegey
2003/0186744 A1 10/2003 Bradell
2004/0192437 A1* 9/2004 Amaitis ............. G07F 17/3288
463/26
2005/0043094 A1 2/2005 Nguyen
2005/0107155 A1 5/2005 Potts
2006/0079312 A1 4/2006 Penrice
2006/0252476 A1 11/2006 Bahou
2007/0015562 A1* 1/2007 Smith ....................... A63F 1/00
463/13
2007/0021165 A1 1/2007 Ma
2007/0021214 A1 1/2007 Ma
2007/0021853 A1 1/2007 Ma
2007/0232393 A1* 10/2007 Dreyer ................ G07F 17/3288
463/29
2008/0026831 A1 1/2008 Wright
2008/0045306 A1 2/2008 Okada
2008/0051201 A1 2/2008 Lore
2008/0064490 A1 3/2008 Ellis
2008/0161113 A1 7/2008 Hansen
2008/0274782 A1 11/2008 Schmidt
2008/0287198 A1 11/2008 Callery
2009/0054153 A1 2/2009 Abekasis
2009/0149244 A1 6/2009 Lutnick
2009/0170584 A1 7/2009 Tan
2009/0191938 A1 7/2009 Hill
2009/0203412 A1 8/2009 Gedling
2009/0215527 A1 8/2009 Lipscomb
2010/0137057 A1 6/2010 Fleming
2010/0184495 A1 7/2010 Levy
2010/0197374 A1 8/2010 Koivisto
2010/0203935 A1 8/2010 Levy
2010/0203936 A1 8/2010 Levy
2010/0252998 A1 10/2010 Guidroz
2010/0279754 A1 11/2010 Tanenbaum
2010/0279774 A1 11/2010 Braig
2010/0285856 A1 11/2010 Thomas
2010/0285857 A1 11/2010 Anderson
2011/0034225 A1 2/2011 Butz, Jr.
2011/0098093 A1 4/2011 Amaitis
2011/0177856 A1 7/2011 Rentis
2011/0183734 A1 7/2011 Koivisto
2011/0244932 A1 10/2011 Bowe
2011/0256913 A1 10/2011 Ford
2012/0009984 A1 1/2012 Amaitis
2012/0028718 A1 2/2012 Barclay
2012/0064974 A1 3/2012 Washington
2012/0115585 A1 5/2012 Goldman
2012/0142411 A1 6/2012 Thompson
2012/0149473 A1 6/2012 Moore
2012/0172123 A1 7/2012 Beaulieu
2012/0202599 A1 8/2012 Cohen
2012/0220375 A1 8/2012 Williams
2012/0225724 A1 9/2012 Barber
2012/0270614 A1 10/2012 Robinson
2012/0270615 A1 10/2012 Jones
2012/0276964 A1 11/2012 Jones
2012/0289344 A1 11/2012 Welfringer
2013/0005419 A1 1/2013 Sediq
2013/0005422 A1 1/2013 Callery
2013/0273994 A1 10/2013 Cobb
2013/0303268 A1 11/2013 Miller
2013/0316818 A1 11/2013 Earley
2014/0011573 A1 1/2014 Amaitis
2014/0031105 A1 1/2014 Givant
2014/0045595 A1 2/2014 Baschnagel, III
2014/0094274 A1 4/2014 Guinn
2014/0315623 A1 10/2014 Bonavita
2015/0170467 A1 6/2015 Shore
2015/0209679 A1 7/2015 Givant
2015/0325086 A1 11/2015 Morrissette
2016/0133088 A1 5/2016 Givant
2017/0161999 A1 6/2017 Givant
2018/0015358 A1 1/2018 Mahon
2018/0293847 A1 10/2018 Hendricks
2019/0188972 A1* 6/2019 Mitchell ............ G07F 17/3293
2020/0074809 A1 3/2020 Givant
2020/0230490 A1 7/2020 Swiderski
2020/0398146 A1 12/2020 Jacobs

(56) References Cited

U.S. PATENT DOCUMENTS

| | | | |
|---|---|---|---|
| 2021/0082254 | A1 | 3/2021 | Givant |
| 2022/0165135 | A1 | 5/2022 | Givant |

FOREIGN PATENT DOCUMENTS

| | | |
|---|---|---|
| CN | 101149853 | 3/2008 |
| WO | WO2014014492 | 1/2014 |
| WO | WO2017117065 | 7/2017 |
| WO | WO2022115414 | 6/2022 |

OTHER PUBLICATIONS

Crouch, Dennis, "Federal Circuit: No New Card Game Patents Unless You Also Invent a New Deck", https://patentlyo.com/patent/2016/03/federal-circuit-patents.html, Jun. 24, 2022, 2 pages.
McCarthy, Michael, "NFL to Offer Richest Fantasy Football Prize: $1 Million", USA Today. Feb. 2, 2012, Retrieved on Oct. 16, 2012 from Internet, Available Online at <http://content.usatoday.com/communities/gameon/post/2012/02/nfl-to-offer-richest-fantasy-payday-ever-try-1-million-nfl-perfect-challenge-nflcom-super-bowl-xlvi-new-york-giants-new-england-patriots/1#.UrFUd7WcVT4>, 5 pages.
Tilman Sheets, Dealing with Oppositional Behavior, 1997, http://www.yourfamilyclinic.com/ODD/ODD.html.
PrintYourBrackets.com, How to run a Round Robin Tournament, Nov. 28, 2010, http://www.printyourbrackets.com/howtoroundrobin.html.
International Search Report and Written Opinion received for PCT Patent Application No. PCT/US2013/000168, mailed on Oct. 25, 2013, 19 pages.
International Preliminary Report on Patentability received for PCT Patent Application No. PCT/US2013/000168, mailed on Jun. 9, 2015, 9 pages.
International Search Report and Written Opinion received for PCT Patent Application No. PCT/US2016/068570, mailed on Jan. 19, 2017, 13 pages.I.
International Preliminary Report on Patentability received for PCT Patent Application No. PCT/US2016/068570, mailed on Jul. 3, 2018, 5 pages.
International Search Report and Written Opinion received for PCT Patent Application No. PCT/US21/60479, mailed on Feb. 8, 2022, 12 pages.
Heckeler, Patrick, "Improving Functional Quality of the Graphical Layout of a Video Game: Technical", www.bardehle.com, Jul. 13, 2022, 6 pages.
Benic, Vedran, "Patentability of Gameplay", Master's Thesis, Tilburg University Law School, Dec. 2017, 46 pages.
European Patent Office Legal Decision, Case No. T 0928/03, Konami Co. Ltd., Jun. 2, 2006, 9 pages.
Taiwan Office Action, Taiwan Patent Appl. No. 111149239, issued Feb. 27, 2024, 4 pages,.

* cited by examiner

Fig. 14
Phil Collins
GENESIS
Drums/Vocals
TV
Jennifer Anniston "Rachel Green"
FRIENDS
"Comedy"
Angela Merkle
POLITICS
"Chancellor of Germany"

SPECIALIZED SLOT MACHINE FOR CONDUCTING A WAGERING GAME USING A CARD SYSTEM FOR REAL TIME OR LIVE ACTION EVENT CONTENT

REFERENCE TO PRIORITY PATENT APPLICATIONS

The present application is a continuation-in-part (CIP) application of U.S. application Ser. No. 17/588,329, filed Jan. 30, 2022; which is a continuation application of U.S. application Ser. No. 16/665,684, filed Oct. 28, 2019, now U.S. Pat. No. 11,270,556; which is a continuation application of U.S. application Ser. No. 15/437,125, filed Feb. 20, 2017, now U.S. Pat. No. 10,460,568; which is a continuation application of U.S. application Ser. No. 14/981,408, filed Dec. 28, 2015, now U.S. Pat. No. 9,589,418: which is a non-provisional continuation-in-part patent application claiming priority to application Ser. No. 14/684,160, filed on Apr. 10, 2015: which is a non-provisional continuation-in-part patent application claiming priority to application Ser. No. 13/945,628, filed on Jul. 18, 2013; which is a non-provisional patent application claiming priority to Ser. No. 61/741,463, filed on Jul. 19, 2012. The present patent application claims priority to the referenced patent applications, which are hereby incorporated by reference herein in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice applies to the disclosure herein and to the drawings that form a part of this document: Copyright 2012-2022, Philip Paul Givant, All Rights Reserved.

TECHNICAL FIELD

This patent application relates to gaming machines, slot machines, computer-implemented software, networked systems, and gaming systems according to one embodiment, and more specifically to a specialized slot machine for conducting a wagering game using a card system for real time or live action event content.

BACKGROUND

The gaming industry, casinos, and gambling venues have used gaming machines, such as slot machines, video poker machines, and the like for many years. Slot machines have proven to be very popular with players and profitable for the venue. Generally, the popularity of such machines with players is dependent on the possibility of winning money at the machine and the intrinsic entertainment value of the machine relative to other available gaming options. Players are usually attracted to the most entertaining and exciting machines, which are constructed with features and enhancements to attract frequent play and increase profitability for the operator. Therefore, there is a continuing need for slot machine manufacturers to continuously develop new games and improve gaming enhancements that will attract frequent play through enhanced entertainment value to the player.

However, current gaming systems are based on the use of pre-defined sets of cards or displays (e.g., types of fruit, symbols, etc.) that form the content used in the wagering games implemented by the gaming systems. Casinos have been unable use these gaming systems to implement wagering games that are based on the use of variable content, real-time content, or live action content. Additionally, casinos have been unable to exploit an opportunity to enter the exploding fantasy sports market via traditional slot machines or other gaming systems that are designed to create games of intense, skill-based strategy.

Gaming systems with cards or card displays can be used like traditional decks of cards at a table or they can be virtual decks of cards that are played on slot machines, video games, and/or Internet games. One of the features of these cards should be to provide as many players as possible the opportunity to play these types of games. However, traditional card games or gaming systems with cards or card displays have created impediments for a significant portion of the population.

One out of every twelve men in the world are color blind. This represents eight percent of the male population. This issue is not nearly as prevalent with women where only one out of 200 suffer from this affliction. This represents only one half of one percent of the female population. Nevertheless, traditional card games or gaming systems with cards or card displays have largely ignored the needs of these players.

SUMMARY

In various embodiments described herein, specialized slot machines for conducting wagering games using a card system for real time or live action event content via a computer system and/or a data network are disclosed. In other embodiments described herein, specialized slot machines for conducting fantasy sports tournaments via a computer system and/or a data network are disclosed. In general, this patent application relates to computer or network implemented specialized gaming systems and/or fantasy sports tournaments.

In various example embodiments, the computer or network implemented gaming system as described herein can be in data network communication with a plurality of user platforms. The user platforms can be client computing devices, mobile computing devices, mobile communication devices, or the like operated by gaming contestants or administrators. A host site or server can be used to execute the software and systems implementing the gaming structure as described herein. As such, the host site and the networked system become a special purpose computing platform particularly configured to support the computer or network implemented gaming system as described herein. The host site and the user platforms may communicate and transfer data and information in a data network environment via a wide area data network (e.g., the Internet). Various components of the host site can also communicate internally via a conventional intranet or local area network (LAN).

In the example embodiments, the computer or network implemented gaming system as described herein can be in data network communication with a plurality of contestants and other network resources. Contestants can represent the network locations of clients or client computing systems being managed by contestants, teams, gaming players, or other client users operating an embodiment as described herein. As described in more detail below, contestants or other users at a user platform can interact with a computer-generated user interface provided by the gaming system to participate in and communicate with the gaming system.

In the example embodiments, the computer or network implemented gaming system as described herein can implement card games or gaming systems with cards or card displays, which can be easily read and used by color blind people.

BRIEF DESCRIPTION OF THE DRAWINGS

The various embodiments are illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

Figure 1:
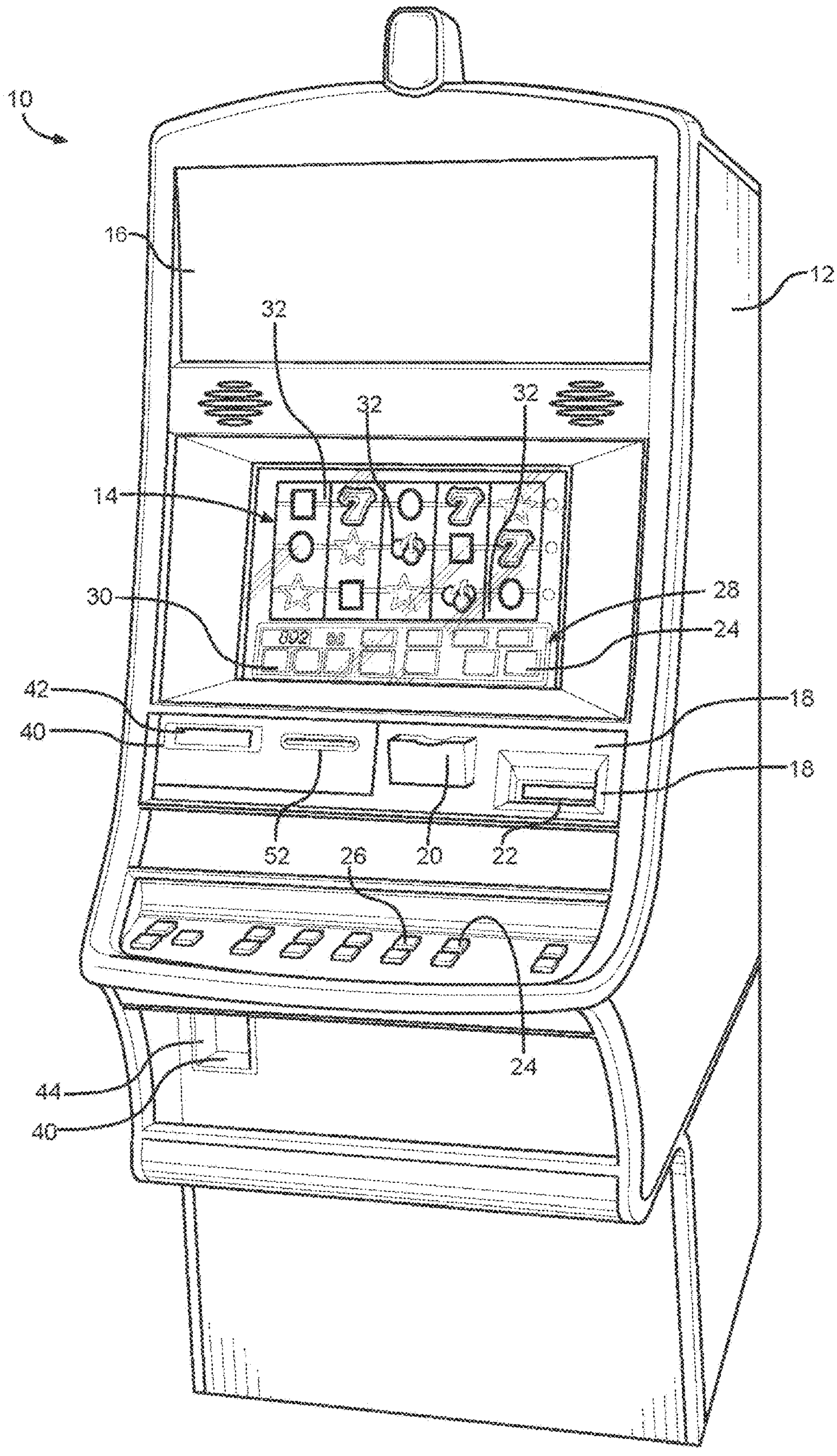
FIG. 1 is a perspective view of a free standing slot machine embodying the example embodiment.

An Example Embodiment Implemented as a Specialized Slot Machine, a Specialized Lottery Machine, or Other Specialized Gaming System for Conducting Wagering Games Using a Card System for Real Time or Live Action Event Content Referring now to FIG. 1, a slot machine 10 can be used in gaming venues such as casinos. With regard to the example embodiments described herein, the slot machine 10 may be any type of slot machine and may have varying structures and methods of operation. For example, the slot machine 10 may be an electromechanical gaming machine configured to play mechanical slots, or it may be an electronic gaming machine configured to play a video casino game, such as slots, keno, poker, blackjack, roulette, etc. The slot machine 10 may also be an electromechanical lottery machine in an alternative embodiment.

The slot machine 10 comprises a housing 12 and includes input devices, including a value input device 18 and a player input device 24. For output the slot machine 10 includes a primary display 14 for displaying information about the basic wagering game. The primary display 14 can also display information about a bonus wagering game and a progressive wagering game. The slot machine 10 may also include a secondary display 16 for displaying game events, game outcomes, and/or signage information. While these typical components found in the slot machine 10 are described below, it should be understood that numerous other elements may exist and may be used in any number of combinations to create various forms of a slot machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, a barcode scanner, or a QR code scanner for reading information stored on a credit ticket, a card, or other tangible portable credit storage device. The credit ticket or card may also authorize access to a central account, which can transfer money to the slot machine 10.

The player input device 24 comprises a plurality of push buttons 26 on a button panel for operating the slot machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the slot machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game. In another implementation, a lever or handle on the side of the slot machine can be used by a user to provide input to the slot machine 10.

The various components of the slot machine 10 may be connected directly to, or contained within, the housing 12, as seen in FIG. 1, or may be located outboard of the housing 12 and connected to the housing 12 via a variety of different wired or wireless connection methods. Thus, the slot machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT) display, a high resolution liquid-crystal display (LCD), a plasma display, an LED (light emitting diode) display, or any other type of display suitable for use in the slot machine 10. As shown, the primary display 14 includes the touch screen 28 overlaying the entire display (or a portion thereof) to allow players to make game-related selections. Alternatively, the primary display 14 of the slot machine 10 may include a number of mechanical, electromechanical, or electronic reels to display the outcome in visual association with at least one payline 32. In the illustrated embodiment, the slot machine 10 is an “upright” version in which the primary display 14 is oriented vertically relative to the player. Alternatively, the slot machine may be a “slant-top” version in which the primary display 14 is slanted at about a thirty-degree angle toward the player of the slot machine 10.

A player begins play of the basic wagering game by making a wager via the value input device 18 of the slot machine 10. A player can select a type of play by using the player input device 24, via the buttons 26 or the touch screen keys 30. The basic game consists of a plurality of symbols arranged in an array, and includes at least one payline 32 that indicates one or more outcomes of the basic game. Such outcomes can be randomly selected in response to the wagering input by the player. As described in more detail below for various example embodiments, the outcomes can also be based on player input and real time or live action content retrieved by the slot machine 10 from a network information source. At least one of the plurality of outcomes determined by the slot machine 10 may be a start-bonus outcome, which can include any variations of symbols or symbol combinations triggering a bonus game.

In some embodiments, the slot machine 10 may also include a player information reader 52 that allows for identification (ID) of a player by reading a card with information indicating his or her true identity. The player information reader 52 is shown in FIG. 1 as a card reader, but may take on many forms including a ticket reader, barcode scanner, QR code scanner, RFID (radio-frequency identification) transceiver or computer readable storage medium interface. Currently, identification is generally used by casinos for rewarding certain players with complimentary services or special offers. For example, a player may be enrolled in the gaming establishment’s loyalty club and may be awarded certain complimentary services as that player collects points in his or her player-tracking account. The player inserts his or her card into the player information reader 52, which allows the casino’s computers to register that player’s wagering at the slot machine 10. The slot machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
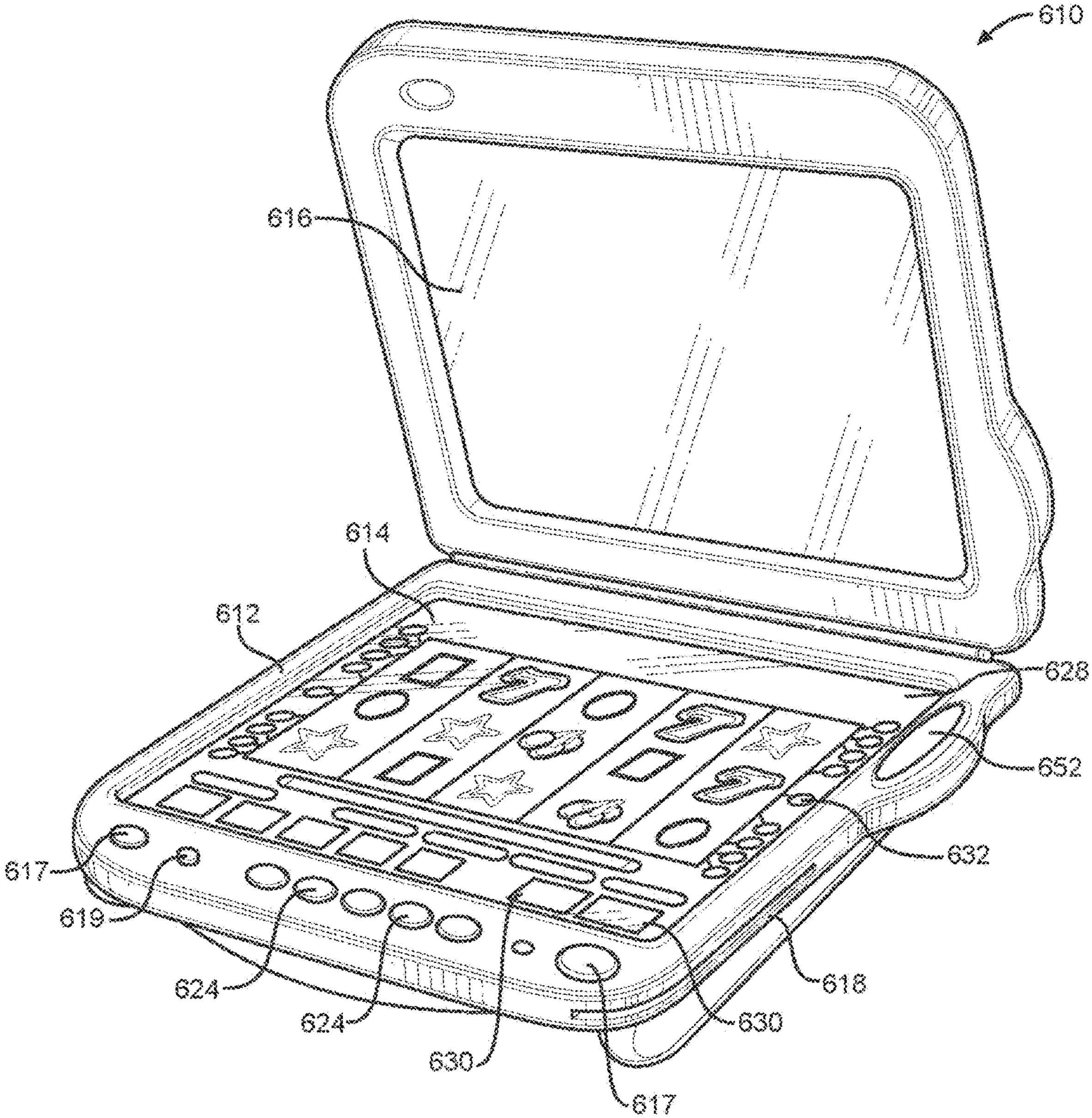
FIG. 2 is a perspective view of a handheld slot machine embodying the example embodiment.

Referring now to FIG. 2, a handheld or mobile slot machine 610 is illustrated. Like the free standing slot machine 10, the handheld slot machine 610 is preferably an electronic gaming machine configured to play a video casino game such as, but not limited to, blackjack, slots, keno, poker, blackjack, and roulette. The handheld slot machine 610 comprises a housing or casing 612 and includes input devices, including a value input device 618 and a player input device 624. For output the handheld slot machine 610 includes, but is not limited to, a primary display 614, a secondary display 616, one or more speakers 617, one or more player-accessible ports 619 (e.g., an audio output jack for headphones, a video headset jack, etc.), and other conventional input/output (I/O) devices and ports, which may or may not be player-accessible. In the embodiment depicted in FIG. 2, the handheld slot machine 610 comprises a secondary display 616 that is rotatable relative to the primary display 614. The optional secondary display 616 may be fixed, movable, and/or detachable/attachable relative to the primary display 614. Either the primary display 614 and/or secondary display 616 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld slot machine status.

The player-accessible value input device 618 may comprise, for example, a slot located on the front, side, or top of the casing 612 configured to receive credit from a stored-value card (e.g., casino card, smart card, debit card, credit card, etc.) inserted by a player. In another aspect, the player-accessible value input device 618 may comprise a sensor (e.g., an RF, radio frequency sensor) configured to sense a signal (e.g., an RF signal) output by a transmitter (e.g., an RF transmitter) carried by a player. The player-accessible value input device 618 may also or alternatively include a ticket reader, barcode scanner, or QR code scanner for reading information stored on a credit ticket, a card, or other tangible portable credit or funds storage device. The credit ticket or card may also authorize access to a central account, which can transfer money to the handheld slot machine 610.

Still other player-accessible value input devices 618 may require the use of touch keys 630 on the touch-screen display (e.g., primary display 614 and/or secondary display 616) or player input devices 624. Upon entry of player identification information and, preferably, secondary authorization information (e.g., a password, personal identification number (PIN), stored value card number, predefined key sequences, etc.), the player may be permitted to access a player’s account. As one potential optional security feature, the handheld slot machine 610 may be configured to permit a player to only access an account the player has specifically set up for the handheld slot machine 610. Other conventional security features may also be utilized to, for example, prevent unauthorized access to a player’s account, to minimize an impact of any unauthorized access to a player’s account, or to prevent unauthorized access to any personal information or funds temporarily stored on the handheld slot machine 610.

The player-accessible value input device 618 may itself comprise or utilize a biometric player information reader, which permits the player to access available funds on a player’s account, either alone or in combination with another of the aforementioned player-accessible value input devices 618. In an embodiment wherein the player-accessible value input device 618 comprises a biometric player information reader, transactions such as an input of value to the handheld device, a transfer of value from one player account or source to an account associated with the handheld slot machine 610, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 618 comprising a biometric player information reader may require a confirmatory entry from another biometric player information reader 652, or from another source, such as a credit card, debit card, player ID (identification) card, fob key, PIN (personal identification number), password, hotel room key, etc. Thus, a transaction may be enabled by, for example, a combination of the personal identification input (e.g., biometric input) with a secret PIN, or a combination of a biometric input with a fob input, or a combination of a fob input with a PIN, or a combination of a credit card input with a biometric input. Essentially, any two independent sources of identity, one of which is secure or personal to the player (e.g., biometric readings, PIN, password, etc.) could be utilized to provide enhanced security prior to the electronic transfer of any funds. In another aspect, the value input device 618 may be provided remotely from the handheld slot machine 610.

The player input device 624 comprises a plurality of push buttons on a button panel for operating the handheld slot machine 610. In addition, or alternatively, the player input device 624 may comprise a touch screen 628 mounted to a primary display 614 and/or secondary display 616. In one aspect, the touch screen 628 is matched to a display screen having one or more selectable touch keys 630 selectable by a user's touching of the associated area of the screen using a finger or a tool, such as a stylus pointer. A player enables a desired function either by touching the touch screen 628 at an appropriate touch key 630 or by pressing an appropriate push button 626 on the button panel. The touch keys 630 may be used to implement the same functions as push buttons 626. Alternatively, the push buttons may provide inputs for one aspect of the operating the game, while the touch keys 630 may allow for input needed for another aspect of the game. The various components of the handheld slot machine 610 may be connected directly to, or contained within, the casing 612, as seen in FIG. 2, or may be located outboard of the casing 612 and connected to the casing 612 via a variety of hardwired (tethered) or wireless connection methods. Thus, the handheld slot machine 610 may comprise a single unit or a plurality of interconnected parts (e.g., wireless connections) which may be arranged to suit a player's preferences.

The operation of the basic wagering game on the handheld slot machine 610 is displayed to the player on the primary display 614. The primary display 614 can also display the bonus game associated with the basic wagering game. The primary display 614 preferably takes the form of a high resolution LCD, a plasma display, an LED, or any other type of display suitable for use in the handheld slot machine 610. The size of the primary display 614 may vary from, for example, about a 2-3" display to a 15" or 17" display. In at least some aspects, the primary display 614 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 614 and/or secondary display 616 may have a 16:9 aspect ratio or other aspect ratio (e.g., 4:3). The primary display 614 and/or secondary display 616 may also each have different resolutions, different color schemes, and different aspect ratios.

As with the free standing slot machine 10, a player begins play of the basic wagering game on the handheld slot machine 610 by making a wager (e.g., via the value input device 618 or an assignment of credits stored on the handheld slot machine via the touch screen keys 630, player input device 624, or buttons 626) on the handheld slot machine 610. In at least some aspects, the basic game may comprise a plurality of symbols arranged in an array, and includes at least one payline 632 that indicates one or more outcomes of the basic game. Such outcomes can be randomly selected in response to the wagering input by the player. As described in more detail below for various example embodiments, the outcomes can also be based on player input and real time or live action content retrieved by the slot machine 610 from a network information source. At least one of the plurality of outcomes determined by the slot machine 610 may be a start-bonus outcome, which can include any variations of symbols or symbol combinations triggering a bonus game.

In some embodiments, the player-accessible value input device 618 of the handheld slot machine 610 may double as a player information reader 652 that allows for identification of a player by reading a card with information indicating the player's identity (e.g., reading a player's credit card, player ID card, smart card, etc.). The player information reader 652 may alternatively or also comprise a bar code scanner, RFID transceiver or computer readable storage medium interface. In one presently preferred aspect, the player information reader 652, shown by way of example in FIG. 2, comprises a biometric sensing device.

Figure 3:
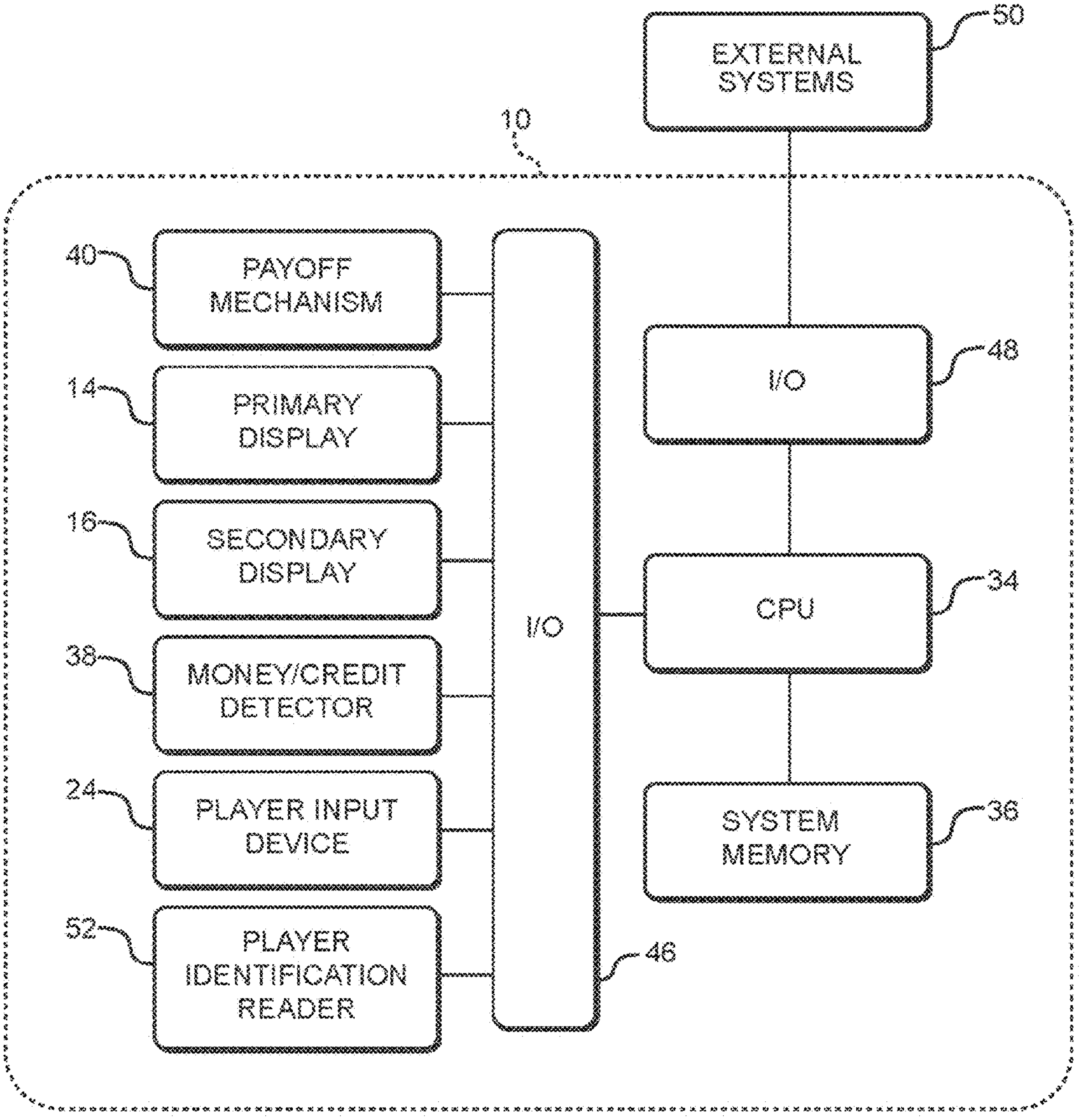
FIG. 3 is a block diagram of a control system in an example embodiment suitable for operating the slot machines of FIG. 1 and FIG. 2.

Turning now to FIG. 3, the various components of the slot machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 can perform the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the slot machine 10. However, as explained above, these components may be located outboard of the housing 12 and connected to the remainder of the components of the slot machine 10 via a variety of different wired or wireless connection methods.

As seen in FIG. 3, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 can be determined by one or more pay tables stored in the system memory 36.

Communications between the controller 34 and both the peripheral components of the slot machine 10 and external systems 50 occur through input/output (I/O) circuits 46, 48. More specifically, the controller 34 controls and receives inputs from the peripheral components of the slot machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, a central server, a central server database, Internet nodes/sites, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the slot machine 10 that may communicate with and/or control the transfer of data between the slot machine 10 and a bus, another computer, processor, or device and/or a service and/or a network. The controller 34 may comprise one or more controllers or processors. In FIG. 3, the controller 34 in the slot machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld slot machine 610 may be similar to the control system for the free standing slot machine 10 except that the functionality of the respective on-board controllers may vary.

The slot machines 10, 610 may communicate with external systems 50 (in a wired or wireless manner) such that each machine operates as a "thin client," having relatively less functionality, a "thick client," having relatively more functionality, or through any range of functionality therebetween (e.g., a "rich client"). As a generally "thin client," the slot machine 10, 610 may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the slot machine 10, 610 processes display information to be displayed on the display(s) of the machine. In an alternative "rich client" configuration, the server determines game outcomes, while the controller 34 on board the slot machine 10, 610 executes game code and processes display information to be displayed on the display(s) of the machines. In yet another alternative "thick client" configuration, the controller 34 on board the slot machine 10, 610 executes game code, determines game outcomes, and processes display information to be displayed on the display(s) of the machine. Numerous alternative configurations are possible such that the aforementioned and other functions may be performed onboard or external to the slot machine 10, 610 as may be necessary for particular applications. It should be understood that the slot machines 10, 610 may take on a wide variety of forms such as a free standing machine, a portable or handheld device primarily used for gaming, a mobile telecommunications device such as a mobile telephone or personal digital assistant (PDA), a counter top or bar top gaming machine, or other personal electronic device such as a portable television, MP3 player, entertainment device, etc.

The above-described slot machines 10, 610 may be used to interact with a wagering game having outcomes that are based, at least in part, on real time or live action event content and related real time features. Various embodiments of these real time or live action wagering games implemented with real time features on slot machines 10, 610 are described in more detail below. The above-described slot machines 10, 610 may also be used to interact with wagering games having fantasy sports gaming features. Various embodiments of these fantasy sports wagering games implemented on slot machines 10, 610 are described in more detail below. The real time features and the fantasy sports gaming features may relate to, for example, a sporting event, a live event, a news event, a political event, social media trending topics, or any other real time or live action event or activity having statistical information that can be tracked. In the wagering games with real time features and fantasy sports gaming features as described herein, the decisions the players are making with the wagering game itself are based on events that are happening at the time the wagering game is being played. In embodiments in which the fantasy sports gaming feature relates to sporting events, various types of game play and wagering options may be provided as described in more detail below. For example, a user may be prompted to select particular players, positions, teams, etc. or to select from particular divisions, conferences, leagues, etc. In these embodiments, the fantasy sports gaming feature can monitor one or more tracked statistics and determine a resultant winner or winners as will be described in greater detail below with respect to FIG. 6 through FIG. 9.

The tracked statistics can be utilized to resolve the user's wager and may be tracked over a period of time. For example, the statistics used to resolve the user's wager may be tracked over a period of seconds, minutes, hours, days, weeks, months, or even years. The statistics may be tracked over a single play or group of plays, or over one or more innings, quarters, periods, halves, or races. Additionally or alternatively, the statistics may be tracked over a single game or group of games, a season or portion(s) thereof, or any time period desired by the operator.

Figure 4:
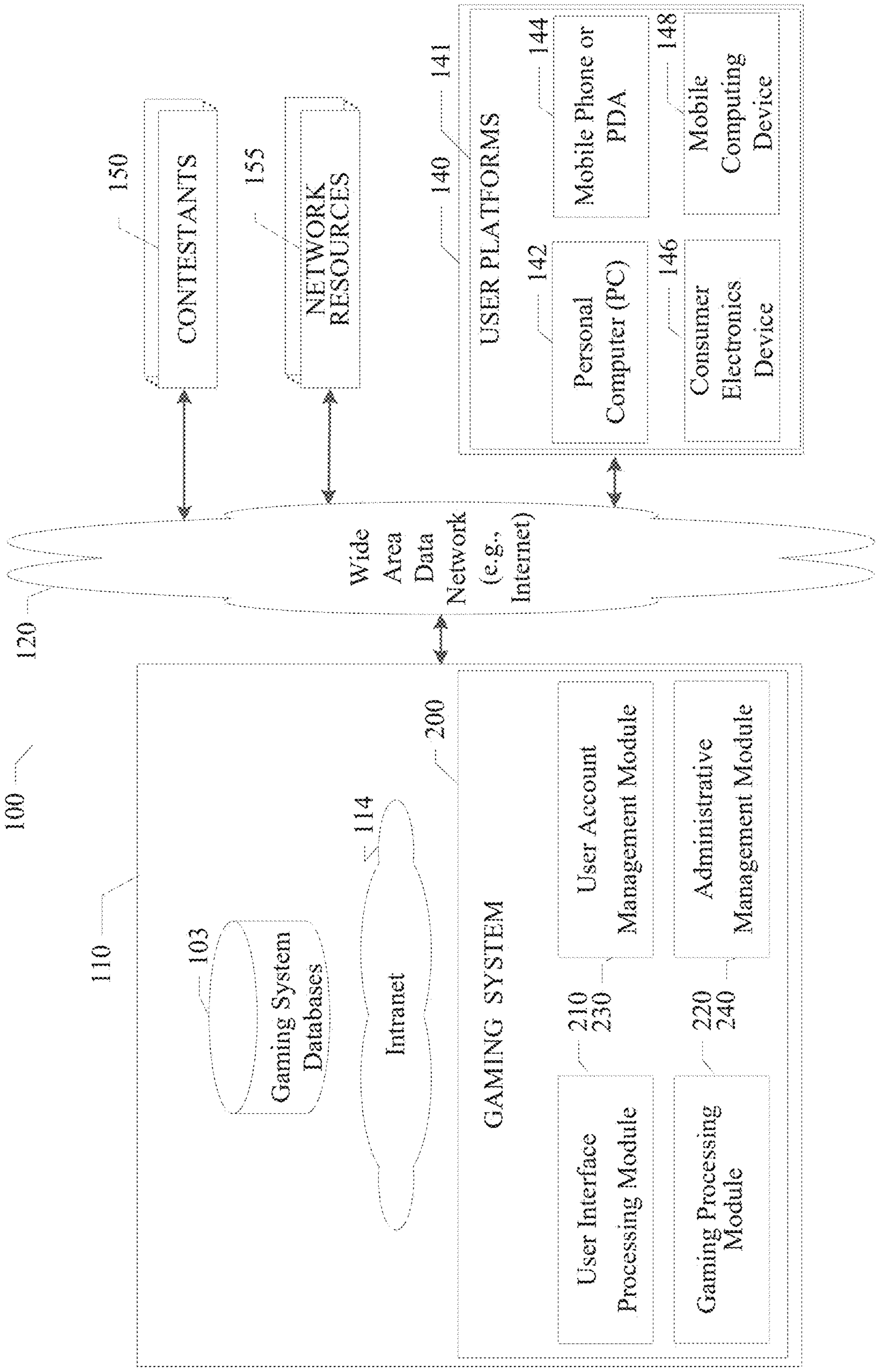
FIG. 4 illustrates an example embodiment of a gaming system in a network-enabled environment.

FIG. 4 illustrates an example embodiment 100 of a gaming system 200 in a network-enabled environment. Referring now to FIG. 4, in an example embodiment, the network-enabled gaming system environment 100 is disclosed. In various example embodiments, an application or service, typically provided by or operating on a host site (e.g., a website) 110, is provided to simplify and facilitate the downloading or hosted use of the gaming system 200 of an example embodiment. In a particular embodiment, the gaming system 200, or a portion thereof, can be downloaded from the host site 110 by a user at a user platform 140. Alternatively, the gaming system 200 can be hosted by the host site 110 for a networked user at a user platform 140. The details of the gaming system 200 of an example embodiment are provided herein.

Referring again to FIG. 4, the gaming system 200 can be in network communication with a plurality of user platforms 140. The user platforms 140 can be implemented as the slot machines 10, 610 described above. A client version of the gaming system 200 can also be implemented within each specialized slot machine 10, 610 itself. As such, the above-described slot machines 10, 610 may be used to interact with a wagering game, implemented within the slot machine 10, 610 itself or implemented by the gaming system 200, wherein the wagering game determines outcomes that are based, at least in part, on real time or live action event content and related real time features. Various embodiments of these real time or live action wagering games implemented with real time features on slot machines 10, 610 are described in more detail below. The above-described slot machines 10, 610 may also be used to interact with wagering games having fantasy sports gaming features. Various embodiments of these fantasy sports wagering games implemented on slot machines 10, 610 are described in more detail below: The host site 110 and user platforms 140 may communicate and transfer data and information in the data network environment 100 shown in FIG. 4 via a wide area data network (e.g., the Internet) 120. Various components of the host site 110 can also communicate internally via a conventional intranet or local area network (LAN) 114.

In an example embodiment, the gaming system 200 can also be in network communication with a plurality of contestants 150 and a plurality of network resources 155. Contestants 150 can represent the network locations of clients or client computing systems being managed by contestants, players, teams, tournament players, or other client users operating an embodiment described herein. For example, in a particular embodiment of the fantasy sports tournament platform as shown in FIG. 4, contestants 150 can represent the network locations of clients or client computing systems of tournament participants, contestants, teams, tournament players, brokers, dealers, agents, or the like. Contestants 150 can participate using the user platforms 140, which can be implemented as the slot machines 10, 610 described above. Contestants 150 can interact with the user interface provided by the gaming system 200 to participate in a real time or live action wagering game and/or a fantasy sports tournament. Network resources 155 can represent the network locations of sources of information related to the real time or live action wagering game and/or the fantasy sports tournament, such as real time event information, real time news information, real time political or social media information, actual team or athlete information, document sources, photos, maps, reviews, statistics, venue information, publications, articles, or other related information associated with the real time or live action wagering game and/or the fantasy sports tournament of the example embodiment.

Networks 120 and 114 are configured to couple one computing device with another computing device. Networks 120 and 114 may be enabled to employ any form of computer readable media for communicating information from one electronic device to another. Network 120 can include the Internet in addition to LAN 114, wide area networks (WANs), direct connections, such as through an Ethernet port or a universal serial bus (USB) port, other forms of computer-readable media, or any combination thereof. On an interconnected set of LANs, including those based on differing architectures and protocols, a router and/or gateway device can act as a link between LANs, enabling messages to be sent between computing devices. Also, communication links within LANs may include optical fiber data lines, twisted wire pairs or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), optical fiber, wireless links including satellite links, or other communication links known to those of ordinary skill in the art. Furthermore, remote computers and other related electronic devices can be remotely connected to either LANs or WANs via a wireless link, WiFi, BLUETOOTH™, satellite, or modem and temporary telephone link.

Networks 120 and 114 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Networks 120 and 114 may also include an autonomous system of terminals, gateways, routers, and the like connected by wireless radio links or wireless transceivers. These connectors may be configured to be moved freely and randomly and to organize themselves arbitrarily, such that the topology of networks 120 and 114 may change rapidly and arbitrarily.

Networks 120 and 114 may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, 4G, and future access networks may enable wide area coverage for mobile devices, such as one or more of client devices 141, with various degrees of mobility. For example, networks 120 and 114 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. Networks 120 and 114 may also be constructed for use with various other wired and wireless communication protocols, including TCP/IP, UDP, SIP, SMS, RTP, WAP, CDMA, TDMA, EDGE, UMTS, GPRS, GSM, UWB, WiFi, WiMax, IEEE 802.11x, and the like. In essence, networks 120 and 114 may include virtually any wired and/or wireless communication mechanisms by which information may travel between one computing device and another computing device, network, and the like. In one embodiment, network 114 may represent a LAN that is configured behind a firewall (not shown), within a business data center, for example.

The gaming system in various example embodiments can be implemented using any form of network transportable digital data. The network transportable digital data can be transported in any of a group of data packet or file formats, protocols, and associated mechanisms usable to enable a host site 110 and a user platform 140 to transfer data over a network 120. In one embodiment, the data format for the user interface can be HyperText Markup Language (HTML). HTML is a common markup language for creating web pages and other information that can be displayed in a web browser. In another embodiment, the data format for the user interface can be Extensible Markup Language (XML). XML is a markup language that defines a set of rules for encoding interfaces or documents in a format that is both human-readable and machine-readable. In another embodiment, a JSON (JAVASCRIPT™ Object Notation) format can be used to stream the interface content to the various user platform 140 devices. JSON is a text-based open standard designed for human-readable data interchange. The JSON format is often used for serializing and transmitting structured data over a network connection. JSON can be used in an embodiment to transmit data between a server, device, or application, wherein JSON serves as an alternative to XML. The Hypertext Transfer Protocol (HTTP) or secure HTTP (HTTPS) can be used as a network data communication protocol.

In a particular embodiment, a user platform 140 with one or more client devices 141 enables a user to access data and provide data and/or instructions for the gaming system 200 via the host 110 and network 120. Client devices 141 may include virtually any computing device that is configured to send and receive information over a data network, such as network 120. Such client devices 141 may include portable devices 144, such as, cellular telephones, smart phones, display pagers, radio frequency (RF) devices, infrared (IR) devices, global positioning devices (GPS), Personal Digital Assistants (PDAs), handheld computers, wearable computers, tablet computers, integrated devices combining one or more of the preceding devices, and the like. Client devices 141 may also include other computing devices, such as personal computers 142, multiprocessor systems, microprocessor-based or programmable consumer electronics, network PC's, and the like. Client devices 141 may also include other processing devices, such as consumer electronic (CE) devices 146 and/or mobile computing devices 148, which are known to those of ordinary skill in the art. As such, client devices 141 may range widely in terms of capabilities and features. For example, a client device configured as a cell phone may have a numeric keypad and a few lines of monochrome LCD (liquid-crystal display) display on which only text may be displayed. In another example, a web-enabled client device may have a touch sensitive screen, a stylus, and many lines of color LCD display in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JAVASCRIPT™, Extensible HTML (xHTML), Compact HTML (CHTML), and the like, to display and/or send digital information. In other embodiments, mobile devices can be configured with applications (apps) with which the functionality described herein can be implemented.

Client devices 141 may also include at least one client application that is configured to send and receive content data or/or control data from another computing device via a wired or wireless network transmission. The client application may include a capability to provide and receive textual data, graphical data, video data, audio data, and the like. Moreover, client devices 141 may be further configured to communicate and/or receive a message, such as through an email application, a Short Message Service (SMS), direct messaging (e.g., TWITTER™), Multimedia Message Service (MMS), instant messaging (IM), internet relay chat (IRC), mIRC, JABBER, Enhanced Messaging Service (EMS), text messaging, Smart Messaging, Over the Air (OTA) messaging, or the like, between another computing device, and the like.

As one option, the gaming system 200, or a portion thereof, can be downloaded to a user device 141 of user platform 140 and executed locally on a user device 141. The downloading of the gaming system 200 application (or a portion thereof) can be accomplished using conventional software downloading functionality. As a second option, the gaming system 200 can be hosted by the host site 110 and executed remotely, from the user's perspective, on host system 110. In one embodiment, the gaming system 200 can be implemented as a service in a service-oriented architecture (SOA) or in a Software-as-a-Service (SAAS) architecture. In any case, the functionality performed by the gaming system 200 is as described herein, whether the application is executed locally or remotely, relative to the user.

Referring again to FIG. 4, the host site 110 of an example embodiment is shown to include a gaming system database 103. The network-accessible central database 103 is used in an example embodiment for data storage of real time event data, tournament data, player or contestant data, group data, award or prize data, configuration data, scheduling data, reporting data, and the like. Database 103 can be in data communication with the gaming system 200 directly or via intranet 114. It will be apparent to those of ordinary skill in the art that the database 103 can represent multiple datasets and can be used for the storage of a variety of data in support of the gaming system 200 of an example embodiment.

Referring again to FIG. 4, host site 110 of an example embodiment is shown to include the gaming system 200. The gaming system 200 can include a User Interface Processing Module 210, a Gaming Processing Module 220, a User Account Management module 230), and an Administrative Management module 240). Each of these modules can be implemented as software components executing within an executable environment of the gaming system 200 operating wholly or in part on host site 110 or user platform 140. Each of these modules of an example embodiment is described in more detail herein in connection with the figures provided herein.

Referring again to FIG. 4, the gaming system 200 of an example embodiment is shown to include a User Interface Processing Module 210. The User Interface Processing Module 210 is responsible for receiving input from a user, contestant, player, tournament player, team, or a network-connectible device, the input corresponding to the selections, parameters, commands, or other wagering game or tournament inputs received from a contestant 150, and for displaying wagering game or tournament data to a user, contestant, player, tournament player, team, or other client user via any of the user interface platforms 141 described above. From the contestants 150, the User Interface Processing Module 210 can receive their contestant-specific information, wagering game selections, athlete or fantasy player selections, and other contestant information associated with the wagering game or tournament and particular rounds in which the contestant is playing. The details of the interactions between the contestants in the wagering game or tournament are described in more detail herein. This contestant-related information can be used to create contestant status records for each contestant of a plurality of contestants 150. The contestant status records can be retained in the network-accessible central data repository 103 and shared with the Gaming Processing Module 220.

Although the various user interface displays provided by the example embodiments described herein are nearly infinitely varied, the descriptions of the user interface displays and sequences are provided herein to describe various features of the disclosed embodiments. These user interface displays and sequences are described herein with reference to example embodiments. It will be apparent to those of ordinary skill in the art in view of the disclosure herein that equivalent user interface displays and sequences can be implemented within the scope of the inventive subject matter disclosed and claimed herein.

Referring again to FIG. 4, the gaming system 200 of an example embodiment is shown to include a Gaming Processing Module 220. The Gaming Processing Module 220 is responsible for managing the operation of the wagering game or fantasy sports tournament and the plurality of rounds played therein. The Gaming Processing Module 220 manages the wagering game contestants and groups of contestants in the fantasy sports tournament, obtains real time and live action event data via the network, calculates contestant standings, records contestant statistics, promotes winning contestants to advanced rounds, and determines the overall winner of the wagering game or fantasy sports tournament. The Gaming Processing Module 220 can also provide notifications to contestants of the wagering game or fantasy sports tournament. The details of the wagering game and fantasy sports tournament operation, the provisioning of contestant groups, the management of multi-contestant rounds, and the management of contestants in the wagering game or fantasy sports tournament are described in more detail herein.

Referring again to FIG. 4 and as described above, a user platform 141 can include a mobile device on which a mobile application (app) can be executed. An example embodiment, implemented as a mobile device app, can be used to support a mobile device user interface for the gaming system 200 of an example embodiment. It will be apparent to those of ordinary skill in the art that other embodiments can also be implemented as a web application (app) with one or more webpages or other types of user interfaces. A mobile version of an example embodiment provides a user-friendly interface from which the user can easily view the relevant contestant/client information from a mobile device. As described in more detail herein, a mobile software application (app) embodying a mobile version of an example embodiment as described herein can be installed and executed on a mobile device, such as a smart phone, laptop computer, tablet device, or the like. In an example embodiment, a splash screen appears whenever the user opens or launches the mobile application on the mobile device. This splash screen can display a host logo and wallpaper image while opening the login screen or a live feed of processed client information.

User log-in functionality in the web application or the mobile app provides a user-friendly user interface in which the user can provide identifying information (e.g., an email address and password) associated with the user account. If the user does not have an account, the user can create an account from this user interface. The process of creating a user account in an example embodiment only requires the user to provide the identifying information (e.g., name, surname, e-mail address, and password). By completing this information, the user can create an account and get access to tournament and contestant information.

Referring again to FIG. 4, the gaming system 200 of an example embodiment is also shown to include a user account management module 230. The user account management module 230 can be used to create and maintain a user account on the host site 110. The user account management module 230 can also be used to configure user settings, create and maintain a client/user profile on host site 110, and otherwise manage user data and operational parameters on host site 110. In the example embodiment described herein, a user can register as an identified contestant in order to share wagering game or fantasy sports tournament information, receive wagering game or fantasy sports tournament information and communications, or interact with other wagering game or fantasy sports tournament-related content or other contestants. The registered user can enter their identifying information during a log-in phase and thereafter can share wagering game or fantasy sports tournament-related content and interact with other contestants.

Referring again to FIG. 4, the gaming system 200 of an example embodiment is shown to include an administrative management module 240. The administrative management module 240 can be used by an agent or administrator of the gaming system 200 to manage user accounts, configure system features, and to manage the operation and configuration of the gaming system 200. The administrative management module 240 can also be used to enforce privacy protections and tournament controls for contestants. Moreover, the administrative management module 240 can also be used to generate and/or process a variety of analytics associated with the operation of the gaming system 200. For example, the administrative management module 240 can generate various statistical models that represent the activity of the community of contestants throughout the wagering game or fantasy sports tournament. These analytics can be shared, licensed, or sold to others.

Figure 5:
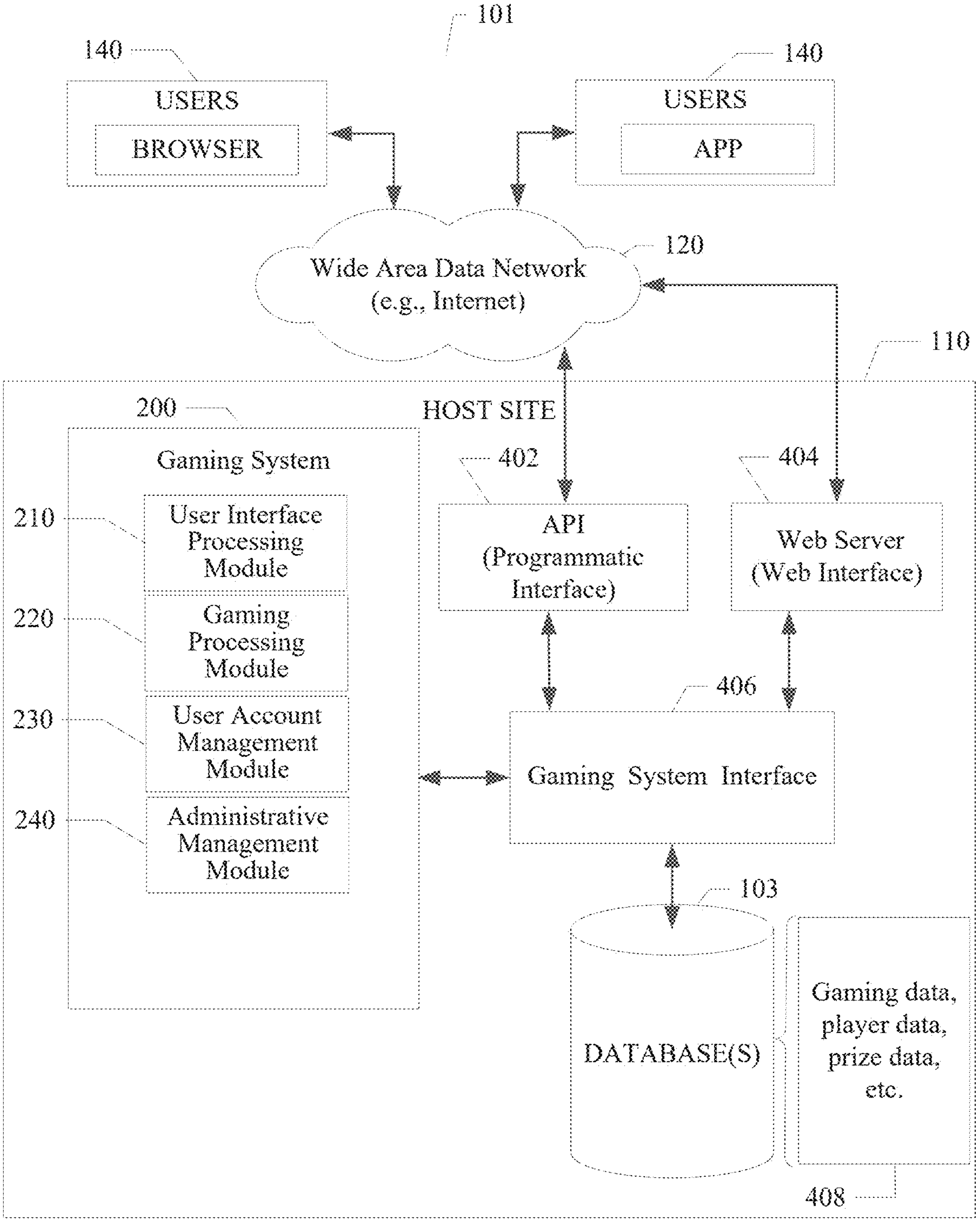
FIG. 5 illustrates another example embodiment of a networked system in which various embodiments may operate.
Figure 6:
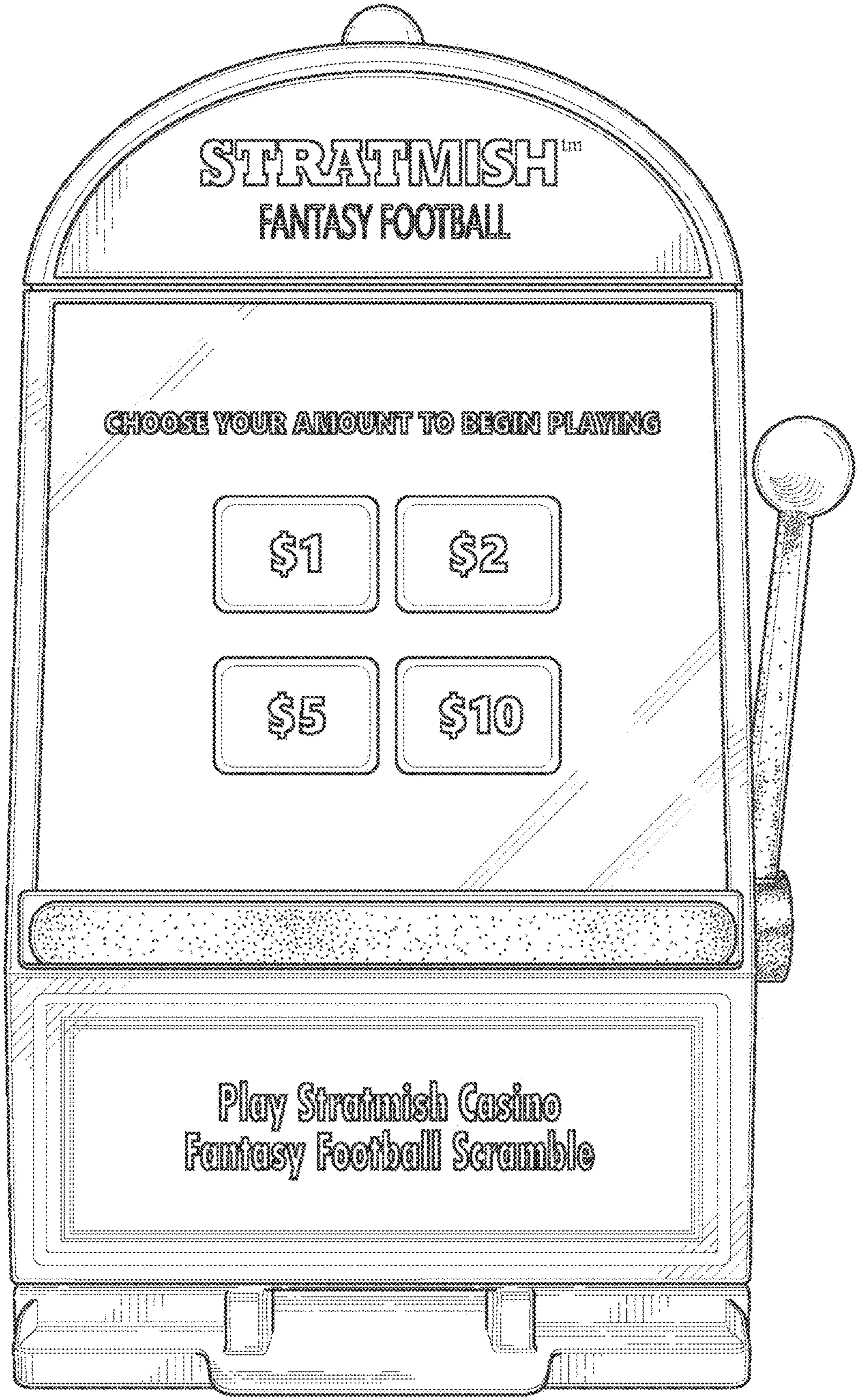
FIG. 6 through FIG. 9 illustrate an example embodiment, implemented as a specialized slot machine, which shows the basic elements of the user interface for implementing a fantasy sports tournament with virtual playing card representations and multi-contestant small group rounds on the specialized slot machine.
Figure 7:
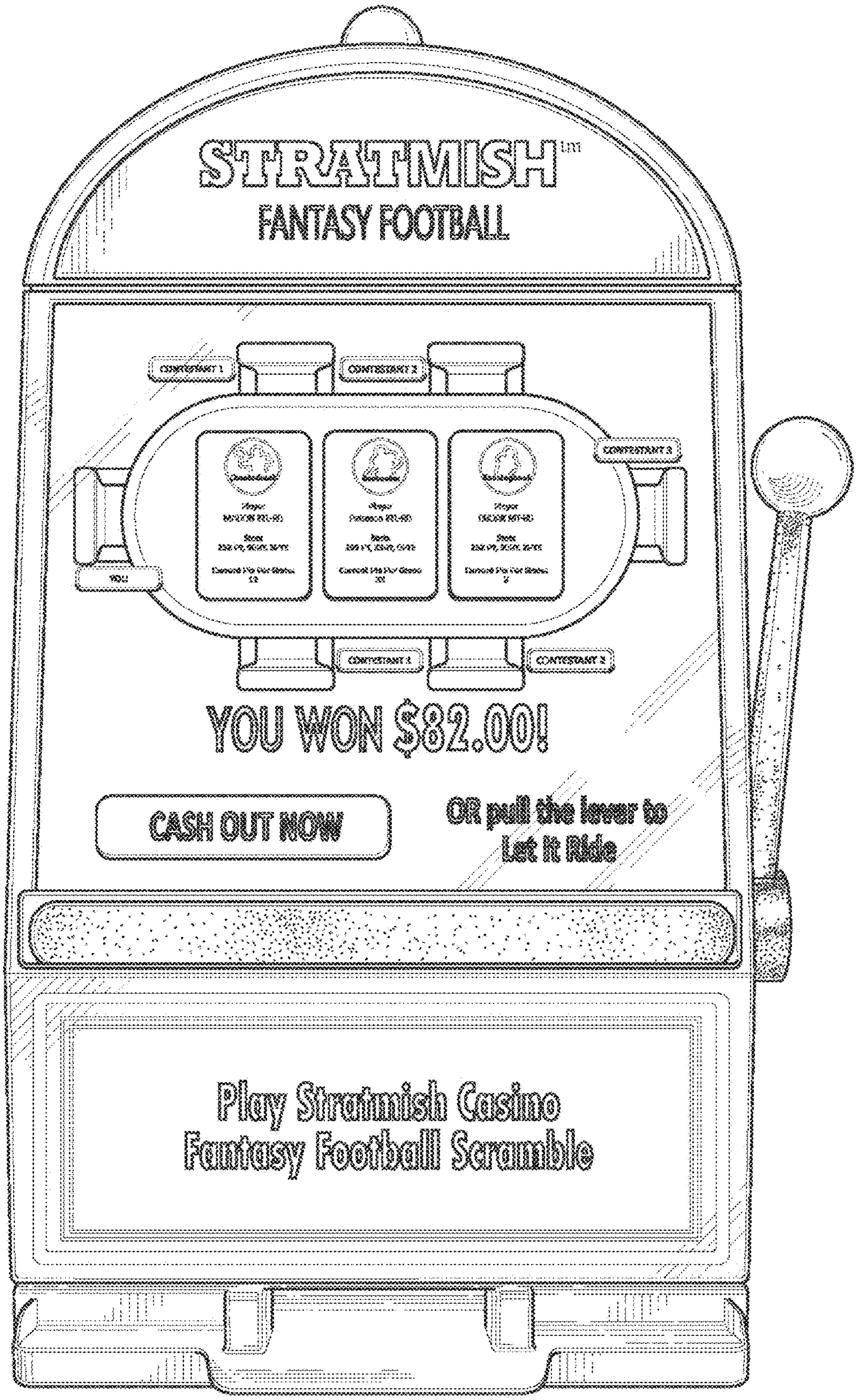
Figure 8:
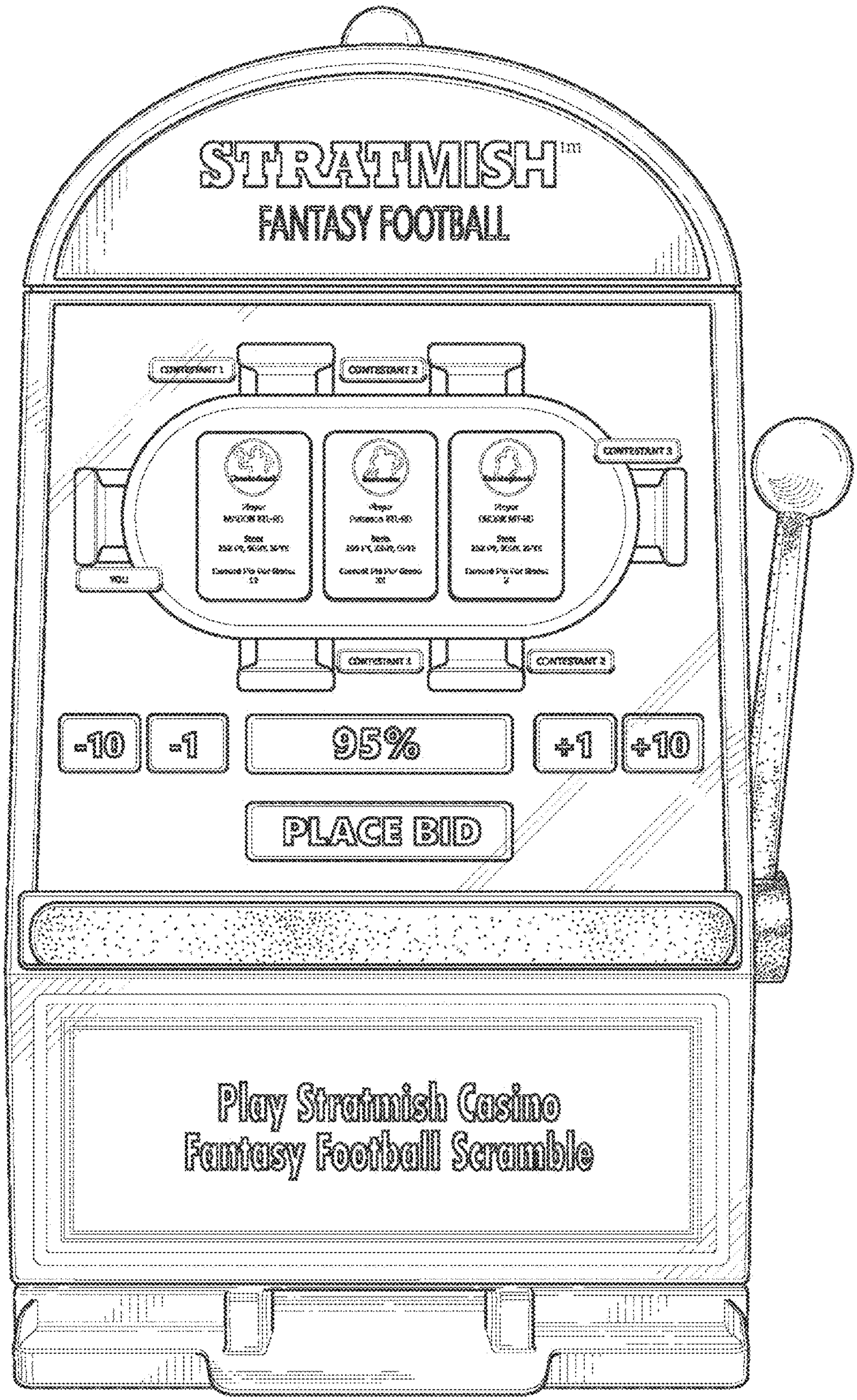

Referring now to FIG. 5, another example embodiment 101 of a networked system in which various embodiments may operate is illustrated. In the embodiment illustrated, the host site 110 is shown to include the gaming system 200. The gaming system 200 is shown to include the functional components 210 through 240, as described above. In a particular embodiment, the host site 110 may also include a web server 404, having a web interface with which users may interact with the host site 110 via a user interface or web interface. The host site 110 may also include an application programming interface (API) 402 with which the host site 110 may interact with other network entities on a programmatic or automated data transfer level. The API 402 and web interface 404 may be configured to interact with the gaming system 200 either directly or via an interface 406. The gaming system 200 may be configured to access a data storage device 103 and data 408 therein either directly or via the interface 406.

>Processes, Formats, and User Interfaces with Virtual Playing Card Representations Used in a Fantasy Sports Tournament on the Specialized Slot Machine of Example Embodiments FIG. 6 through FIG. 9 illustrate an example embodiment, implemented as a specialized slot machine, which shows the basic elements of the user interface for implementing a fantasy sports tournament with virtual playing card representations and multi-contestant small group rounds on the specialized slot machine. The user interface can be used to implement the fantasy sports slot machine format of an example embodiment. The following description provides a general overview of the specialized slot machine format in an example embodiment.

- Fantasy sports specialized slot machines, as described herein, are placed in casinos or other venues throughout the world. These specialized slot machines can be programmed to play whatever fantasy sport a contestant desires to play.
- These specialized slot machines are linked to a central network-accessible database so that contestants competing in a given "group game" can be playing in different casinos/venues throughout the world. In other words, if a person sits down in the MGM™ in Las Vegas, they don't have to sit and wait until their group of six people is filled by people sitting in that particular MGM™ casino. The other five players competing against them can be sitting in casinos/venues anywhere in the world.
- Contestants sit at their own individual fantasy sports specialized slot machine/terminal as described herein. They are given the choice to enter for $1, $5, $20, $50 and $100 contests (or any other entry amount that casinos/venues find attractive for a slot machine).
- When a contestant looks at the display screen of the fantasy sports specialized slot machine/terminal, they will see an image on the display screen, as presented by the user interface logic of an example embodiment described herein, showing a virtual card table with six places (e.g., see FIG. 9). The contestant at the fantasy sports specialized slot machine/terminal will be one of the players occupying one of these six places at the virtual card table presented by the specialized slot machine/terminal.

The contestant puts an amount of money into the specialized slot machine/terminal corresponding to the level of play at which they want to participate. For example, the contestant might put $1 in for the dollar game, $10 in for the ten dollar game, or $20 in for the twenty dollar game, to enter the game.

The contestant then pulls down the handle (or activates a lever or pushes a button on the user interface of the specialized slot machine/terminal) and the specialized slot machine/terminal starts generating a variety of enticing and entertaining graphics that flash around until the contestant has a full group of six other players to play against (who are also playing for the same entry amount). Because the game will fill quickly with players, the graphic display generations, which take about five seconds, will take longer than the time needed to fill a live group of players, which will happen immediately, because the game and the players are linked to casinos/venues throughout the country/world (e.g., geographically distributed).

Groups are always comprised of six contestants in an example embodiment.

The other five contestants, who will fill the remaining five places at the virtual card table presented by the specialized slot machine/terminal, will be anonymous on the display screen in front of a given contestant. The user interface logic will configure the user interface of the example embodiment for each player to identify the different player positions as "YOU", "Contestant #1", "Contestant #2", etc. (see FIG. 9).

The contestants will be instructed by the user interface of the example embodiment that they will see three fantasy sports athletes.

The contestants will be advised that in lieu of live action scoring, each athlete's current fantasy sports points per game average will be used as the fantasy score benchmark for each one of them. If these athletes are competing in a sport not in season, their fantasy point game average from the previous season will be used.

For every group of six competing contestants, the top scoring two contestants in each of these groups are considered winners. There is no distinction between finishing first and second. The top scoring two contestants are both winners and are eligible for the same prize if they choose to cash out.

These two top scoring winners for each group have one of two options. The two top scoring winners can either: 1) cash out by pressing a button (or activating a virtual object on the user interface of the specialized slot machine/terminal) that cashes them out and automatically doubles their money, or 2) they can choose to "let it ride" by pulling the handle (or activating a lever or pushing a button on the user interface of the specialized slot machine/terminal) to form a new group with five other new contestants and try to re-double their money by playing in a new round.

The bottom scoring four contestants of a group are eliminated and lose their money. The bottom scoring four contestants can either leave the specialized slot machine or put more money into the specialized slot machine to play again by playing in a new group of six contestants.

The casino/venue provides powerful motivation in two directions for winning contestants to stay in for another round instead of cashing out. First, winning contestants can "let it ride" and attempt to redouble their money each time they stay in instead of cashing out. Secondly, the specialized slot machine experience of the example embodiment offers another huge incentive for people to stay in. Any contestant who advances ten consecutive times will play in a Tournament of Champions (TOC) sponsored by the casino/venue in which they are playing.

The TOC usually occurs during the playoffs during a given sports real live action playoffs. The TOC's format can use traditional live action fantasy sports or can be conducted the same way that the specialized slot machines operate by using fantasy point per game averages.

The rationale for offering TOC is to provide a huge incentive for contestants to not cash out and to continue playing on the specialized slot machines. The TOC pays out millions of dollars to the winner and other top finishers and is a very attractive incentive for people to try and qualify for (and therefore not cash out).

For clarification purposes, even though contestants might be playing people assigned by a managing entity from other casinos/venues, this doesn't mean that this is a coordinated multi-casino TOC. Each casino/venue hosts their own TOC, which can be run directly from their website, off their own slot machines, or could even be live action in their casino/venue.

The reason casinos are motivated to have contestants NOT cash out is because each time the contestant lets it ride into another round, the percentage of the money the casino/venue takes in goes up significantly. For example, if the two winners from every group always cashed out, the casino would receive a standard 33% of the revenue. If, however, players never cashed out and always let it ride, by round ten the casinos/venues would always receive a staggering 98.3% of the revenue.

The following table shows an example of the casino vs. contestant revenue split depending on the round from which contestants decide to cash out:

| Round | Casino Take | Player Take |
|---|---|---|
| 1 | 33% | 67% |
| 2 | 55.6% | 44.4% |
| 3 | 70.4% | 29.6% |
| 4 | 80.2% | 19.8% |
| 5 | 86.8% | 13.2% |
| 6 | 91.2% | 8.8% |
| 7 | 94.1% | 5.9% |
| 8 | 96.1% | 3.9% |
| 9 | 97.4% | 2.6% |
| 10 | 98.3% | 1.7% |

Note:
It does not matter at what dollar amount a contestant enters the competition. The percentages that each party receives are the same.

Contestants can play up to 15 rounds on a specialized slot machine as they attempt to double their money each new round. This means they can continue to try and re-double their money even after qualifying for the TOC by successfully winning ten consecutive times. If a TOC qualifier loses in rounds 11 to 15, they do not forfeit their TOC seat.

>Specialized Slot Machine for Conducting a Wagering Game Using a Card System and a Fantasy Sports Deck of Cards for Color Blind Players Fantasy sports have exploded over the past 40 years and has become a mainstream activity that has helped boost the popularity of the sports that these games are based on. There is a novel way to play fantasy sports games that has not been introduced to the public yet. This format uses fantasy point per game averages instead of traditional live action scoring for these card games. This allows the games to flow without having to wait for the sports action to happen so the games can be immediately scored. This implies that the card values are already known BEFORE the card game commences. These novel card games can mimic traditional card games like Hearts, Spades, Old Maid, Solitaire, Gin Rummy, Euchre and Crazy Eights while using fantasy sports type of rules and guidelines. These games are fun because they include both traditional card game rules while also incorporating fantasy sports gaming features.

The cards used for these types of games are NOT the cards from a traditional deck of cards. They require a completely different look and feel to them. These cards can be used for non-fantasy sports games as well. These cards must have certain features that are critical for game play. Referring to the example embodiments of the game cards disclosed herein as shown in FIGS. 10 through 14, the features of these new game cards include the following:

1) An understood value for each card that is either on the card or can easily be accessed through a database. For example, a fantasy sports card can use the fantasy sports average of the athlete as its value. For a star from the world of music, the point system can involve record sales, awards and longevity as the point system. For television and movie actors, these cards can have longevity, sales and awards to score the cards.
2) A color scheme for the cards. Instead of suits, the cards are split into different color groups consisting of four to six colors.
3) An identifying mark that links them to other cards. For example, with sports cards, it might be the city they play in, for rock bands, it might be the group name they perform under, for television and movie stars it might be the movie or show they appear in. For a political figure, it might be the party they affiliate themselves with or the state (such as California) they represent.
4) A sketch picture on the card, that is NOT a pictorial representation of the athlete/entertainer/politician on the card that speaks to their craft. For example, a sketch of a baseball player swinging a bat. These pictures help identify the cards and the people they are purposed to depict, without violating trademark laws.

These cards can be used like traditional decks of cards at a table or they can be virtual decks of cards that are played on slot machines, video games and/or Internet games. One of the features of these cards is to provide as many players as possible the opportunity to play these types of games. For this reason, these cards must be displayed in a manner so that color blind players have an opportunity to play as well.

One out of every twelve men in the world are color blind. This represents eight percent of the male population. This issue is not nearly as prevalent with women where only one out of 200 suffering from this affliction. This represents only one half of one percent of the female population.

A traditional deck of cards is marked in a way where color blind people are not at a disadvantage. The four suits are represented by clubs, hearts, diamonds and spades in a manner that does not hinder a color blind player. They simply look for these markers and understand what they mean in a way where they can accurately identify every single card in the deck.

Unfortunately, the ability to distinguish between every card in the deck is not a universal truth for all decks of cards—at least for color blind people. There are some decks of cards, that work much better for certain types of games than a traditional deck, that use colors to distinguish between suits. Card games that use colors to represent suits, instead of these aforementioned symbols, are very difficult to play for color blind players. Anyone who has played the world's most popular color card game, Uno™, has seen how this issue causes problems. Color blind people struggle with this game. The creators of Uno have never come up with a solution to address this problem.

A card game with colors as the identifying markers for suits has tremendous potential for fantasy sports contests. This is due to the enormous popularity of fantasy sports. Even though fantasy sports games are immensely popular, nobody has come up with a format that uses a virtual or traditional deck of cards. This disclosure considers the concept of playing fantasy sports games with a novel deck of cards.

Referring again to the example embodiments of the fantasy sports game cards disclosed herein as shown in FIGS. 10 through 13, the fantasy sports game deck of cards of particular example embodiments can include cards related to particular sports, including football (e.g., see FIG. 10), basketball (see FIG. 11), baseball or soccer (see FIG. 12), hockey or golf (see FIG. 13), or any other sport or activity. The fantasy sports game deck of cards of various example embodiments can include particular characteristics, which facilitate the playing of a fantasy sports game by a variety of players, including color blind players.

The fantasy sports game deck of cards of a particular example embodiment can have the following characteristics:

1) Each card would typically not display the likeness of the athlete or any trademarked information such as the specific team's name that they play on; and
2) Identifying markers displayed on each individual card include some or all of the following information: 1) Athlete name 2) City or state where they play 3) Point value associated with a given card determined by the fantasy points they are worth 4) Position the athlete plays on the field 5) A bonus point system that can use bonuses such as multipliers on athletes increasing their fantasy point value commensurate with the multiplier (such as twice the fantasy points a card is currently worth), matching similar colors or matching similar traits such as athletes being on the same professional or amateur team or playing the same field position as an athlete on another card.

Fantasy sports games are designed where people select the athletes they want—either via a draft or an auction. In either case, it is the contestant who decides which individual athlete they wish to add to their team. A card game changes this dynamic significantly because it introduces the concept of REVEALING a small subset of athletes as singletons or in BLOCS that are available for selection as opposed to the universally followed process where players select INDIVIDUAL athletes from a LIST.

Fantasy sports games are played primarily by men. This fact creates a significant problem for the deck of cards that are disclosed in this discussion. Since eight percent of all men have an issue with color blindness, it is imperative to have a deck of cards that provides solutions for this issue.

This is especially true because the ideal fantasy sports deck of cards will divide suits by colors as they do with the card game Uno.

The best solution for color blind people is to have the color of the card written on the card that displays a given color. For example, as shown in FIGS. 10 through 13, a red card would have the word "red," or some other indicia of a particular color of the card, written directly on the card. This solution has not been used in traditional card decks, either physical cards or virtual cards. Because traditional card decks don't provide indicia of a particular color of the card, there are many people who struggle playing card games. When playing a fantasy sports card game using technology from the virtual world, it is very helpful to have the cards laying on the table instead of moving them to a "selected" pile like traditional card games use. This allows participants the opportunity to analyze different combinations in close proximity to one another. A novel feature that allows this to happen is to give the players the ability to click on the card and have a colored sleeve cover the card so the player can see the contrast between a selected card and a card that is not selected. This novel feature needs an additional component in order for it to be practical for color blind people. The bottom (or top) of the card needs to either have a very light or very dark background. When the card is selected, this background has a dramatic shift from light to dark (or dark to light) so the color blind person can see the obvious contrast in shading in order to differentiate between selected cards and non-selected cards. This technical feature goes a long way towards leveling the playing field between people suffering from color blindness and those who don't.

This novel fantasy sports deck of cards would not use the likeness of any athlete or trademarked team names that they play for. This deck of fantasy sports playing cards has five basic properties included on each card. These markers consist of the following items: 1) Athlete name 2) Athlete's city they play in 3) Value of the card determined by the fantasy points they are worth 4) Position the athlete plays on the field (e.g., a "quarterback" vs "wide receiver in football") 5) Bonus points such as multipliers, similar colors or matching similar traits such as being on the same team or position.

Figure 14:

Referring to FIG. 14, an example embodiment of a card game can be used for non-sports personalities as well, assuming a fantasy points system is established ahead of time. For example, a fantasy rock and roll card game can be created where the card has the name of the performer, the group they are in (which would be the "team" in sports vernacular) and the point system that these musician cards are based on their overall success (including awards they have won) as a group.

This fantasy sports deck of cards in an example embodiment can include, but is not limited to, the following features:

- Card decks can be virtual decks, decks that are an integral part of slot machines or are actual physical decks of cards.
- Card decks can be used for fantasy sports games featuring one or more players using one or more decks.
- Specific card decks of various sizes (number of cards per deck) can be configured for a card game where the cards randomly selected are a subset of the entire available set of cards for a given sport or profession (such as rock musicians).
- Cards are dealt where participants can see the cards displayed both as singletons or blocs (2 or more at a time).
- Cards can be dealt as a subset of the deck where various players in the game have their own unique hand.
- Cards can be dealt as a subset of the deck where some of the cards function as communal cards that are available to all players in the contest.
- Cards can be utilized in a manner in which players can discard certain cards and have them replaced with new cards.
- Cards can be utilized in a manner in which players can discards certain cards and not have them replaced.
- Cards can be utilized in a manner where players have the option of selecting a new card(s) or selecting from a set of discarded cards.
- Cards can be dealt in a manner in where some are face up while others may be face down.
- Card games are scored where combinations of cards where the points are added where the final scores are ranked.
- Undesirable cards can be passed in some of the game play variations from one player to another.
- Cards can be grouped for bonuses for such things as sharing the same colors, athletes sharing the same teams, point multipliers that are associated with them and athletes playing the same positions.
- Cards can be used to play fantasy sports games where folding, bidding, betting, bluffing, holding, having trump suits (via card color) and trump cards are features of the contest.
- Cards can be used to play fantasy sports games where different hands are scored individually and their combined fantasy point score along with any bonuses determines the hand score.
- Cards can be used to play fantasy sports games where different hands are scored individually and combined with the scores from previous hands to determine an overall score.
- Cards can be used to create fantasy sports games that mimic classic card games such as hearts, poker and euchre or fantasy sports games that are unique and don't follow any previously known card game.
- Cards can be used in games where rankings are displayed on a virtual screen and payouts for these rankings are also displayed on this screen.
- Cards can be played in a fantasy sports game where tricks or runs of cards are laid down to be scored.
- Cards can be played in a fantasy sports games where certain cards of a predetermined color have the fantasy sports points of the given athlete counts for negative points (such as all red colored cards) whereas the other colors in the deck count as positive fantasy points (such as the yellow, green, blue and purple cards).
- Certain cards can be designated as cards to avoid (similar to the queen of spades in the game of hearts) because their fantasy points are scored as negative points and may even have a multiplier making that card even more toxic to have.
- Certain cards can have either a positive or negative value depending on how they are combined with other cards (such as the queen of spades in hearts taking on positive virtues if a player shoots the moon).
- The individual cards of a certain color in a fantasy sports game can be considered to be a "suit." Within these suits the cards can be ranked according to their fantasy points value.
- Fantasy sports card games can have decks with a predetermined number of cards where each deck also splits the cards into a predetermined number of suits. For example, a deck of 50 cards can be established for a contest where there are ten cards per suit for a given color and there are a total of five suits with five different types of colors. For example, there might be 10 green, 10 blue, 10 red, 10 yellow and 10 purple cards in the deck.

Fantasy sports card games can be played where everyone in the contest is playing from the same predetermined deck of cards or from different decks of cards where everyone is playing with their own unique deck (such as a double solitaire type of game).

Fantasy sports card games can be played where the values of the fantasy point values of the cards diminish based on how many other people select a given card(s) from a communal set of cards. For example, if only one person selects a given card, this card might be worth 100% of its fantasy point value whereas if three people select the same card(s) its fantasy point value might reduce to 70% where all three players who selected that card receive that card at a 70% value.

Fantasy sports card games where the fantasy point value of the entire bloc (2 or more cars) is determined by a percentage bid. For example, a player might win a bloc of cards with a 40% bid. This means that EACH athlete's fantasy point total from that bloc is worth 40% of their actual fantasy point total.

This patent application discloses various example embodiments showing how a novel deck of cards (physical or virtual) can be used to create compelling games in the very popular genre of fantasy sports games. This disclosure also introduces some novel technical ideas that enhance the ability of color blind people to participate in these games. In particular, the various embodiments disclosed herein provide at least the following advantages and technical improvements:

1) A fantasy sports deck of cards that has technical features included in it that allow color blind people the ability to play any game associated with the deck in a manner where they aren't at a significant disadvantage. This deck of cards has the following identifying markers on it from a fantasy sports perspective: 1) An athlete name is on each individual card 2) The city they play in is on each card 3) A fantasy point value is associated with each card. 4) The position the athlete plays are listed on each card 5) A bonus system that employs multipliers, colors and similar traits (like same football team) are a prominent feature of this card system.
2) A fantasy sports deck of cards where the athletes have an identifying color on the card and also WRITTEN on the card. For example, a red card will have the word "red" written on it to assist color blind people.
3) A colored sleeve for a virtual card deck used on computers that contrasts in color (either light to dark or dark to light) with either the top half or the bottom half of the card. This colored sleeve helps all players compare potentially selected cards with undesirable cards without moving the cards and confusing the other players. It also serves a second purpose by giving an invaluable shading contrast to a color blind player.

Card Game Format in an Example Embodiment

Let's assume nine players competing at a table. To understand how a contest with this deck of cards works, the format for Texas Hold 'Em serves as an instructive example. Any of the novel decks of cards described above can be used. Each of the nine players at the table receives two different hole cards that they uniquely own. Five remaining cards, shared by all players, are then placed down in a manner that mimics Texas Hold 'Em (3 flop cards, followed by 1 turn card and finally 1 river card). After seeing their hole cards, players can either fold and receive 80% of their entry fee back or play on. If they play on, they receive a smaller portion of their entry fee back if they choose to fold later on. If they decide to play on, this initial decision is based almost entirely on the fantasy sports value of the two athletes on the cards. They will then see a 3-card flop. If they fold, they receive 60% of their money back. If they play on, they will, again, receive less money back if they fold later on. The scoring rubric also expands in the decision-making process, because the game is not simply structured around the player who gets the best athletes. This is because players also receive points for matching teammates and creating color combinations. These two additional scoring metrics complement the primary scoring rubric, which is the fantasy point value of the athletes.

An overview of how this structure works is helpful to understand the concept. Let's assume somebody is playing a Spoker football Texas Hold 'Em contest and they have chosen to stay in after seeing their river card. The seven cards they see on the table, for example, are the following athletes, teams, colors and point values:

1) Patrick Mahomes KC—Green Card—27 fantasy points per game average (their hole card)
2) Devin Singletary Buff—Red Card—15 points (their hole card)
3) George Kittle SF—Red Card—16 points (a community card issued during the flop)
4) Brandon Aiyuk SF—Red Card—11 points (a community card issued during the flop)
5) Aaron Rodgers GB—Purple Card—25 points (a community card issued during the flop)
6) Jimmy Garoppolo SF—Red Card—18 points (a community card issued during the turn)
7) Tyreek Hill Mia—Blue Card—20 points (a community card issued during the river)

Players select the best 5-card combo they can put together. Their primary goal is to know the fantasy point values of the athletes since they are NOT listed directly on the cards. Players can utilize a cheat sheet, but because they only have ten seconds to pick their hand, using a cheat sheet may not be a sound strategy. Good players will memorize the fantasy point values of the athletes.

If a given player always selected the five best scoring athletes, this strategy would fail most of the time. For example, it wouldn't be a wise choice to take the five best athletes from the aforementioned hand. If they did, they would end up selecting Mahomes (27 pts), Rodgers (25 pts), Hill (20 pts), Garoppolo (18 pts) and Kittle (16 points). This comes out to 106 points—but the hand has still not been fully scored. Because there are two red cards (Garoppolo & Kittle) this is called a "color pair" and it is worth four additional points. Also, in this example, there are two teammates on the San Francisco 49ers (also Garoppolo & Kittle). This is called a "teammates pair" worth eight bonus points. This player would have a final total of 118 points if they submitted this hand for scoring.

Let's now try a different strategy to select the five cards. A savvy player would know that four red cards is a "4 of a Kind" color bonus worth 24 points and would at least consider trying to build the hand around that fact. In this case, they would select all the red cards-namely, Garoppolo (18 pts), Aiyuk (11 pts), Kittle (16 points) and Singletary (15 points). This comes out to a total of 60 points with one card left to select. On the surface, it seems absurd to leave the best three scoring cards, Mahomes (27 pts), Rodgers (25 points)

and Hill (20 points) completely out of the picture with only one spot left to select. However, this would not be the case though as we explore this option a bit more.

Let's assume they selected the top scoring card (Mahomes) for that final position. These additional 27 points, when added to the 60 points the other four are worth, brings the overall total to 87 points-a far cry from the 118 points the first way to select the hand is worth. Keep in mind they still receive a 24-point bonus for having four red cards. This now brings their total to 111 points. They also have the same 8-point Garoppolo/Kittle teammate bonus that the first hand had and this gives them 119 points for the hand. But, because Aiyuk is also in the mix, this is a "3 of a Kind" teammates bonus of three San Francisco 49er athletes which is worth 24 points instead of the 8. This brings their total to 135 points, which is a much better option than the 118 points for taking the best five cards. One further point: if the person with this hand had the highest overall score of the nine players still remaining (some will fold) in their group, they win the pot of money from all of the entry fees.

The Specialized Slot Machine Tournament Structure in an Example Embodiment

The following description provides a general overview of the specialized tournament structure in an example embodiment:

- There are five bidding sessions for each round of play.
- Contestants bid on three athletes at a time. These groups of three athletes are called "blocs".
- Contestants only get one bloc of three athletes for their entire fantasy lineup.
- The first time a contestant wins a bid, they receive all three athletes that they bid on which completes their lineup. They no longer are allowed to bid on anymore blocs of athletes. A black circle will be placed by their position on the specialized slot machine display screen indicating that they are done trying to secure a bloc.
- The specialized slot machine begins the selection process by shuffling the deck and laying down the first three cards.
- All six contestants have the option of making a percentage bid (the maximum range is from 1% to 100%) on the three athletes or passing on them with a "No Bid".
- Contestants have 30 seconds to make a bid. In order to make the bid official, a contestant pulls the lever of the specialized slot machine (or otherwise activates a button or an object displayed on the display screen of the specialized slot machine). If a contestant fails to make a bid during the allotted time, the contestant automatically receives a "No Bid". Bids are time stamped based on the time when the lever was pulled (or other object was activated) to break ties.
- Because contestants only have 30 seconds to bid for each of the five rounds, the entire game only takes two minutes and thirty seconds for the bidding process.
- The percentage bid cannot be a decimal or a fraction. It must be a whole percent.
- Contestants will either have a green, red or black circle by their spot on the display screen at all times. A green circle denotes that they have turned in their bid. A red circle denotes that they have not yet submitted their bid. A black circle denotes that they have already secured their bloc from a previous round.
- The lowest bid wins the entire bloc of three athletes. If there is a tie amongst two or more contestants for the best bid, the contestant who submitted their bid first receives the bloc.
- If none of the contestants bid on a bloc, this bloc will be reintroduced later as a "mulligan" (see below for a more detailed explanation on a mulligan). In other words, there will not be a new group of three athletes that replaces a bloc that has no bidders.
- Once a contestant wins a bloc of three athletes, they have a complete lineup and are ineligible to bid anymore. A black circle will be placed by their spot on the card table to indicate they are no longer eligible to bid anymore.

Why doesn't a contestant just bid 1% on the first bloc of athletes that they really like? If the lowest bid wins, this seems like a no-brainer strategy that will automatically secure the athletes that they desire by submitting the lowest percentage which is 1%. However, this strategy would be counter-productive and would virtually guarantee that the contestant would come in last place. The reason for this is because the percentage bid serves two purposes. The bid not only secures athletes by having the lowest bid, but the bid also severely penalizes contestants for making unreasonably low bids. For example, a 1% bid will undoubtedly win a contestant the athletes that they desire, but this bid also represents the percentage of each athlete's fantasy points that they are eligible for in the game itself. For example, if someone bids 1% to win a fantasy football group they desire such as Peyton Manning, Calvin Johnson and Marshawn Lynch, they will be terribly disappointed to learn that they also only get 1% of the fantasy points that each of these three athletes scored in their respective games. As a result, a value of the contestant's bid, as represented by the percentage bid, is used to discount or reduce the contestant's score or quantity of points received by a corresponding amount. In this manner, a contestant bidding at a minimal level will also only receive a score or quantity of points at a correspondingly minimal level.

In the example embodiment, the setup may not seem fair in one critical way. For example, a bloc of three athletes could potentially have three duds like all kickers for a football contest while another bloc of three athletes has all high value athletes like quarterbacks for the same competition. Isn't this absurd since quarterbacks are much more valuable than kickers? In the example embodiment, the described format actually turns the selection process into a riveting high wire exercise where skill becomes a major factor. Think of these groups of athletes as stocks. The more valuable the stock, the more aggressive the bidding will be. The correct price will be set by the bids. Three kickers at 95% of their fantasy points might be more valuable than three quarterbacks at 12% of their fantasy points. This bidding process creates a tremendous amount of strategy for participants to consider.

In the example embodiment, two additional rules heighten the drama of the tournament format implemented on the specialized slot machine. These additional rules are described below:

- Blocs can have multipliers on them for each athlete in a bloc. The ranges of multipliers for the entire blocs will vary from 6× (read "6 times") all the way to 10×. They aren't assigned uniformly to each athlete in the bloc, though. The multipliers will be split up and have different levels of intensity on individual athletes. For example, the specialized slot machine might flash that the multiplier is 7×, which means that the three athletes shown (e.g., see FIG. 9) will have multipliers that have a sum total of 7×: however, their placement will be random as will their intensity (or value) on each athlete. For the 7× example, this means that the total on the multipliers for the 3 athletes must add up to seven. It could be that the first athlete is worth 1× their fantasy point total, the second athlete 5× and the third athlete 1×. It could also be 2×, 2× and 3× respectively. Using the later example, this means that the first card turned over would mean the athlete would be worth double their fantasy score. The second card turned over would mean the athlete would be worth double their fantasy score. The third card turned over would mean the athlete would be worth triple their fantasy score. (Note:

Fantasy score is defined as the percentage of fantasy points a group of athletes is eligible for that was determined by the bid for which the bloc was secured.)

For each new round, the maximum bid possible will be 8% less than the previous round. The specialized slot machine will show the bidding range for each round. For example, for the first round, the specialized slot machine will give the range as 1% to 100%. By the fourth round, this range will be down to 1% to 76%. This creates an urgency to get involved in the bidding process for each round, but also have enough skill to know what a proper bid is for a given bloc so that it isn't secured with an unreasonably low bid. After five rounds of bidding have occurred, the last person remaining in the group without a bloc automatically gets the last bloc that wasn't bid on for 60% of the fantasy points for each athlete in the bloc.

Table Showing Max and Min Bidding Percentages Allowed Each Round

| | Maximum Bid Allowed | Minimum Bid Allowed |
|---|---|---|
| Round 1 | 100% | 1% |
| Round 2 | 92% | 1% |
| Round 3 | 84% | 1% |
| Round 4 | 76% | 1% |
| Round 5 | 68% | 1% |
| Last Contestant Remaining | No Bid-Automatically receives bloc at 60% | No Bid-Automatically receives bloc at 60% |

Given the description of the example embodiment as provided above, one might think that the game is unfair if some blocs might have as low as a 6× multiplier while others might be as high as a 10× multiplier. However, this feature of an example embodiment makes the game even more strategic. Now, contestants will have to factor into the calculus the fact that a bloc of strong athletes might be diminished in value because they have a smaller multiplier and a more mediocre group might be increased in value because they are more valued by a higher multiplier. Even if a strong group of athletes has a 10× multiplier, this won't be a problem. The appropriate percentage bid for this bloc will be significantly lower than the norm. Conversely, a mediocre bloc of athletes with a small multiplier should be able to be secured with a bid considerable higher than the norm.

In the example embodiment as described, somebody is going to eventually get a bloc: because, there is exactly one bloc every contestant—everybody is going to eventually need a lineup. All blocs not bid on are called "mulligans" and will be reintroduced after all the blocs have been revealed. If there is more than one bloc for which a bid is not received, the blocs are reintroduced in the order that they first appeared. Also, the maximum bid for a new round does not go down 8% if the previous bloc was a mulligan. When the blocs not bid on are reintroduced and all six blocs have been shown and either bid on or passed on, the maximum bid for the reintroduced blocs go down 8% each time a new one is reintroduced and bid on. If there is a tie for a final position, amongst tied players, the person who secured their bloc in the lowest or latest round advances.

Once the bids are received from the contestants in a group for a particular round, the six contestants in the group are scored for final positions. The specialized slot machine of an example embodiment can gather the data for all athletes in the contest and then compute the final positions. This computation will take no more than five seconds after all contestants have secured their blocs. The specialized slot machine can tabulate the scores for all of the athletes and then add the three scores together for each bloc of athletes. Each contestant will then be ranked 1-6 (one through six) on the specialized slot machine user interface screen (e.g., see FIG. 7 through FIG. 9). For example, to tabulate the score of a single athlete, three components of information are required. First, the athlete's average fantasy game score has to be a part of the database linked to the managing entity website for easy retrieval. The second component of information needed is the bid with which the athlete was secured. Finally, the multiplier on the athlete has to be included in the computation. Using football as an example, let's assume Tom Brady has a running fantasy game point total of 10. Then assume he is secured at 68% of his fantasy points and the multiplier on him is 3×. Since 68% of 10 is 6.8 and when 6.8 is multiplied by 3, the result is 20.4. This means that Brady's score would be added to the other two athletes in his bloc for a final score to be posted for that contestant. Finally, tied positions always are broken by awarding the person who secured their bloc in the later round the higher spot.

The Specialized Slot Machine Tournament Structure in an Alternative Example Embodiment The following description provides a general overview of the specialized slot machine tournament structure in an alternative example embodiment. In an alternative embodiment of the specialized fantasy sports slot machine as described above, the alternative slot machine embodiment includes everything described above, but adds one more variable. This alternative embodiment calls for contestants to create the groups upon which the contestants bid. The process for this alternative embodiment is described below.

There are 18 cards in a deck.

Contestants see all 18 of the cards on the user interface screen ahead of time.

Each contestant creates one of the six blocs that will be introduced in the bidding process.

Contestants select three of the 18 athletes to represent the bloc that they created for the bidding process. They have 30 seconds to make their picks.

The selection process is "blind" so none of the six contestants in a group knows what the other members of the group are selecting.

Once a contestant creates their bloc of three for the bidding process, they pull the specialized slot machine's lever (or otherwise activate a button or displayed object).

If a contestant does not select a bloc of three athletes within the 30 second time limit, a bloc of three will be selected for them by the specialized slot machine.

Once all six contestants have created a bloc, the game is set to begin.

It is important to note that just because a contestant creates one of the six blocs, that doesn't necessarily mean that this bloc will be the bloc that they end up securing for the fantasy sports contest. The bloc that they do receive will be determined by the bidding process.

This process creates the possibility that some of the 18 athlete cards were not selected while others were selected more than once.

These six blocs that were created by contestants are introduced randomly and follow all of the rules of the process that was described previously—with one notable exception. The athletes in a given bloc might not all be worth 100% of their fantasy point per game value to begin with. This value is determined by how much a given athlete is duplicated.

When a bloc of three athletes is introduced, if a given athlete was selected only once for a bloc, they will be worth 100% of their fantasy sports point per game value. If on the other hand they are duplicated and the given athlete was selected more than once for a bloc, each time they are duplicated, they will be worth 20% less of their fantasy point per game average for each time this duplication occurs.

The percentage of each individual athlete's fantasy points that are available at any given time (based on this duplication penalty) will be prominently displayed on each athlete card as the blocs of three athletes are introduced during the bidding process.

The way an individual athlete is scored in the alternative embodiment is as follows: Let's assume Drew Brees fantasy points per game average is 19.7 points per game. Let's also assume that Brees is introduced by two of the six members of the group for a bloc that they submitted. This means Brees fantasy points available is at 80% or 15.8 points. The final two components are computed as follows: Let's assume the entire bloc was secured by someone who bid 68% and the multiplier on Brees is a four. Because 68% of 15.8 is equal to 10.7, this represents Brees total score before his multiplier is factored in. With the multiplier factored in, the score comes out to 42.8.

The table below shows the duplication penalties for each time an athlete is duplicated during the formation of the blocs.

| | 1× | 2× | 3× | 4× | 5× | 6× |
|---|---|---|---|---|---|---|
| % | 100% | 80% | 60% | 40% | 20% | 0% |

Note:
"3x" is read as "three times" which represents the number of times an athlete is selected by one of the six members of the group. In this case, the duplicated athlete would appear in three of the six blocs that are introduced for bidding and each time they appear this athlete would only be worth 60% of their fantasy point value-a strong point to consider when contestants make their bids.

The fantasy sports slot machine embodiments as described herein provide a unique idea that has never been seen in the market. In order to make the fantasy sports slot machine embodiments possible, there are four key elements that are new to the fantasy sports genre that these embodiments introduce and that support the implementation. These four key elements include the following:

1) The fantasy sports slot machine of an example embodiment provides a novel format of contestants playing in small groups of three or more participants—Fantasy sports contests have always been contested in one of two ways—both of which mimic real life sports. They either are conducted using a head-to-head format or they are configured where the entire field plays against each other simultaneously. Again, the reason why these two formats have emerged is because these are the formats for how real live sporting events are contested and fantasy sports contests have always tried to come as close as possible to mimicking reality. Of the two, the head-to-head format is the most common way real life sports are contested—for both team and individual competitions. For example, in team sports competitions, there are never three (or more) baseball teams playing each other simultaneously. That would be unheard of. There are always two teams competing against one another on the baseball diamond. Similarly, this structure applies to hockey, soccer, basketball, football, and quite frankly, most other sports. The same head-to-head format also is also quite prevalent for individual sports such as tennis (both singles and doubles), bowling, fencing, table tennis, boxing, wrestling, etc.

The other real live sports format that fantasy sports tournament organizers have copied is the "entire field" concept. An entire field event is when real live sports are contested in a manner where individuals or teams have to compete against the entire field at one time. While this is not nearly as prevalent as the head-to-head format, it is still quite often used. Examples of this are golf, cycling, gymnastics, swimming, track and field, etc. Teams or individuals compete in one huge event and they are then ranked according to either their finish or their final scores. Fantasy sports tournament organizers have tried to re-create the real live action formats that are used in sports to appeal to those who like to participate in fantasy sports events. For this reason, they have always configured their offerings to mimic these real live sporting events by either using a one-on-one format or an "entire field" format. However, as described herein, there is another way that makes the specialized slot machine format work and it is a concept that is unique to the industry. This unique format is also counter-intuitive to how real life sporting events are contested and is why nobody has ever done this before. The novel method of a fantasy sports slot machine format as described herein is to have small groups of three or more contestants competing against one another at the same time. Again, this is counter-intuitive to real live sports because it makes no sense in real life for the Dolphins, 49ers and Jets to be playing each other in the same football game. For this exact reason, nobody has thought about having Bob, Steve and Mary compete against each other in the same fantasy sports match because this configuration doesn't mimic real life sports.

2) The fantasy sports slot machine of an example embodiment provides a novel format wherein a portion of an athlete's fantasy points are or can be scored. Fantasy sports games have always been an all or nothing proposition. Contestants who "own" a certain athlete have always received all of the fantasy points that their athlete scored in their real live sports competition. Conversely, contestants who don't own an athlete receive nothing or zero points for them. This is a very valuable tool that helps make a fantasy sports slot machine implementation possible. This method involves giving contestants a portion or fraction of the fantasy points that a given athlete that they have secured scores. This fractional scoring method of an example embodiment can be implemented in two different ways as described below.

a. Percentage Bids—This is a bidding process where the bids involve taking a percentage of the athlete's fantasy points. In accordance with this method, contestants, in order to secure an athlete, make a percentage bid on a given athlete. The rules dictate that the contestant who submits the lowest percentage bid secures that athlete for their lineup. For example, if three contestants bid, 68%, 81% and 98% for a given athlete, then two things happen. First, the contestant who made the 68% bid receives that athlete in their fantasy sports lineup. Secondly, the contestant only receives 68% of the fantasy points that this athlete scores in the competition. As a result, a value of the contestant's bid, as represented by the percentage bid, is used to discount or reduce the contestant's score or quantity of points received by a corresponding amount. In this manner, a contestant bidding at a minimal level will also only receive a score or quantity of points at a correspondingly minimal level.

b. Duplication Penalties—This format allows fantasy contestants to share athletes instead of owning them exclusively, but there is a price to pay when duplication occurs. Each time an athlete is duplicated, their fantasy point value goes down a set predetermined percentage.

3) The fantasy sports slot machine of an example embodiment provides a novel format wherein fantasy sports matches are contested using fantasy game point averages instead of always using real live action scoring—People love fantasy sports because the games are fun. Who says though that fantasy sports games have to solely be based on live competitions in the real world? Why can't contests be based on averages that athletes already have with their fantasy point per game averages? Using point per game averages helps open the door for a fantasy sports slot machine to work. Instead of having to wait until a real live sports game is actually on or actually in season, people can go to a fantasy sports slot machine anytime and play.

4) The fantasy sports slot machine of an example embodiment provides a novel format wherein blocs of athletes for a lineup can be selected through an auction process. Fantasy sports contests have always operated one of two ways, either: a) contestants select their entire lineup and submit it, or b) they draft athletes individually to create their "team". As provided by the example embodiments as described herein, there is another way that makes the fantasy sports slot machine work. Under this example embodiment, contestants are shown groups of two or more athletes to be evaluated simultaneously. The contestants who are interested in this "bloc" have to evaluate the comparative strength of the entire unit over other potential ones. This process creates a new twist because contestants are now forced to put a value on a unit that has multiple moving parts. This is not a part of traditional fantasy sports play, but creates a critical gaming component for a fantasy sports slot machine.

> An Example Embodiment Providing a Specialized Slot Machine for Implementing: A Fantasy Music Legends Tournament FIG. 6 through FIG. 9 illustrate an example embodiment, implemented as a specialized slot machine, which shows the basic elements of the user interface for implementing a tournament with multi-contestant small group rounds on the specialized slot machine. The specialized slot machine and the user interface thereon can be used to implement a variety of different tournament formats on the specialized slot machine of an example embodiment. The following description provides a general overview of one such tournament format in an example embodiment.

A Fantasy Music Legends Tournament is a tournament format for any genre of music. A given tournament can be designed for a specific genre like Rock & Roll, Pop, Rhythm & Blues, Country, Rap, etc. There can also be an "Open" tournament that allows all genres to be incorporated into one tournament. This concept can be a marketing tool for a company or it can be a standalone tournament that charges an entry fee and offers cash prizes for the top finishers of the Tournament of Champions (TOC). If it is used as a marketing tool, the tournament can offer interesting music perks for the top finishers. For a Rap tournament, the overall winner might win an all-expenses paid trip somewhere to see Jay Z perform and also hang out with him before and after the show. A top overall winner might have a different kind of top prize, such as winning a rare guitar for their efforts. The key components as a marketing tool are to allow contestants special perks. These perks will allow them to compete in a smaller group size than is normally required or skip a round(s) entirely. Contestants can take advantage of these perks by purchasing something off a particular website. When they do so, they are allowed to skip a round (or two) or play in a smaller group for the next round. For example, someone might be able to play the next round against only 9 people instead of the standard 12 if they purchase a song. They might be able to skip 2 rounds if they buy concert tickets. Legendary musicians eligible to be picked for a Fantasy Music Legends Tournament are any people who have played in a group with two or more people who had at least 1 hit in the top 40 in the United States in their genre of expertise. For example, Adam Ridgeley would be eligible because he was a member of Wham and has had at least one hit song that made the Billboard Hot 100 chart for his genre in the U.S. In the example embodiment, the tournament does not disqualify someone if their "band" is missing a piece (like a drummer) that is usually associated as a key component of a typical band. For example, the Carpenters are considered a "band" by the definitions of this game. Some legendary musicians have played in more than one band. For example, Paul McCartney played with The Beatles and with Paul Mccartney and Wings. For this reason, Legendary Musicians score fantasy points for all bands in which they participated.

The Fantasy Music Legends Tournament Structure in an Example Embodiment

The following description provides a general overview of the Fantasy Music Legends Tournament structure in an example embodiment.

Fantasy players are placed in groups of twelve players

Fantasy players submit four starters—one Lead Singer, one Drummer, one Guitar Player, one Wildcard (can be anyone)

Top three scores in a group advance to the next round—the rest are eliminated

Tiebreakers

Fantasy players that tie for a top three position will use the following tiebreaker process in an example embodiment:

1st tiebreaker—Fantasy Player with the higher ranking in their profile.

2nd tiebreaker—Contestant with the highest ever Fantasy Band Legends score from the IP address involved in the tie.

3rd tiebreaker—Contestant who has submitted the most entries ever from the IP address involved in the tie.

4th tiebreaker—Computer generated coin flip.

Fantasy Band Point Values

All fantasy players in a group will submit their lineups via a blind submission process (i.e., submissions won't be known to players until ALL players in a group have submitted their lineups).

Duplication is permitted.

The more duplication that occurs for a given Legendary Musician the LESS their actual fantasy points they scored will be worth.

Contestants will be given a percentage of the fantasy points their Legendary Musician scored depending on how many other fantasy players selected that SAME Legendary Musician. This is called their Adjusted Fantasy Score. Each time a Legendary Musician is duplicated, he/she will be worth 9% LESS of their fantasy points. For example, using the table below, if 12 fantasy players in a group are playing in a match and 4 of them select Keith Richards to be their guitarist, then each of them will receive 73% (see box highlighted in yellow below) of the fantasy points that Richards scores.

Scores for individual Legendary Musicians will be rounded to the nearest hundredth.

Below is a grid that shows what percentage of Legendary Musician's points a given contestant receives depending on how many other competitors selected that Legendary Musician.

TABLE 1

| Percentage of Fantasy Points a Legendary Musician is Worth Based on Duplication of Legendary Musicians Selected | | | | | | | | | | | | |
|---|---|---|---|---|---|---|---|---|---|---|---|---|
| | Rock Legend selected 1×* | 2× | 3× | 4× | 5× | 6× | 7× | 8× | 9× | 10× | 11× | 12× |
| 12 player Group | 100% | 91% | 82% | 73% | 64% | 55% | 46% | 37% | 28% | 19% | 10% | 1% |

*Note:
1× is read as "one time" which means a given Legendary Musician was selected by exactly 1 of the 12 competitors The table below shows the starting Legendary Musicians in the Pop/Rock category that a 12 person group selected. The percentage under each musician's name represents the percentage that the fantasy player will get to keep of the actual fantasy points that their given Legendary Musician scored. This percentage is based on the number of times a Legendary Musician was duplicated and is taken directly from the above table (Table 1). It is important to note that if a Legendary Musician performed in more than one band and also had a solo career (e.g., Eric Clapton—The Yardbirds and Cream and a distinguished solo career), all of their works and honors will be computed in their fantasy score.

TABLE 2

| Percentage Values Legendary Musicians Keep Based on Duplication for Groups of 12 | | | | |
|---|---|---|---|---|
| | Vocals 1960's | Guitar 1960's | Drummer 1980's | Wildcard 1970's |
| Fantasy Player 1 | Mick Jagger<br>The Rolling Stones<br>91% | Keith Richards<br>The Rolling Stones<br>73% | Rick Allen<br>Def Leppard<br>82% | Clarence Clemmons<br>E Street Band<br>73% |
| Fantasy Player 2 | Paul McCartney<br>The Beatles<br>82% | Angus Young<br>AC/DC<br>100% | Ringo Starr<br>Beatles<br>100% | Mary Wilson<br>Heart<br>100% |
| Fantasy Player 3 | Eric Clapton<br>Cream<br>73% | Bob Weir<br>Grateful Dead<br>91% | Rick Allen<br>Def Leppard<br>82% | Barry Gibb<br>Bee Gees<br>100% |
| Fantasy Player 4 | Paul McCartney<br>The Beatles<br>82% | Keith Richards<br>The Rolling Stones<br>73% | Phil Collins<br>Genesis<br>91% | Clarence Clemmons<br>E Street Band<br>73% |
| Fantasy Player 5 | Michael Jackson<br>The Jackson 5<br>91% | Deen Castronovo<br>Journey<br>100% | Gina Schock<br>Go Go's<br>100% | Daryl Dragon<br>Captain & Tennille<br>100% |
| Fantasy Player 6 | Annie Lennox<br>Eurythmics<br>100% | Eric Clapton<br>Cream<br>73% | Keith Moon<br>The Who<br>100% | Alec John Such<br>Bon Jovi<br>100% |
| Fantasy Player 7 | Brian Wilson<br>Beach Boys<br>100% | Jimmy Page<br>Led Zeppelin<br>100% | Phil Collins<br>Genesis<br>91% | Dennis De Young<br>Styx<br>91% |
| Fantasy Player 8 | Eric Clapton<br>Cream<br>73% | Keith Richards<br>The Rolling Stones<br>73% | Rick Allen<br>Def Leppard<br>82% | Steven Tyler<br>Aerosmith<br>100% |
| Fantasy Player 9 | Mick Jagger<br>The Rolling Stones<br>91% | Vivian Campbell<br>Def Leppard<br>100% | Neil Peart<br>Rush<br>91% | Clarence Clemmons<br>E Street Band<br>73% |
| Fantasy Player 10 | Paul McCartney<br>The Beatles<br>82% | Slash<br>Guns N' Roses<br>100% | John Panozzo<br>Styx<br>100% | Eric Clapton<br>Cream<br>73% |
| Fantasy Player 11 | John Lennon<br>The Beatles<br>100% | Bob Weir<br>Grateful Dead<br>91% | John Bonham<br>Led Zeppelin<br>100% | Dennis De Young<br>Styx<br>91% |
| Fantasy Player 12 | Michael Jackson<br>The Jackson 5<br>91% | Keith Richards<br>The Rolling Stones<br>73% | Neil Peart<br>Rush<br>91% | Clarence Clemmons<br>E Street Band<br>73% |

Scoring System in an Example Embodiment

The scoring system for Fantasy Band Legends in an example embodiment is described below.

10 points—For giving the name of a person who was involved with a band when their first U. S. top 40 hit is in the same decade asked for by the DECADE MATCHER that is listed in each of the four band categories on the chart above. For example, the DECADE MATCHER for the Lead Vocal category is the 1960's on the chart above. One of the contestants (contestant #11) selected John Lennon as their lead vocal. Because the indicator asks for a musician who had their first hit song in the 1960's, John Lennon would score 5 points for this (note: the indicator changes from match to match). Annie Lennox, selected by contestant #6, would not receive the 5 points because her first hit song was in the 1980's.
- 5 Points—If the musician is deceased.
- 5 points—If the musician played in a band that had siblings in it (or had a sibling themselves).
- 5 points—If the musician played in a band with at least one female (or is female themselves).
- 5 points—For every Grammy this musician has ever earned.
- 5 points—If the musician is in the Rock and Roll Hall of Fame.
- 5 points—For the Wildcard position entry if that person is not primarily associated with being a lead singer, guitarist or drummer. For example, Clarence Clemons of the E Street Band would earn an extra 5 points if he were submitted for this category because he was best known as a saxophonist.
- 2 points—For every platinum record of which this musician has been a part.
- 1 point—For every top 10 single this artist has been a part of on the Pop/Rock charts in the U.S.

Profile Ranking in an Example Embodiment

Profile rankings are achieved by how many consecutive times a contestant advances out of group play by finishing in the top 3 of their group. Some basic profile ranking rules for the example embodiment are provided below.

- Once someone has a ranking, they can never lose it.
- If someone skips a round by purchasing something, they don't get the ranking of the round that they skipped: however, if they advance from the group that they played in, they get the ranking that this new round is worth. For example, if a contestant has a Level 2 ranking and skips over both a Level 3 and 4 competition to compete in a Level 5 match (because they bought something), they will become a Level 5 player if they finish in the top 3 of that Level 5 match. They will revert back to a Level 2 if they don't finish in the top 3.
- Contestants can always skip rounds or have their groups reduced from 12 all the way down to 6 by purchasing items.

The 11 Levels of Fantasy Band Legends in the Example Embodiment

A plurality of levels can be defined for the Fantasy Band Legends. An example of these various levels for the example embodiment are provided below.

- Level 1—No Talent—This is a person who has never finished in the top 3 of group play for even one single competition.
- Level 2—Video Game Guitar Hero Champ—This is a person who has advanced one time, but has never advanced two consecutive times, by finishing in the top 3 in group play in a national competition.
- Level 3—High School Air Band Winner—This is a person who has advanced two consecutive times by finishing in the top 3 in group play in a national competition.
- Level 4—Garage Band Wannabe—This is a person who has advanced three consecutive times by finishing in the top 3 in group play in a national competition.
- Level 5—Local Bar Circuit—This is a person who has advanced four consecutive times by finishing in the top 3 in group play in a national competition.
- Level 6—One Hit Wonder—This is a person who has advanced five consecutive times by finishing in the top 3 in group play in a national competition.
- Level 7—Platinum Album—This is a person who has advanced six consecutive times by finishing in the top 3 in group play in a national competition.
- Level 8—Concert Headliner—This is a person who has advanced seven consecutive times by finishing in the top 3 in group play in a national competition.
- Level 9—Grammy Award Winner—This is a person who has advanced eight consecutive times by finishing in the top 3 in group play in a national competition.
- Level 10—Rock and Roll Hall of Famer—This is a person who has advanced nine consecutive times by finishing in the top 3 in group play in a national competition.
- Level 11—Mount Rushmore of Rock—This is a person who has advanced ten consecutive times by finishing in the top 3 in group play in a national competition. They automatically win a seat in the TOC and get a chance to compete for the Grand Prize.

The Tournament of Champions (TOC) Format for Fantasy Band Legends

The managing entity presents the Tournament of Champions (TOC) format for Fantasy Band Legends designed for contestants who advance 10 consecutive rounds during a qualifying competition. The TOC is six rounds with the final round culminating with the top 8 contestants remaining vying for final positions. The same Fantasy Band Legends scoring system described above can be used for the TOC.

The Fantasy Music Legends TOC Structure for Rounds 1-6 in an Example Embodiment

An example of the TOC Structure for Rounds 1-6 for the example embodiment are provided below.

- Up to 10,000 players can participate.
- Contestants compete in groups of 10 (or less).
- The top contestants in each group advance to the next round. This is called an "advancing" position. Those not finishing in an "advancing" position are eliminated from the TOC.
- The number of contestants advancing from each group varies depending on which round they are playing in.
- To advance out of Round 1, contestants have to finish in the top 3 of their group of 10. This means 10,000 entries is narrowed down to 3,000 remaining.
- To advance out of Round 2, contestants have to finish in the top 3 of their group of 10. This means 3,000 contestants who started the round are narrowed down to 900 remaining.
- To advance out of Round 3, contestants have to finish in the top 2 of their group of 10. This means 900 contestants who started the round are narrowed down to 180 remaining.
- To advance out of Round 4, contestants have to finish in the top 2 of their group of 10. This means 180 contestants who started the round are narrowed down to 36 remaining.
- To advance out of Round 5, contestants have to finish in the top 2 of their group of 9 to qualify for the final round. This means 36 contestants who started the round are narrowed down to 8 remaining for the last round.
- Each round consists of decks of cards with exactly 30 Fantasy Band Legends.
- All 10 contestants in each group (nine contestants per group for round 5 and eight contestants in round 6) are allowed to study the deck before the selection process begins.

- Each contestant is told by a dealer that they only get 3 "Legends" in their entire fantasy lineup. The dealer also tells them that they don't select one Legend at a time. They, instead, bid on groups of 3 Legends called "blocs".
- The first time a contestant wins a bid, they receive all three Legends that they bid on which completes their lineup. They no longer are allowed to bid on anymore blocs of Legends.
- The dealer begins the selection process by shuffling the deck and laying down the first three cards. The presentation of cards can also be implemented electronically in the specialized slot machine as described above.
- All 10 contestants (nine contestants for round 5 and eight for round 6) have the option of making a percentage bid (the maximum range is from 1% to 100%) on the three Legends or passing on them with a "No Bid".
- The percentage bid cannot be a decimal or a fraction. It must be a whole percent.
- The lowest bid wins the entire bloc of three Legends. If there is a tie amongst two or more contestants for the best bid, the person who submitted their entry in first (time stamped by computer) gets the bloc of Legends.
- If ALL contestants opt out so that no bid is made, this bloc will be reintroduced later as a "mulligan" (see above for a more detailed explanation of a mulligan).
- Once a contestant wins a bloc of three Legends, they will have the Legends laid on the table in front of them which signals everyone that they have a complete lineup and are ineligible to bid anymore.

Why doesn't a contestant just bid 1% on the first bloc of Legends that they really like? If the lowest bid wins, this seems like a no-brainer strategy that will automatically secure the Legends that they desire by submitting the lowest percentage which is 1%. However, it would be suicidal and would virtually guarantee them coming in last place. The reason for this is because the percentage bid serves two purposes. It not only secures Legends by having the lowest bid, but it also severely penalizes contestants for making absurdly low bids. A 1% bid will undoubtedly win a contestant the Legends that they desire, but it also represents the percentage of each Legend's fantasy points that they are eligible for in the game itself. For example, if someone bids 1% to win a group they desire such as Paul Mccartney, Michael Jackson and Keith Richards, they will be terribly disappointed to learn that they also only get 1% of the fantasy points that EACH of these three musicians scored.

In the example embodiment, the setup may not seem fair in one critical way. For example, a bloc of three could potentially have three second tier artists and another have three icons. It is possible and yet it is not as absurd as one might think. In the example embodiment, the described format actually turns the selection process into a riveting high wire exercise where skill becomes a major factor. Think of these groups of Legends as stocks. The more valuable the stock, the more aggressive the bidding will be. The correct price will be set by the bids. Three second tier artists at 95% of their fantasy points might be more valuable than three icons at 12% of their fantasy points.

In the example embodiment, three additional rules heighten the drama of the tournament format implemented on the specialized slot machine. These additional rules are described below:

- The order in which the cards are turned over for each bloc of three is very important. This is because the order they appear in is weighted. The first card turned over for each bloc will be worth triple their fantasy score. The second card turned over for each bloc will be double their fantasy score. The third card turned over for each bloc will be weighted face value of what their fantasy score is. (Note: Fantasy score is defined as the percentage of fantasy points for which a group of Legends is eligible.) The reason why this rule is so important is because a trio of Legends such as Mick Jagger, Robert Cray and Jimmy James (from Tommy Tutone)—in that order—will generate much more aggressive bidding than if they came out in the order of James, Cray and Jagger.
- For each new round, the maximum bid possible will be 5% less than the previous round. The dealer will announce the highest bid possible before the start of each round. For example, for the first round, the dealer will announce the max bid at 100%. By the sixth round, they will announce the highest possible bid at 75%. This creates an urgency to get involved in the bidding process for each round, but also have enough skill to know what a proper bid is for a given bloc so that it isn't secured with a ridiculously low bid.
- Fantasy Eliminator is added to the mix. This is the actual "gaming" piece where the match is decided. The game process will be broken into intervals. At the end of each interval, the lowest remaining contestant in a given interval is eliminated. This process continues until there are only advancing positions left for a given group.

In the example embodiment as described, somebody is going to eventually get a bloc: because, there are exactly three cards for every contestant—everybody is going to eventually need a lineup. What may happen, though, is that all blocs not bid on are called "mulligans" and will be reintroduced after all the blocs have been revealed. If there is more than one bloc for which a bid is not received, the blocs are reintroduced in the order that they first appeared. Also, the maximum bid for a new round does not go down 5% if the previous bloc was a mulligan. When they are reintroduced though at the end, they go down 5% each time a new one is reintroduced. If there is a tie during fantasy eliminator for last place, from the tied players (two or more), the one who secured their bloc in the latest round automatically is declared the advancing contestant.

An Example Embodiment Providing a Specialized Slot Machine for Implementing: A Slot Machine for Fantasy Sports FIG. 6 through FIG. 9 illustrate an example embodiment, implemented as a specialized slot machine, which shows the basic elements of the user interface for implementing a tournament with multi-contestant small group rounds on the specialized slot machine. The specialized slot machine and the user interface thereon can be used to implement a variety of different tournament formats on the specialized slot machine of an example embodiment. The following description provides a general overview of one such tournament format in an example embodiment.

In various example embodiments described below, real time/live events and related tournament formats are implemented on a specialized slot machine. These example embodiments bring slot machines into the 21st century and use real life events to transform the specialized slot machine from a static entity, that is currently based solely on canned information, into a real time/live event gaming apparatus.

It is important to distinguish what is meant by a real time/live event for the purposes of this example embodiment. An example of what is not meant by a real time/live event format is having a bunch of poker players playing in an online slot tournament. This might be a real time/live event, but that designation only refers to the participants who are playing—not the gaming material itself they are using for the tournament. The example embodiments describe real time/live action events that constitute the gaming material itself. No longer are slot machines simply based on pre-defined sets of cards that show up, lining up three consecutive cherries or even spinning a wheel in hopes of creating a fortune. This specialized slot machine and the particular tournament formats of the various example embodiments described herein are based on real time/live event data. In other words, the decisions the players are making with the game itself are based on events that are happening at the time the game is being played.

This real time/live event slot idea can be used for all types of real life events. For the purposes of this example embodiment, the described example embodiment uses the specialized slot machine with real time/live sporting events to create a new type of slot machine. Even more specifically, the described example embodiment is used for fantasy sports by modifying some of the current ways fantasy sports games are played to enhance the real time/live event slot machine embodiment as described herein.

The specialized slot machines, as described herein, are placed in casinos or other venues throughout the world. These specialized slot machines can be programmed to provide a competition related to any real time/live event contestants may desire to play.

These specialized slot machines are linked to a central network-accessible database so that contestants competing in a given "group game" can be playing in different casinos/venues throughout the world. In other words, if a person sits down in the MGM™ in Las Vegas, they don't have to sit and wait until their group of six people is filled by people sitting in that particular MGM™ casino. The other five players competing against them can be sitting in casinos/venues anywhere in the world.

Contestants sit at their own individual specialized slot machine/terminal as described herein. They are given the choice to enter for $1, $5, $20, $50 and $100 contests (or any other entry amount that casinos/venues find attractive for a slot machine).

Figure 9:
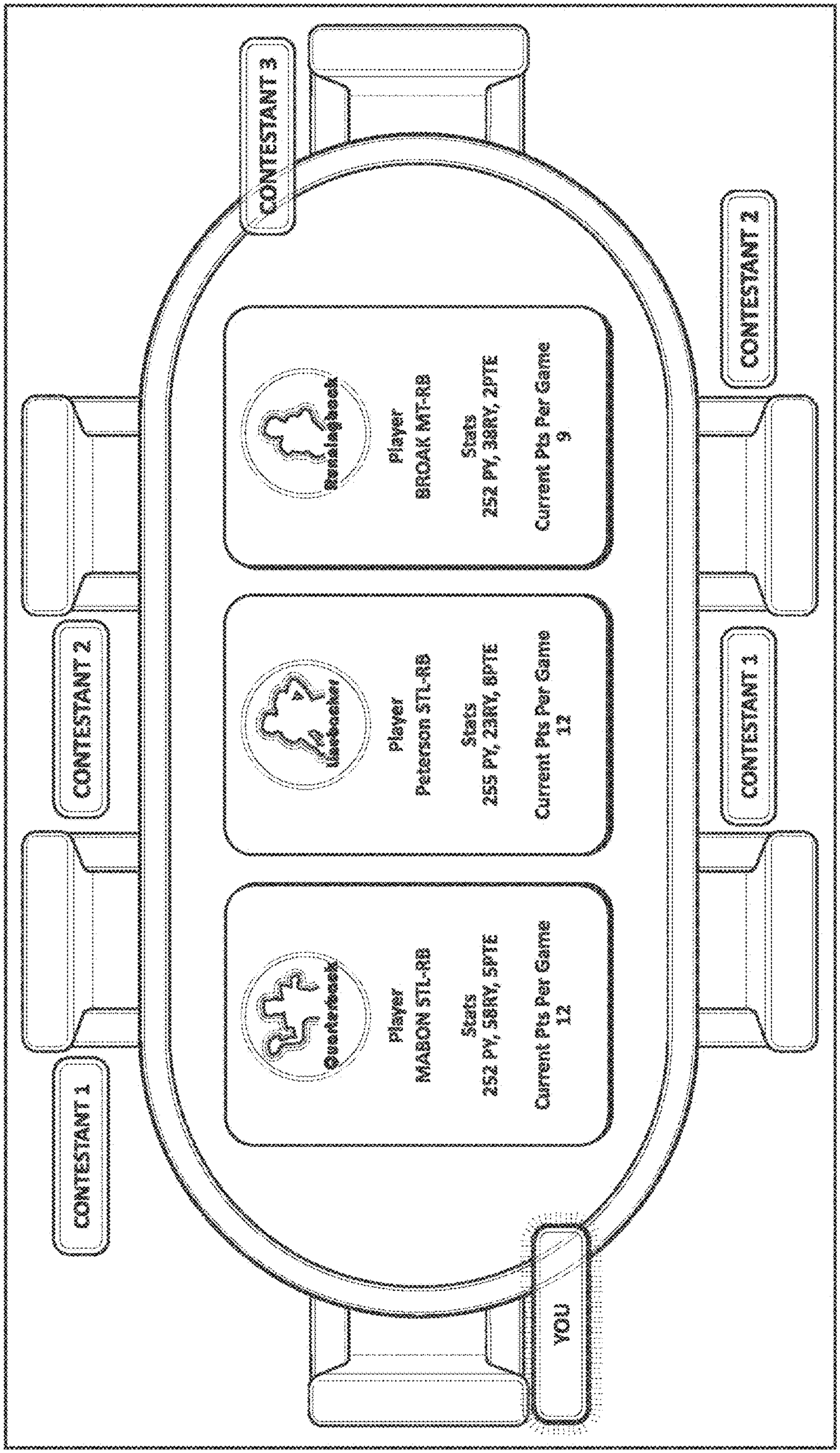
Figure 10:
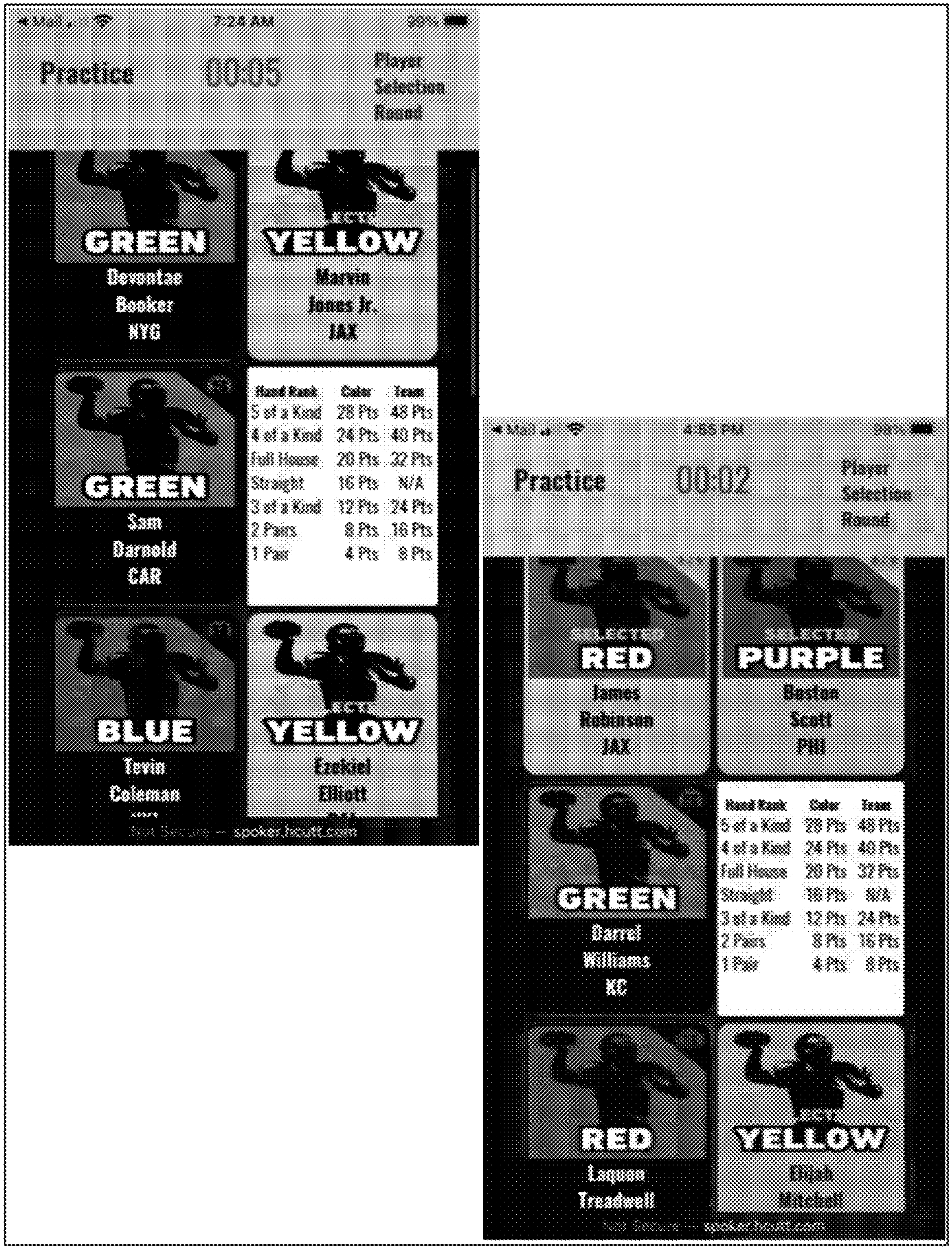
FIG. 10 through FIG. 14, illustrate example embodiments showing the basic elements of the new playing cards for various types of games.
Figure 11:
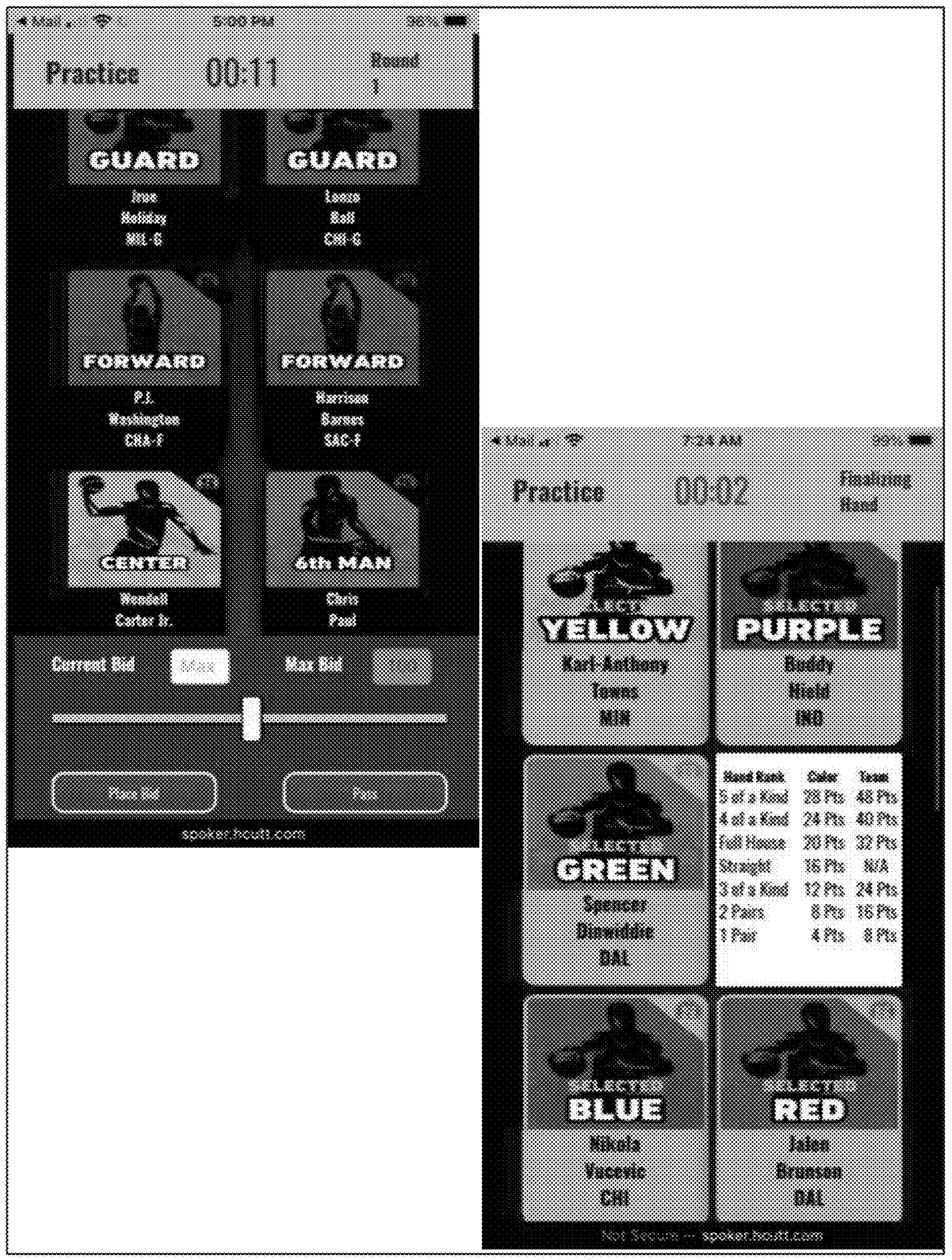
Figure 12:
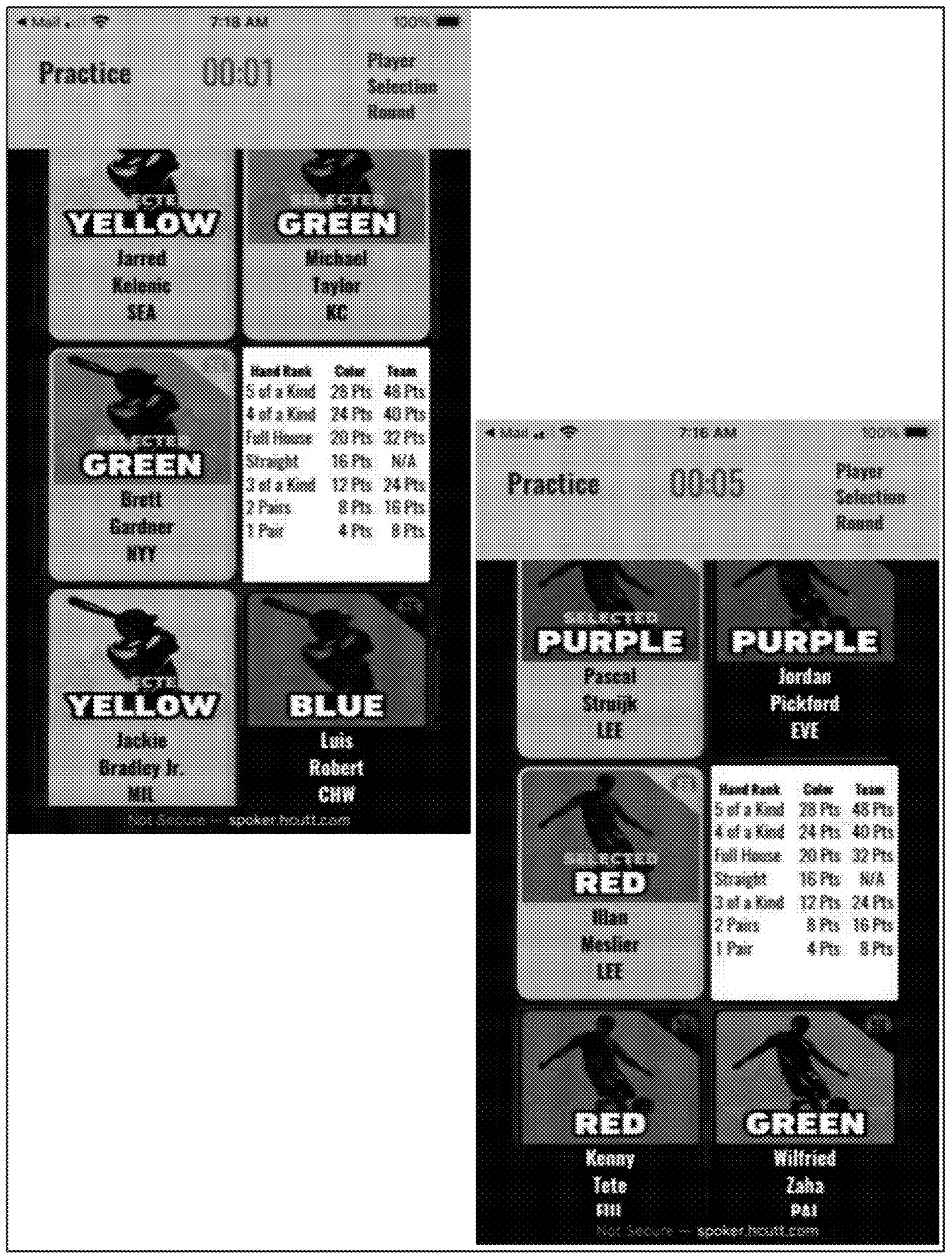
Figure 13:
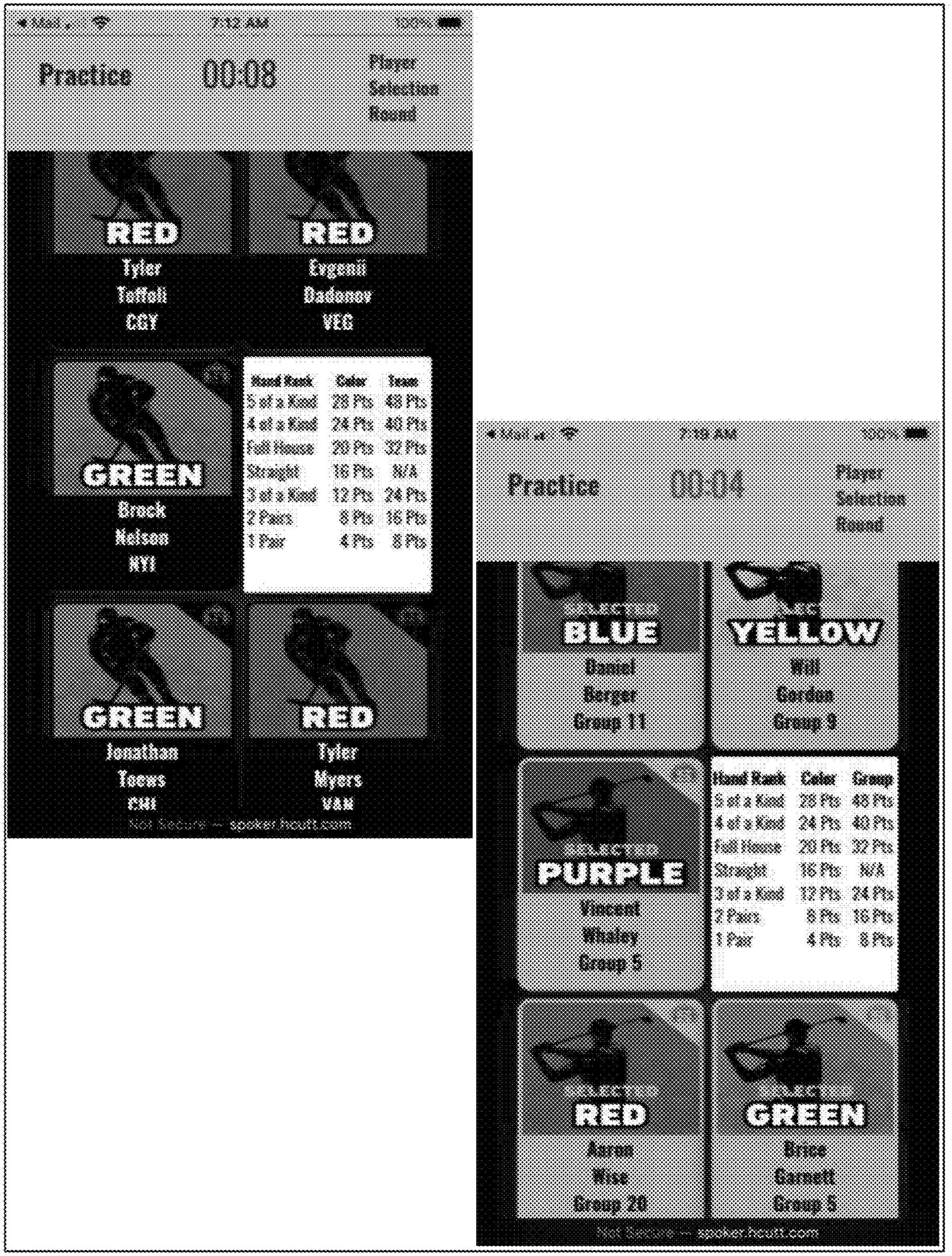

When a contestant looks at the display screen of the specialized slot machine/terminal, they will see an image on the display screen, as presented by the user interface logic of an example embodiment described herein, showing a virtual card table with six places (e.g., see FIG. 9). The contestant at the specialized slot machine/terminal will be one of the players occupying one of these six places at the virtual card table presented by the specialized slot machine/terminal.

The contestant puts an amount of money into the specialized slot machine/terminal corresponding to the level of play at which they want to participate. For example, the contestant might put $1 in for the dollar game, $10 in for the ten dollar game, or $20 in for the twenty dollar game, to enter the game.

The contestant then pulls down the handle (or activates a lever or pushes a button on the user interface of the specialized slot machine/terminal) and the specialized slot machine/terminal starts generating a variety of enticing and entertaining graphics that flash around until the contestant has a full group of six other players to play against (who are also playing for the same entry amount). Because the game will fill quickly with players, the graphic display generations, which take about five seconds, will take longer than the time needed to fill a live group of players, which will happen immediately, because the game and the players are linked to casinos/venues throughout the country/world (e.g., geographically distributed).

Groups are always comprised of six contestants in an example embodiment.

The other five contestants, who will fill the remaining five places at the virtual card table presented by the specialized slot machine/terminal, will be anonymous on the display screen in front of a given contestant. The user interface logic will configure the user interface of the example embodiment for each player to identify the different player positions as "YOU", "Contestant #1", "Contestant #2", etc. (see FIG. 9).

The contestants will be instructed by the user interface of the example embodiment that they will see three fantasy sports athletes.

The contestants will be instructed that the game will be based on live action scoring from some sporting event(s) that is currently in progress.

For every group of six competing contestants, the top scoring two contestants in each of these groups are considered winners. There is no distinction between finishing first and second. The top scoring two contestants are both winners and are eligible for the same prize if they choose to cash out.

These two top scoring winners for each group have one of two options. The two top scoring winners can either: 1) cash out by pressing a button (or activating a virtual object on the user interface of the specialized slot machine/terminal) that cashes them out and automatically doubles their money, or 2) they can choose to "let it ride" by pulling the handle (or activating a lever or pushing a button on the user interface of the specialized slot machine/terminal) to form a new group with five other new contestants and try to re-double their money by playing in a new round.

The bottom scoring four contestants of a group are eliminated and lose their money. The bottom scoring four contestants can either leave the specialized slot machine or put more money into the specialized slot machine to play again by playing in a new group of six contestants.

The casino/venue provides powerful motivation in two directions for winning contestants to stay in for another round instead of cashing out. First, winning contestants can "let it ride" and attempt to redouble their money each time they stay in instead of cashing out. Secondly, the specialized slot machine experience of the example embodiment offers another huge incentive for people to stay in. Any contestant who advances ten consecutive times will play in a Tournament of Champions (TOC) sponsored by the casino/venue in which they are playing.

The TOC format in an example embodiment uses the same real time/live action live fantasy sports format either on a specialized slot machine, online, or in a casino/venue ballroom.

The rationale for offering TOC is to provide a huge incentive for contestants to not cash out and to continue playing on the specialized slot machines. The TOC pays out millions of dollars to the winner and other top finishers and is a very attractive incentive for people to try and qualify for (and therefore not cash out).

For clarification purposes, even though contestants might be playing people assigned by a managing entity from other casinos/venues, this doesn't mean that this is a coordinated multi-casino TOC. Each casino/venue hosts their own TOC, which can be run directly from their website, off their own slot machines, or could even be live action in their casino/venue.

The reason casinos are motivated to have contestants NOT cash out is because each time the contestant lets it ride into another round, the percentage of the money the casino/venue takes in goes up significantly. For example, if the two winners from every group always cashed out, the casino would receive a standard 33% of the revenue. If, however, players never cashed out and always let it ride, by round ten the casinos/venues would always receive a staggering 98.3% of the revenue.

The table set forth above showing an example of the casino vs. contestant revenue split depending on the round from which contestants decide to cash out again illustrates the benefit for the casino/venue if players decide to remain in the game.

Contestants can play up to 15 rounds on a specialized slot machine as they attempt to double their money each new round. This means they can continue to try and re-double their money even after qualifying for the TOC by successfully winning ten consecutive times. If a TOC qualifier loses in rounds 11 to 15, they do not forfeit their TOC seat.

The Specialized Slot Machine Tournament Structure for Real Time/Live Sporting Events in an Example Embodiment The following description provides a general overview of the specialized slot machine tournament structure for real time/live sporting events in an example embodiment:

There are five bidding sessions for each round of play.

Contestants bid on three athletes at a time. These groups of three athletes are called "blocs".

Contestants only get one bloc of three athletes for their entire fantasy lineup.

The first time a contestant wins a bid, they receive all three athletes that they bid on which completes their lineup. They no longer are allowed to bid on anymore blocs of athletes. A black circle will be placed by their position on the specialized slot machine display screen indicating that they are done trying to secure a bloc.

The specialized slot machine begins the selection process by shuffling the deck and laying down the first three cards.

All six contestants have the option of making a percentage bid (the maximum range is from 1% to 100%) on the three athletes or passing on them with a "No Bid".

Contestants have 30 seconds to make a bid. In order to make the bid official, a contestant pulls the lever of the specialized slot machine (or otherwise activates a button or an object displayed on the display screen of the specialized slot machine). If a contestant fails to make a bid during the allotted time, the contestant automatically receives a "No Bid". Bids are time stamped based on the time when the lever was pulled (or other object was activated) to break ties.

Because contestants only have 30 seconds to bid for each of the five rounds, the entire game only takes two minutes and thirty seconds for the bidding process.

Once everyone has their blocs, the specialized slot machine computes the final score of the match immediately based on the real time/live action fantasy point totals each athlete in the respective blocs has in progress.

The percentage bid cannot be a decimal or a fraction. It must be a whole percent.

Contestants will either have a green, red or black circle by their spot on the display screen at all times. A green circle denotes that they have turned in their bid. A red circle denotes that they have not yet submitted their bid. A black circle denotes that they have already secured their bloc from a previous round.

The lowest bid wins the entire bloc of three athletes. If there is a tie amongst two or more contestants for the best bid, the contestant who submitted their bid first receives the bloc.

If none of the contestants bid on a bloc, this bloc will be reintroduced later as a "mulligan" (see below for a more detailed explanation on a mulligan). In other words, there will not be a new group of three athletes that replaces a bloc that has no bidders.

Once a contestant wins a bloc of three athletes, they have a complete lineup and are ineligible to bid anymore. A black circle will be placed by their spot on the card table to indicate they are no longer eligible to bid anymore.

Why doesn't a contestant just bid 1% on the first bloc of athletes that they really like? If the lowest bid wins, this seems like a no-brainer strategy that will automatically secure the athletes that they desire by submitting the lowest percentage which is 1%. However, this strategy would be counter-productive and would virtually guarantee that the contestant would come in last place. The reason for this is because the percentage bid serves two purposes. The bid not only secures athletes by having the lowest bid, but the bid also severely penalizes contestants for making unreasonably low bids. For example, a 1% bid will undoubtedly win a contestant the athletes that they desire, but this bid also represents the percentage of each athlete's fantasy points that they are eligible for in the game itself. For example, if someone bids 1% to win a fantasy football group they desire such as Peyton Manning, Calvin Johnson and Marshawn Lynch, they will be terribly disappointed to learn that they also only get 1% of the fantasy points that each of these three athletes scored in their respective games. As a result, a value of the contestant's bid, as represented by the percentage bid, is used to discount or reduce the contestant's score or quantity of points received by a corresponding amount. In this manner, a contestant bidding at a minimal level will also only receive a score or quantity of points at a correspondingly minimal level.

In the example embodiment, the setup may not seem fair in one critical way. For example, a bloc of three athletes could potentially have three duds like all kickers for a football contest while another bloc of three athletes has all high value athletes like quarterbacks for the same competition. Isn't this absurd since quarterbacks are much more valuable than kickers? In the example embodiment, the described format actually turns the selection process into a riveting high wire exercise where skill becomes a major factor. Think of these groups of athletes as stocks. The more valuable the stock, the more aggressive the bidding will be. The correct price will be set by the bids. Three kickers at 95% of their fantasy points might be more valuable than three quarterbacks at 12% of their fantasy points. This bidding process creates a tremendous amount of strategy for participants to consider.

In the example embodiment, two additional rules heighten the drama of the tournament format implemented on the specialized slot machine. These additional rules are described below:

- Blocs can have multipliers on them for each athlete in a bloc. The ranges of multipliers for the entire blocs can vary from 6× (read "6 times") all the way to 10×. They aren't assigned uniformly to each athlete in the bloc, though. The multipliers can be split up and have different levels of intensity on individual athletes. For example, the specialized slot machine might flash that the multiplier is 7×, which means that the three athletes shown (e.g., see FIG. 9) will have multipliers that have a sum total of 7×: however, their placement will be random as will their intensity (or value) on each athlete. For the 7× example, this means that the total on the multipliers for the 3 athletes must add up to seven. It could be that the first athlete is worth 1× their fantasy point total, the second athlete 5× and the third athlete 1×. It could also be 2×, 2× and 3× respectively. Using the later example, this means that the first card turned over would mean the athlete would be worth double their fantasy score. The second card turned over would mean the athlete would be worth double their fantasy score. The third card turned over would mean the athlete would be worth triple their fantasy score. (Note: Fantasy score is defined as the percentage of fantasy points a group of athletes is eligible for that was determined by the bid for which the bloc was secured.)
- For each new round, the maximum bid possible will be 8% less than the previous round. The specialized slot machine will show the bidding range for each round. For example, for the first round, the specialized slot machine will give the range as 1% to 100%. By the fourth round, this range will be down to 1% to 76%. This creates an urgency to get involved in the bidding process for each round, but also have enough skill to know what a proper bid is for a given bloc so that it isn't secured with an unreasonably low bid. After five rounds of bidding have occurred, the last person remaining in the group without a bloc automatically gets the last bloc that wasn't bid on for 60% of the fantasy points for each athlete in the bloc. See the, "Table Showing Max and Min Bidding Percentages Allowed Each Round" set forth above for an example embodiment.

Given the description of the example embodiment as provided above, one might think that the game is unfair if some blocs might have as low as a 6× multiplier while others might be as high as a 10× multiplier. However, this feature of an example embodiment makes the game even more strategic. Now, contestants will have to factor into the calculus the fact that a bloc of strong athletes might be diminished in value because they have a smaller multiplier and a more mediocre group might be increased in value because they are more valued by a higher multiplier. Even if a strong group of athletes has a 10× multiplier, this won't be a problem. The appropriate percentage bid for this bloc will be significantly lower than the norm. Conversely, a mediocre bloc of athletes with a small multiplier should be able to be secured with a bid considerable higher than the norm.

In the example embodiment as described, somebody is going to eventually get a bloc: because, there is exactly one bloc every contestant—everybody is going to eventually need a lineup. All blocs not bid on are called "mulligans" and will be reintroduced after all the blocs have been revealed. If there is more than one bloc for which a bid is not received, the blocs are reintroduced in the order that they first appeared. Also, the maximum bid for a new round does not go down 8% if the previous bloc was a mulligan. When the blocs not bid on are reintroduced and all six blocs have been shown and either bid on or passed on, the maximum bid for the reintroduced blocs go down 8% each time a new one is reintroduced and bid on. If there is a tie for a final position, amongst tied players, the person who secured their bloc in the lowest or latest round advances.

Once the bids are received from the contestants in a group for a particular round, the six contestants in the group are scored for final positions. The specialized slot machine of an example embodiment can gather the data for all athletes in the contest and then compute the final positions. This computation will take no more than five seconds after all contestants have secured their blocs. The specialized slot machine can tabulate the scores for all of the athletes and then add the three scores together for each bloc of athletes. Each contestant will then be ranked 1-6 (one through six) on the specialized slot machine user interface screen (e.g., see FIG. 7 and FIG. 8). For example, to tabulate the score of a single athlete, three components of information are required. First, the athlete's average fantasy game score has to be a part of the database linked to the managing entity website for easy retrieval. The second component of information needed is the bid with which the athlete was secured. Finally, the multiplier on the athlete has to be included in the computation. Using football as an example, let's assume Tom Brady has a running fantasy game point total of 10. Then assume he is secured at 68% of his fantasy points and the multiplier on him is 3×. Since 68% of 10 is 6.8 and when 6.8 is multiplied by 3, the result is 20.4. This means that Brady's score would be added to the other two athletes in his bloc for a final score to be posted for that contestant. Finally, tied positions always are broken by awarding the person who secured their bloc in the later round the higher spot.

The Specialized Slot Machine Tournament Structure in an Alternative Example Embodiment The following description provides a general overview of the specialized slot machine tournament structure in an alternative example embodiment. In an alternative embodiment of the specialized fantasy sports slot machine as described above, the alternative slot machine embodiment includes everything described above, but adds one more variable. This alternative embodiment calls for contestants to create the groups upon which the contestants bid. The process for this alternative embodiment is described below.

- There are 18 cards in a deck.
- Contestants see all 18 of the cards on the user interface screen ahead of time.
- Each contestant creates one of the six blocs that will be introduced in the bidding process.
- Contestants select three of the 18 athletes to represent the bloc that they created for the bidding process. They have 30 seconds to make their picks.
- The selection process is "blind" so none of the six contestants in a group knows what the other members of the group are selecting.
- Once a contestant creates their bloc of three for the bidding process, they pull the specialized slot machine's lever (or otherwise activate a button or displayed object).

If a contestant does not select a bloc of three athletes within the 30 second time limit, a bloc of three will be selected for them by the specialized slot machine.

Once all six contestants have created a bloc, the game is set to begin.

It is important to note that just because a contestant creates one of the six blocs, that doesn't necessarily mean that this bloc will be the bloc that they end up securing for the fantasy sports contest. The bloc that they do receive will be determined by the bidding process.

This process creates the possibility that some of the 18 athlete cards were not selected while others were selected more than once.

These six blocs that were created by contestants are introduced randomly and follow all of the rules of the process that was described previously—with one notable exception. The athletes in a given bloc might not all be worth 100% of their fantasy point per game value to begin with. This value is determined by how much a given athlete is duplicated.

When a bloc of three athletes is introduced, if a given athlete was selected only once for a bloc, they will be worth 100% of their fantasy sports point per game value. If on the other hand they are duplicated and the given athlete was selected more than once for a bloc, each time they are duplicated, they will be worth 20% less of their fantasy point per game average for each time this duplication occurs.

The percentage of each individual athlete's fantasy points that are available at any given time (based on this duplication penalty) will be prominently displayed on each athlete card as the blocs of three athletes are introduced during the bidding process. See the table set forth above showing the duplication penalties for each time an athlete is duplicated during the formation of the blocs.

The fantasy sports slot machine embodiments based on real time/live action events as described herein provide a unique idea that has never been seen in the market. In these example embodiments, the contestants themselves do not constitute the real time/live action event(s), rather it is the game itself that uses real time/live action events as the competition unfolds. These example embodiments fundamentally change the way slot machines are currently used. Slot machine players are suddenly playing with the outcomes that are based on events that are unfolding as they are playing. This adds a dimension to slot machines that has never been provided before.

In order to make these fantasy sports slot machine embodiments possible, there are three key elements that are new to the fantasy sports genre that these embodiments introduce and that support the implementation. These three key elements include the following:

1) The fantasy sports slot machine of an example embodiment provides a novel format of contestants playing in small groups of three or more participants—Fantasy sports contests have always been contested in one of two ways—both of which mimic real life sports. They either are conducted using a head-to-head format or they are configured where the entire field plays against each other simultaneously. Again, the reason why these two formats have emerged is because these are the formats for how real live sporting events are contested and fantasy sports contests have always tried to come as close as possible to mimicking reality. Of the two, the head-to-head format is the most common way real life sports are contested—for both team and individual competitions. For example, in team sports competitions, there are never three (or more) baseball teams playing each other simultaneously. That would be unheard of. There are always two teams competing against one another on the baseball diamond. Similarly, this structure applies to hockey, soccer, basketball, football, and quite frankly, most other sports. The same head-to-head format also is also quite prevalent for individual sports such as tennis (both singles and doubles), bowling, fencing, table tennis, boxing, wrestling, etc.

The other real live sports format that fantasy sports tournament organizers have copied is the "entire field" concept. An entire field event is when real live sports are contested in a manner where individuals or teams have to compete against the entire field at one time. While this is not nearly as prevalent as the head-to-head format, it is still quite often used. Examples of this are golf, cycling, gymnastics, swimming, track and field, etc. Teams or individuals compete in one huge event and they are then ranked according to either their finish or their final scores.

Fantasy sports tournament organizers have tried to re-create the real live action formats that are used in sports to appeal to those who like to participate in fantasy sports events. For this reason, they have always configured their offerings to mimic these real live sporting events by either using a one-on-one format or an "entire field" format. However, as described herein, there is another way that makes the specialized slot machine format work and it is a concept that is unique to the industry. This unique format is also counter-intuitive to how real life sporting events are contested and is why nobody has ever done this before. The novel method of a fantasy sports slot machine format as described herein is to have small groups of three or more contestants competing against one another at the same time. Again, this is counter-intuitive to real live sports because it makes no sense in real life for the Dolphins, 49ers and Jets to be playing each other in the same football game. For this exact reason, nobody has thought about having Bob, Steve, and Mary compete against each other in the same fantasy sports match because this configuration doesn't mimic real life sports.

2) The fantasy sports slot machine of an example embodiment provides a novel format wherein a portion of an athlete's fantasy points are or can be scored. Fantasy sports games have always been an all or nothing proposition. Contestants who "own" a certain athlete have always received all of the fantasy points that their athlete scored in their real live sports competition. Conversely, contestants who don't own an athlete receive nothing or zero points for them. This is a very valuable tool that helps make a fantasy sports slot machine implementation possible. This method involves giving contestants a portion or fraction of the fantasy points that a given athlete that they have secured scores. This fractional scoring method of an example embodiment can be implemented in several different ways as described below.

a. Percentage Bids—This is a bidding process where the bids involve taking a percentage of the athlete's fantasy points. In accordance with this method, contestants, in order to secure an athlete, make a percentage bid on a given athlete. The rules dictate that the contestant who submits the lowest percentage bid secures that athlete for their lineup. For example, if three contestants bid, 68%, 81% and 98% for a given athlete, then two things happen. First, the contestant who made the 68% bid receives that athlete in their fantasy sports lineup. Secondly, the contestant only receives 68% of the fantasy points that this athlete scores in the competition. As a result, a value of the contestant's bid, as represented by the percentage bid, is used to discount or reduce the contestant's score or quantity of points received by a corresponding amount. In this manner, a contestant bidding at a minimal level will also only receive a score or quantity of points at a correspondingly minimal level.

b. Duplication Penalties—This format allows fantasy contestants to share athletes instead of owning them exclusively, but there is a price to pay when duplication occurs. Each time an athlete is duplicated, their fantasy point value goes down a set predetermined percentage.

c. Partial Scoring—This format allows the actual fantasy sports contests to begin and end before the related real time/live sporting event has finished. This means that a given athlete now has only a portion of their fantasy points scored. Only the points that the athlete scored in their real time/live action game up to the point that the fantasy contest ends will count.

3) The fantasy sports slot machine of an example embodiment provides a novel format wherein blocs of athletes for a lineup can be selected through an auction process. Fantasy sports contests have always operated one of two ways, either: a) contestants select their entire lineup and submit it, or b) they draft athletes individually to create their "team". As provided by the example embodiments as described herein, there is another way that makes the fantasy sports slot machine work. Under this example embodiment, contestants are shown groups of two or more athletes to be evaluated simultaneously. The contestants who are interested in this "bloc" have to evaluate the comparative strength of the entire unit over other potential ones. This process creates a new twist because contestants are now forced to put a value on a unit that has multiple moving parts. This is not a part of traditional fantasy sports play, but creates a critical gaming component for a fantasy sports slot machine of the various embodiments described herein.

Figure 15:
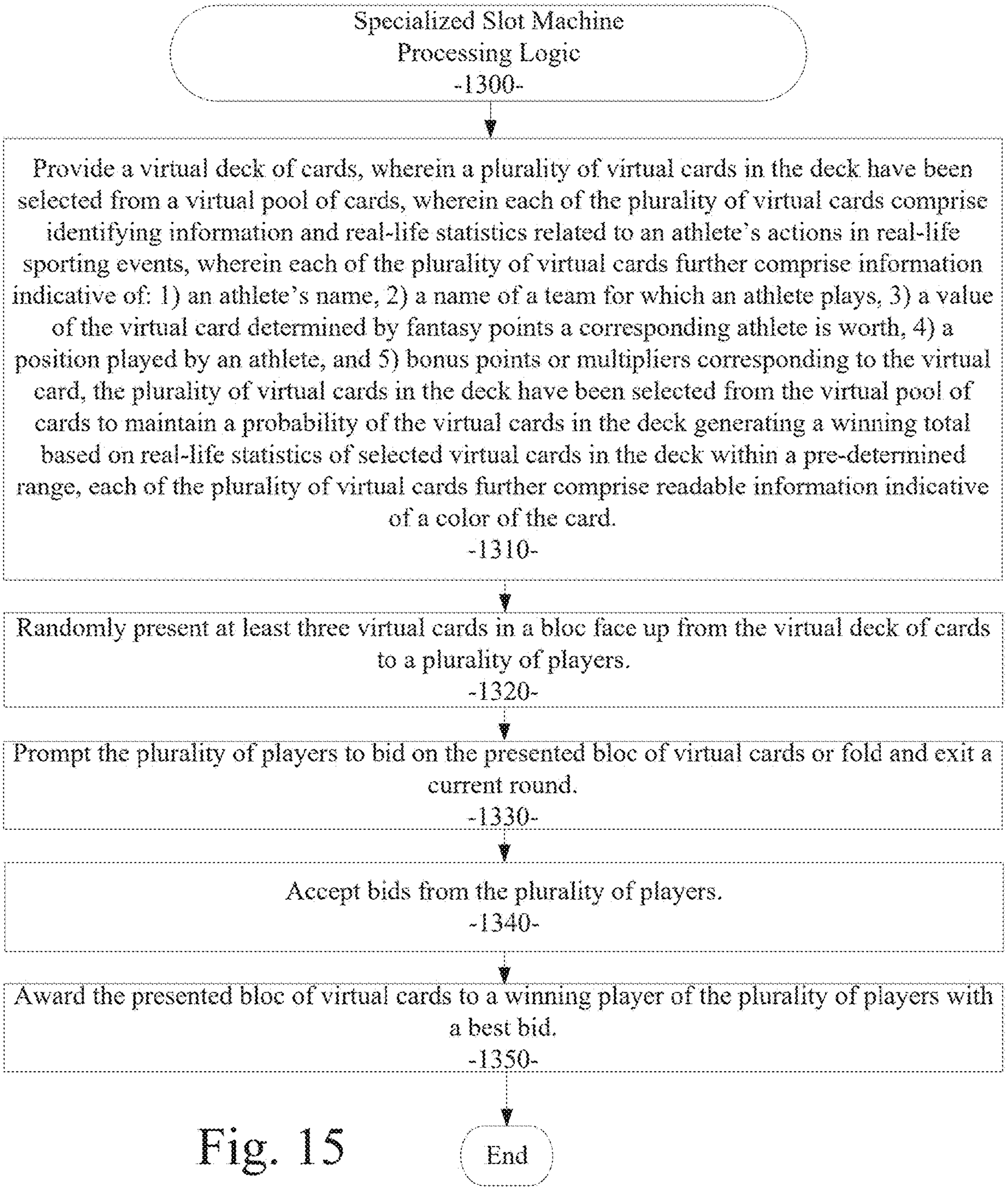
FIG. 15 is a processing flow chart illustrating an example embodiment of gaming processing logic for conducting a fantasy sports game with virtual playing cards.

FIG. 15 is a processing flow diagram illustrating an example embodiment of slot machine processing logic for conducting wagering games using a card system for real time or live action event content as described herein. The method 1300 of an example embodiment includes: providing, by use of the data processor, a virtual deck of cards, wherein a plurality of virtual cards in the deck have been selected from a virtual pool of cards, wherein each of the plurality of virtual cards comprise identifying information and real-life statistics related to an athlete's actions in real-life sporting events, wherein each of the plurality of virtual cards further comprise information indicative of: 1) an athlete's name, 2) a name of a team for which an athlete plays, 3) a value of the virtual card determined by fantasy points a corresponding athlete is worth, 4) a position played by an athlete, and 5) bonus points or multipliers corresponding to the virtual card, the plurality of virtual cards in the deck have been selected from the virtual pool of cards to maintain a probability of the virtual cards in the deck generating a winning total based on real-life statistics of selected virtual cards in the deck within a pre-determined range, each of the plurality of virtual cards further comprise readable information indicative of a color of the card (processing block 1310): randomly presenting, via a display device, at least three virtual cards in a bloc face up from the virtual deck of cards to a plurality of players (processing block 1320): prompting, by use of the data processor, the plurality of players to bid on the presented bloc of virtual cards or fold and exit a current round (processing block 1330): accepting bids from the plurality of players (processing block 1340); and awarding the presented bloc of virtual cards to a winning player of the plurality of players with a best bid (processing block 1350).

Figure 16:
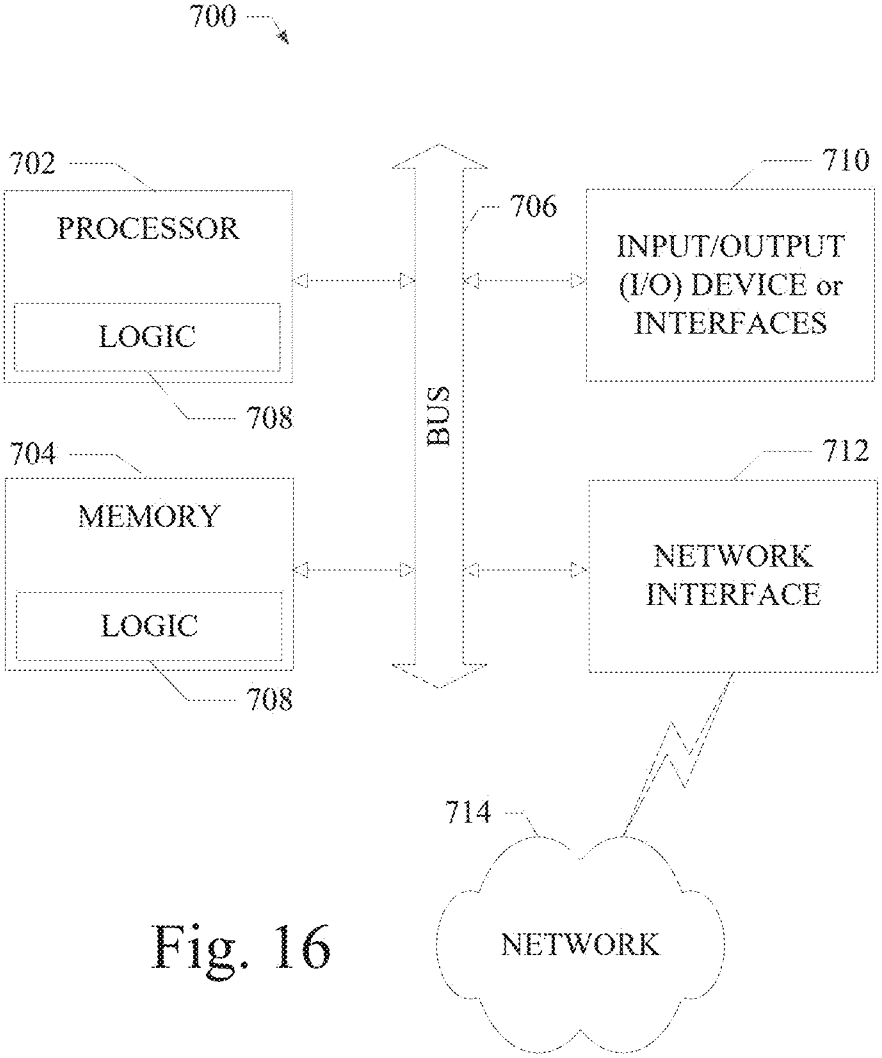
FIG. 16 shows a diagrammatic representation of a machine in the example form of a stationary or mobile computing and/or communication system within which a set of instructions when executed and/or processing logic when activated may cause the machine to perform any one or more of the methodologies described and/or claimed herein.

FIG. 16 shows a diagrammatic representation of a machine in the example form of a stationary or mobile computing and/or communication system 700 within which a set of instructions when executed and/or processing logic when activated may cause the machine to perform any one or more of the methodologies described and/or claimed herein. In alternative embodiments, the machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example stationary or mobile computing and/or communication system 700 includes a data processor 702 (e.g., a System-on-a-Chip (SoC), general processing core, graphics core, and optionally other processing logic) and a memory 704, which can communicate with each other via a bus or other data transfer system 706. The stationary or mobile computing and/or communication system 700 may further include various input/output (I/O) devices and/or interfaces 710, such as a monitor, touchscreen display, keyboard or keypad, cursor control device, voice interface, and optionally a network interface 712. In an example embodiment, the network interface 712 can include one or more network interface devices or radio transceivers configured for compatibility with any one or more standard wired network data communication protocols, wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, BLUETOOTH, IEEE 802.11x, and the like. In essence, network interface 712 may include or support virtually any wired and/or wireless communication mechanisms by which information may travel between the stationary or mobile computing and/or communication system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the stationary or mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

It will be apparent to one of ordinary skill in the art in view of the disclosure herein that other concepts described herein can also be implemented in particular embodiments. It will also be apparent to one of ordinary skill in the art in view of the disclosure herein that the various concepts and features described herein can be combined in various permutations in particular embodiments.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

APPENDIX

TABLE 1

Qualifying Tournaments
Example Based on the 2012 NFL ™ Football Season

| Rounds | Qualifier #1 9 | Qualifier #2 8 | Qualifier #3 7 | Qualifier #4 6 | Qualifier #5 5 | Qualifier #6 4 | Qualifier #7 3 | Qualifier #8 2 | Qualifier #9 1 |
|---|---|---|---|---|---|---|---|---|---|
| Week 1 | Round 1 Sept 9 | — | — | — | — | — | — | — | — |
| Week 2 | Round 2 Sept 16 | Round 1 Sept 16 | — | — | — | — | — | — | — |
| Week 3 | Round 3 Sept 23 | Round 2 Sept 23 | Round 1 Sept 23 | — | — | — | — | — | — |
| Week 4 | Round 4 Sept 30 | Round 3 Sept 30 | Round 2 Sept 30 | Round 1 Sept 30 | — | — | — | — | — |
| Week 5 | Round 5 Oct 7 | Round 4 Oct 7 | Round 3 Oct 7 | Round 2 Oct 7 | Round 1 Oct 7 | — | — | — | — |
| Week 6 | Round 6 Oct 14 | Round 5 Oct 14 | Round 4 Oct 14 | Round 3 Oct 14 | Round 2 Oct 14 | Round 1 Oct 14 | — | — | — |
| Week 7 | Round7 Oct 21 | Round 6 Oct 21 | Round 5 Oct 21 | Round 4 Oct 21 | Round 3 Oct 21 | Round 2 Oct 21 | Round 1 Oct 21 | — | — |
| Week 8 | Round 8 Oct 28 | Round 7 Oct 28 | Round 6 Oct 28 | Round 5 Oct 28 | Round 4 Oct 28 | Round 3 Oct 28 | Round 2 Oct 28 | Round 1 Oct 28 | — |
| Week 9 | Round 9 Nov 4 | Round 8 Nov 4 | Round 7 Nov 4 | Round 6 Nov 4 | Round 5 Nov 4 | Round 4 Nov 4 | Round 3 Nov 4 | Round 2 Nov 4 | Round 1 Nov 4 |

TABLE 2

Qualifying Tournament Caps for Groups of 12
Top 3 in Each Group Advance per Round
Playing for 4,096 Available Main Event Seats

| | # of Rounds | Cap (# of entries allowed) | # of Main Event Seats |
|---|---|---|---|
| Qualifier #1 | 9 | 272,105,472** | 1,038 |
| Qualifier #2 | 8 | 53,477,376 | 816 |
| Qualifier #3 | 7 | 11,698,176 | 714 |
| Qualifier #4 | 6 | 2,088,960 | 510 |
| Qualifier #5 | 5 | 313,344 | 306 |
| Qualifier #6 | 4 | 52,224 | 204 |
| Qualifier #7 | 3 | 13,056 | 204 |
| Qualifier #8 | 2 | 1,632 | 102 |
| Qualifier #9 | 1 | 408 | 102 |
| Direct Entry to Main Event* | — | 100 | 100 |
| Totals | | 339,750,748 | 4,096 |

*Fantasy player does not have to qualify via a satellite tournament and goes directly into the Main Event.

**To calculate the cap for Qualifier #1, a decision must be made on how many of the 4,096 Main Event seats will be assigned to this particular qualifier. The number 1,038 has arbitrarily been selected. Because three of the twelve fantasy players advance from each group, this is a 4 to 1 ratio, which can be written as 4/1, which equals 4. Now raise this number 4 to the power of how many rounds the round has. In this case, satellite #1 has 9 rounds. The number 4 raised to the power of 9 equals 262,144. This means that 262,144 fantasy players compete over 9 rounds for one Main Event seat. Because there are 1,038 Main Event seats that we arbitrarily assigned to Qualifier #1, this means 262,144 times 1,038 is the number of fantasy players that can play in Qualifier #1. This number comes out to 272,105,472, which is why the cap was set on this number.

TABLE 3

| Percentage of Fantasy Points an Athlete Keeps based on Duplication | | | | | | | | | | | | | | | | | | | | |
|---|---|---|---|---|---|---|---|---|---|---|---|---|---|---|---|---|---|---|---|---|
| Number of players in the fantasy match | 1×* | 2× | 3× | 4× | 5× | 6× | 7× | 8× | 9× | 10× | 11× | 12× | 13× | 14× | 15× | 16× | 17× | 18× | 19× | 20× |
| 4 | 100% | 67% | 33% | 0% | NA | NA | NA | NA | NA | NA | NA | NA | NA | NA | NA | NA | NA | NA | NA | NA |
| 5 | 100% | 75% | 50% | 25% | 0% | NA | NA | NA | NA | NA | NA | NA | NA | NA | NA | NA | NA | NA | NA | NA |
| 6 | 100% | 80% | 60% | 40% | 20% | 0% | NA | NA | NA | NA | NA | NA | NA | NA | NA | NA | NA | NA | NA | NA |
| 7 | 100% | 83% | 67% | 50% | 33% | 17% | 0% | NA | NA | NA | NA | NA | NA | NA | NA | NA | NA | NA | NA | NA |
| 8 | 100% | 86% | 72% | 58% | 43% | 28% | 14% | 0% | NA | NA | NA | NA | NA | NA | NA | NA | NA | NA | NA | NA |
| 9 | 100% | 87% | 75% | 62% | 50% | 38% | 25% | 13% | 0% | NA | NA | NA | NA | NA | NA | NA | NA | NA | NA | NA |
| 10 | 100% | 89% | 78% | 67% | 56% | 45% | 34% | 23% | 12% | 0% | NA | NA | NA | NA | NA | NA | NA | NA | NA | NA |
| 11 | 100% | 90% | 80% | 70% | 60% | 50% | 40% | 30% | 20% | 10% | 0% | NA | NA | NA | NA | NA | NA | NA | NA | NA |
| 12 | 100% | 91% | 82% | 73% | 64% | 55% | 46% | 37% | 28% | 19% | 10% | 0% | NA | NA | NA | NA | NA | NA | NA | NA |
| 13 | 100% | 92% | 84% | 75% | 67% | 59% | 50% | 42% | 34% | 25% | 17% | 9% | 0% | NA | NA | NA | NA | NA | NA | NA |
| 14 | 100% | 92% | 84% | 77% | 69% | 61% | 54% | 46% | 38% | 31% | 23% | 15% | 8% | 0% | NA | NA | NA | NA | NA | NA |
| 15 | 100% | 93% | 86% | 79% | 72% | 65% | 58% | 51% | 44% | 36% | 29% | 22% | 15% | 8% | 0% | NA | NA | NA | NA | NA |
| 16 | 100% | 93% | 86% | 80% | 73% | 66% | 60% | 53% | 46% | 40% | 33% | 26% | 20% | 13% | 6% | 0% | NA | NA | NA | NA |
| 17 | 100% | 94% | 88% | 82% | 75% | 69% | 63% | 57% | 50% | 44% | 38% | 32% | 25% | 19% | 13% | 7% | 0% | NA | NA | NA |
| 18 | 100% | 94% | 88% | 82% | 76% | 70% | 64% | 58% | 53% | 47% | 41% | 35% | 29% | 23% | 17% | 11% | 6% | 0% | NA | NA |
| 19 | 100% | 94% | 89% | 83% | 78% | 72% | 67% | 61% | 56% | 50% | 45% | 39% | 34% | 28% | 23% | 17% | 12% | 6% | 0% | NA |
| 20 | 100% | 95% | 90% | 85% | 79% | 74% | 69% | 64% | 58% | 53% | 48% | 43% | 37% | 32% | 27% | 22% | 16% | 11% | 6% | 0% |

*Note:
1× is read as "one time" which means a given athlete was selected by exactly one of the 20 fantasy players. Percentages selected are arbitrary.

TABLE 4

| Adjusted Fantasy Points Based on How Many Fantasy Players Selected a Given Athlete Example from NFL ™ Football | | | | |
|---|---|---|---|---|
| Athlete | Actual Fantasy Points an Athlete Scored | Number of Times Selected by a Fantasy Player | Percentage of Fantasy Points Kept—Based on Duplication of Athletes | *Adjusted Fantasy Points |
| Vick, Phila | 31 | 2 | 91% | 28.21 |
| Brady, NE | 25 | 6 | 55% | 13.75 |
| P. Manning, Ind | 40 | 3 | 82% | 32.80 |
| Brees, NO | 28 | 1 | 100% | 28.00 |
| Gore, SF | 16 | 2 | 91% | 14.56 |
| Peterson, Min | 33 | 11 | 10% | 3.30 |
| Mendenhall, Pit | 15 | 1 | 100% | 15.00 |
| C. Johnson, Ten | 29 | 4 | 73% | 21.17 |
| Foster, Hou | 21 | 1 | 100% | 21.00 |
| Jones-Drew, Jax | 9 | 1 | 100% | 9.00 |
| Bradshaw, NYG | 13 | 1 | 100% | 13.00 |
| Turner, Atl | 31 | 1 | 100% | 31.00 |
| Rice, Balt | 17 | 1 | 100% | 17.00 |
| S. Jackson, STL | 24 | 1 | 100% | 24.00 |

TABLE 4-continued

| Adjusted Fantasy Points Based on How Many Fantasy Players Selected a Given Athlete Example from NFL ™ Football | | | | |
|---|---|---|---|---|
| Athlete | Actual Fantasy Points an Athlete Scored | Number of Times Selected by a Fantasy Player | Percentage of Fantasy Points Kept—Based on Duplication of Athletes | *Adjusted Fantasy Points |
| Welker, NE | 21 | 2 | 91% | 19.11 |
| C. Johnson, Det | 18 | 6 | 55% | 9.90 |
| A. Johnson, Hou | 27 | 5 | 64% | 17.28 |
| Bowe, KC | 11 | 1 | 100% | 11.00 |
| Austin, Dal | 15 | 1 | 100% | 15.00 |
| White, Atl | 13 | 1 | 100% | 13.00 |
| Wallace, Pitt | 25 | 1 | 100% | 25.00 |
| Jennings, GB | 17 | 1 | 100% | 17.00 |
| Marshall, Mia | 16 | 1 | 100% | 16.00 |
| Fitzgerald, Az | 22 | 3 | 82% | 18.04 |
| Wayne, Ind | 10 | 1 | 100% | 10.00 |
| D. Jackson, Phila | 12 | 1 | 100% | 12.00 |

TABLE 5

| Final Scores for Hypothetical 12 Fantasy Player Football Group (Top 2 Fantasy Players Advancing) | | | | |
|---|---|---|---|---|
| | NFL ™ Player #1 TRIPLE PTS | NFL ™ Player #2 DOUBLE PTS | NFL ™ Player #3 FACE VALUE | Totals |
| Fantasy Player 1 | Rodgers QB Green Bay 3.90 × 3 = 11.70 ** | Roethlisberger QB Pittsburgh 23.78 × 2 = 47.56 | Nelson WR Green Bay 19.20 | 78.46* $2^{nd}$ Place |
| Fantasy Player 2 | Rodgers QB Green Bay 3.90 × 3 = 11.70 | Green Bay Defense 20.00 × 2 = 40.00 | Mendenhall Pitt 9.84 | 61.54 $8^{th}$ Place |

TABLE 5-continued

Final Scores for Hypothetical 12 Fantasy Player Football Group (Top 2 Fantasy Players Advancing)

| | NFL ™ Player #1 TRIPLE PTS | NFL ™ Player #2 DOUBLE PTS | NFL ™ Player #3 FACE VALUE | Totals |
|---|---|---|---|---|
| Fantasy Player 3 | Randle El WR Pittsburgh 9.00 × 3 = 27.00 | Rodgers QB Green Bay 3.90 × 2 = 7.80 | Driver WR Green Bay 2.00 | 36.80 12th Place |
| Fantasy Player 4 | Wallace WR Pittsburgh 15.47 × 3 = 46.41 | Rodgers QB Green Bay 3.90 × 2 = 7.80 | Pittsburgh Defense 10.92 | 65.13 6th Place |
| Fantasy Player 5 | Crosby K GB 7.00 × 3 = 21.00 | Pittsburgh Defense 10.92 × 2 = 21.84 | Rodgers QB Green Bay 3.90 | 46.74 11th Place |
| Fantasy Player 6 | Roethlisberger QB Pittsburgh 23.78 × 3 = 71.34 | Jennings WR Green Bay 17.22 × 2 = 34.44 | Rodgers QB Green Bay 3.90 | 109.68 1st Place |
| Fantasy Player 7 | Ward WR Pittsburgh 13.00 × 3 = 39.00 | Mendenhall RB Pittsburgh 9.84 × 2 = 19.68 | Rodgers QB Green Bay 3.90 | 62.58 7th Place |
| Fantasy Player 8 | Jones WR Green Bay 5.00 × 3 = 15.00 | Wallace WR Pittsburgh 15.47 × 2 = 30.94 | Starks RB Green Bay 5.00 | 50.94 10th Place |
| Fantasy Player 9 | Rodgers QB Green Bay 3.90 × 3 = 11.70 | Roethlisberger QB Pittsburgh 23.78 × 2 = 47.56 | Nelson WR Green Bay 19.20 | 78.46* 3rd Place |
| Fantasy Player 10 | Rodgers QB Green Bay 3.90 × 3 = 11.70 | Nelson WR Green Bay 19.20 × 2 = 38.40 | Jennings WR Green Bay 17.22 | 67.32 4th place |
| Fantasy Player 11 | Rodgers QB Green Bay 3.90 × 3 = 11.70 | Jennings WR Green Bay 17.22 × 2 = 34.44 | Nelson WR Green Bay 19.20 | 65.34 5th Place |
| Fantasy Player 12 | Rodgers QB Green Bay 3.90 × 3 = 11.70 | Nelson WR Green Bay 19.20 × 2 = 38.40 | Mendenhall RB Pittsburgh 9.84 | 59.94 9th Place |

* Advances to next round or qualifies for Main Event.

** In the example above, athlete Rodgers adjusted fantasy score is 3.90. This score is tripled because he is slotted first.

I claim:

1. A virtual card deck gaming system implemented on a specialized slot machine, the gaming system comprising:
   - a data processor; and a virtual card deck gaming structure, executable by the data processor, configured to:
   - provide, by use of the data processor, a virtual deck of cards, wherein a plurality of virtual cards in the deck have been selected from a virtual pool of cards, wherein each of the plurality of virtual cards comprise identifying information and real-life statistics related to an athlete's actions in real-life sporting events, wherein each of the plurality of virtual cards further comprise information indicative of: 1) an athlete's name, 2) a name of a team for which an athlete plays, 3) a value of the virtual card determined by fantasy points a corresponding athlete is worth, 4) a position played by an athlete, 5) bonus points or multipliers corresponding to the virtual card, and 6) an image or sketch representing an athlete or a related profession, the plurality of virtual cards in the deck have been selected from the virtual pool of cards to maintain a probability of the virtual cards in the deck generating a winning total based on real-life statistics of selected virtual cards in the deck within a pre-determined range, each of the plurality of virtual cards further comprise readable information indicative of a color of the card;
   - randomly present, via a display device, at least three virtual cards in a bloc face up from the virtual deck of cards to a plurality of players;
   - prompt, by use of the data processor, the plurality of players to bid on the presented bloc of virtual cards or fold and exit a current round;
   - accept bids from the plurality of players; and
   - award the presented bloc of virtual cards to a winning player of the plurality of players with a best bid.

2. The virtual card deck gaming system of claim 1 wherein the gaming system being further configured to display, by use of the display device, a virtual card table with one or more player positions.

3. The virtual card deck gaming system of claim 1 wherein the gaming system being further configured to score the plurality of players based on values of virtual cards held by each player.

4. The virtual card deck gaming system of claim 1 wherein colors for each of the plurality of virtual cards in the deck correspond to at least one trait corresponding to an athlete represented on a virtual card.

5. The virtual card deck gaming system of claim 1 wherein at least one of the plurality of virtual cards in the deck has a particular color and a name corresponding to an athlete represented on the virtual card.

6. The virtual card deck gaming system of claim 1 wherein the gaming system being further configured to receive, by use of the data processor, from the plurality of players credits corresponding to a player bid via a value input mechanism of a handheld device, the value input mechanism including a reader and a touch key interface to enable a player to authorize access to a central account of the player and authorize transfer of credits of the player from the central account to the specialized slot machine.

7. The virtual card deck gaming system of claim 1 wherein the gaming system being further configured to score, by use of the data processor, each of the players based on their bids and a completed hand of virtual cards of each player.

8. The virtual card deck gaming system of claim 1 wherein the gaming system being further configured to award bonus points to each of the players based on: 1) whether multiple virtual cards corresponding to the awarded bloc of virtual cards identify a same athlete, 2) color combinations of multiple virtual cards, 3) matching teammates, 4) matching positions, or 5) matching multiple versions of a same person.

9. The virtual card deck gaming system of claim 1 wherein the gaming system being further configured to enable a pre-determined quantity of highest ranked players from each of a plurality of player groups to remain for a next round and automatically increasing bids of the highest ranked players.

10. The virtual card deck gaming system of claim 1 wherein the gaming system being further configured to enable players from each of a plurality of player groups to bid on a plurality of content categories in a bloc.

11. The virtual card deck gaming system of claim 1 wherein the gaming system being further configured to display, by use of the display device, an indication of a bidding status of each player in each of a plurality of player groups.

12. The virtual card deck gaming system of claim 1 wherein each of the plurality of virtual cards in the deck are color coded.

13. The virtual card deck gaming system of claim 1 wherein the gaming system is further configured to award bonus points to each of the players based on a same color of virtual cards.

14. The virtual card deck gaming system of claim 1 wherein each of the plurality of virtual cards in the deck can be represented with a colored sleeve to indicate a selected card.

15. A specialized slot machine comprising:

a data processor;

a network interface, in data communication with the data processor, for communication on a data network;

a display device in data communication with the data processor, wherein the display device serves as a gaming surface; and a gaming system, executable by the data processor, to transform the data processor and network interface into a specialized slot machine configured to implement a client version of a wagering tournament game using a virtual deck of cards, the gaming system being further configured to:

prompt, by use of the data processor, a plurality of users at a plurality of geographically distributed user platforms to each submit a wager for entry as players into the wagering tournament game;

obtain, by use of the data processor, a set of real-life statistics related to an athlete's actions in real-life sporting events, the gaming system using the network interface to establish a data connection with a network resource located at a remote venue at which a real-life sporting event is occurring;

provide, by use of the data processor, a virtual deck of cards, wherein a plurality of virtual cards in the deck have been selected from a virtual pool of cards, wherein each of the plurality of virtual cards comprise identifying information and real-life statistics related to an athlete's actions in real-life sporting events, wherein each of the plurality of virtual cards further comprise information indicative of: 1) an athlete's name, 2) a name of a team for which an athlete plays, 3) a value of the virtual card determined by fantasy points a corresponding athlete is worth, 4) a position played by an athlete, 5) bonus points or multipliers corresponding to the virtual card, and 6) an image or sketch representing an athlete or a related profession, the plurality of virtual cards in the deck have been selected from the virtual pool of cards to maintain a probability of the virtual cards in the deck generating a winning total based on real-life statistics of selected virtual cards in the deck within a pre-determined range, each of the plurality of virtual cards further comprise readable information indicative of a color of the card;

randomly present, via the display device, at least three virtual cards in a bloc face up from the virtual deck of cards to a plurality of players;

prompt, by use of the data processor, the plurality of players to bid on the presented bloc of virtual cards or fold and exit a current round;

accept, by use of the data processor, bids from the plurality of players;

assign, by use of the data processor, the presented bloc of virtual cards to a particular player of the plurality of players with the best bid;

randomly select, by use of the data processor, a statistic from among the real-life statistics related to an athlete's actions in real-life sporting events for each virtual card in a player's hand and display the selected statistic on the virtual card as a score;

evaluate, by use of the data processor, a completed hand of each player and determine a winning player based on a winning total; and display, via the display device, any awards or payout values associated with any winning player.

16. The specialized slot machine of claim 15 wherein each of the plurality of virtual cards in the deck are color coded.

17. The specialized slot machine of claim 15 wherein the gaming system is further configured to award bonus points to each of the players based on a same color of virtual cards.

18. The specialized slot machine of claim 15 wherein the gaming system being further configured to award bonus points to each of the players based on: 1) whether athletes corresponding to the awarded bloc of virtual cards are teammates in real life sports, 2) color combinations of multiple virtual cards, 3) matching teammates, 4) matching positions, or 5) matching multiple versions of a same person.

19. The specialized slot machine of claim 15 wherein at least one of the plurality of virtual cards in the deck has a particular color and a name corresponding to an athlete represented on the virtual card.

20. The specialized slot machine of claim 15 wherein each of the plurality of virtual cards in the deck can be represented with a colored sleeve to indicate a selected card.

* * * * *